United States Patent
Meyers et al.

(10) Patent No.: US 12,489,637 B2
(45) Date of Patent: *Dec. 2, 2025

(54) NFT-BASED AUTHENTICATION SYSTEM FOR TAGGED OBJECTS AND METHODS FOR USE THEREWITH

(71) Applicant: Galiant Arts, LLC, Austin, TX (US)

(72) Inventors: Mark Meyers, Austin, TX (US); Bruce E. Stuckman, Austin, TX (US); John W. Howard, Cedar Park, TX (US); Brian G. Howard, Austin, TX (US); Gregory Meador, Austin, TX (US)

(73) Assignee: Galiant Arts, LLC, Austin, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/452,704

(22) Filed: Aug. 21, 2023

(65) Prior Publication Data
US 2023/0396442 A1  Dec. 7, 2023

Related U.S. Application Data

(63) Continuation-in-part of application No. 17/819,016, filed on Aug. 11, 2022, now Pat. No. 12,175,838.
(Continued)

(51) Int. Cl.
*H04L 9/08* (2006.01)
*H04L 9/32* (2006.01)

(52) U.S. Cl.
CPC .......... *H04L 9/3236* (2013.01); *H04L 9/0825* (2013.01); *H04L 9/0869* (2013.01); *H04L 9/3247* (2013.01)

(58) Field of Classification Search
CPC ... H04L 9/3236; H04L 9/0825; H04L 9/0869; H04L 9/3247
See application file for complete search history.

(56) References Cited

U.S. PATENT DOCUMENTS 7,921,302 B2   4/2011  Gatto
9,916,483 B1 *  3/2018  Robshaw ............ H04W 12/069
(Continued)

FOREIGN PATENT DOCUMENTS

CN   113037498 A *  6/2021  ........... H04L 9/0869
CN   113569223 A *  10/2021  ............. G06F 21/44
(Continued)

*Primary Examiner* — Darshan I Dhruv
(74) *Attorney, Agent, or Firm* — Katz Ruby & Carle LLP; Bruce E. Stuckman

(57) ABSTRACT

An authentication system (AS) includes a radio frequency (RF) tag reader and operates by: assigning pairing data to be associated with an RF tag and a corresponding object to be authenticated wherein the pairing data includes a tag identifier, a private key, a public key, a first random number and a first AS hash based on the first random number; pairing the authentication system to the RF tag associated with the object; receiving a request to authenticate the object; when first tag hash matches first tag hash check data, generating first read event data that indicates authentication of the object; and facilitate updating, via a blockchain system and based on the first read event data, a non-fungible token (NFT) containing a registry of read events.

20 Claims, 42 Drawing Sheets

Related U.S. Application Data which is a continuation-in-part of application No. 17/806,766, filed on Jun. 14, 2022, which is a continuation-in-part of application No. 17/661,362, filed on Apr. 29, 2022, now Pat. No. 12,121,820, which is a continuation-in-part of application No. 17/656,084, filed on Mar. 23, 2022, now Pat. No. 11,786,820.

(60) Provisional application No. 63/373,230, filed on Aug. 23, 2022, provisional application No. 63/373,231, filed on Aug. 23, 2022, provisional application No. 63/365,012, filed on May 19, 2022, provisional application No. 63/365,010, filed on May 19, 2022, provisional application No. 63/364,571, filed on May 12, 2022, provisional application No. 63/364,573, filed on May 12, 2022, provisional application No. 63/364,578, filed on May 12, 2022, provisional application No. 63/364,568, filed on May 12, 2022, provisional application No. 63/362,581, filed on Apr. 6, 2022, provisional application No. 63/310,376, filed on Feb. 15, 2022, provisional application No. 63/309,382, filed on Feb. 11, 2022, provisional application No. 63/308,546, filed on Feb. 10, 2022, provisional application No. 63/307,349, filed on Feb. 7, 2022, provisional application No. 63/306,405, filed on Feb. 3, 2022, provisional application No. 63/306,412, filed on Feb. 3, 2022, provisional application No. 63/305,505, filed on Feb. 1, 2022, provisional application No. 63/305,559, filed on Feb. 1, 2022, provisional application No. 63/302,757, filed on Jan. 25, 2022, provisional application No. 63/302,768, filed on Jan. 25, 2022, provisional application No. 63/297,394, filed on Jan. 7, 2022, provisional application No. 63/266,478, filed on Jan. 6, 2022, provisional application No. 63/265,754, filed on Dec. 20, 2021, provisional application No. 63/264,811, filed on Dec. 2, 2021, provisional application No. 63/263,844, filed on Nov. 10, 2021, provisional application No. 63/262,858, filed on Oct. 21, 2021, provisional application No. 63/262,762, filed on Oct. 20, 2021, provisional application No. 63/262,536, filed on Oct. 14, 2021.

(56) References Cited

U.S. PATENT DOCUMENTS

| | | | |
|---|---|---|---|
| 9,940,490 B1 * | 4/2018 | Robshaw | G06K 7/10257 |
| 11,361,174 B1 * | 6/2022 | Robshaw | H04L 9/3242 |
| 11,500,972 B2 * | 11/2022 | Goldston | G06F 21/16 |
| 11,663,551 B2 | 5/2023 | Stephens | |
| 11,707,682 B2 | 7/2023 | Benedetto | |
| 11,741,426 B2 | 8/2023 | Stephens | |
| 11,765,230 B2 | 9/2023 | Sulibhavi | |
| 11,819,760 B2 | 11/2023 | Hiatt | |
| 11,865,457 B2 | 1/2024 | Benedetto | |
| 11,883,748 B2 | 1/2024 | Yang | |
| 12,029,984 B2 | 7/2024 | Benedetto | |
| 2010/0087251 A1 | 4/2010 | Collar | |
| 2012/0128157 A1 * | 5/2012 | Braun | G06F 21/445 380/270 |
| 2018/0288613 A1 * | 10/2018 | Luible | H04W 12/06 |
| 2019/0349753 A1 * | 11/2019 | Chen | H04L 9/3247 |
| 2020/0280436 A1 * | 9/2020 | Nix | H04L 9/0869 |
| 2020/0280454 A1 * | 9/2020 | Finlow-Bates | H04W 12/041 |
| 2021/0082044 A1 | 3/2021 | Sliwka et al. | |
| 2021/0126801 A1 * | 4/2021 | Nix | G06F 7/588 |
| 2021/0334353 A1 * | 10/2021 | Peng | H04W 12/069 |
| 2022/0215076 A1 * | 7/2022 | Goldston | G06F 21/16 |
| 2023/0079127 A1 | 3/2023 | Benedetto | |
| 2023/0316320 A1 | 10/2023 | Yamazaki | |
| 2023/0318811 A1 | 10/2023 | Claesen | |
| 2023/0385967 A1 | 11/2023 | Rosenberg | |
| 2023/0419315 A1 | 12/2023 | Togame | |
| 2024/0066402 A1 | 2/2024 | Milne | |
| 2024/0082710 A1 | 3/2024 | Hiatt | |
| 2024/0091652 A1 | 3/2024 | Benedetto | |
| 2024/0123354 A1 | 4/2024 | Benedetto | |
| 2024/0202707 A1 | 6/2024 | Sachson | |
| 2024/0238679 A1 | 7/2024 | Green | |

FOREIGN PATENT DOCUMENTS

| | | | | |
|---|---|---|---|---|
| CN | 114900304 A | * | 8/2022 | H04L 9/0819 |
| EP | 3857452 | | 4/2021 | |
| EP | 4136547 | | 2/2023 | |
| EP | 4405878 | | 7/2024 | |
| WO | 2021062160 A1 | | 4/2021 | |
| WO | WO-2021208037 A1 | * | 10/2021 | H04L 9/3273 |
| WO | 2022204404 A1 | | 9/2022 | |
| WO | WO2022224585 | | 10/2022 | |
| WO | WO2022269989 | | 12/2022 | |
| WO | WO2022269998 | | 12/2022 | |
| WO | WO2023015202 | | 2/2023 | |
| WO | WO2023076015 | | 5/2023 | |
| WO | WO2023105326 | | 6/2023 | |
| WO | WO2023015090 | | 9/2023 | |
| WO | WO2023176421 | | 9/2023 | |
| WO | WO2023181896 | | 9/2023 | |
| WO | WO2023187486 | | 10/2023 | |
| WO | WO2023217678 | | 11/2023 | |
| WO | WO2023225437 | | 11/2023 | |
| WO | WO2023248034 | | 12/2023 | |
| WO | WO2024015704 | | 1/2024 | |
| WO | WO2024029368 | | 2/2024 | |
| WO | WO2024039447 | | 2/2024 | |
| WO | WO2024042411 | | 2/2024 | |
| WO | WO2024042415 | | 2/2024 | |
| WO | WO2024053431 | | 3/2024 | |
| WO | WO2024069310 | | 4/2024 | |
| WO | WO2024080135 | | 4/2024 | |
| WO | WO2024081704 | | 4/2024 | |
| WO | WO2024084943 | | 4/2024 | |
| WO | WO2024122243 | | 6/2024 | |
| WO | WO2024123549 | | 6/2024 | |
| WO | WO2024128045 | | 6/2024 | |
| WO | WO2024134554 | | 6/2024 | |
| WO | WO2024150698 | | 7/2024 | |
| WO | WO2024155466 | | 7/2024 | |

* cited by examiner

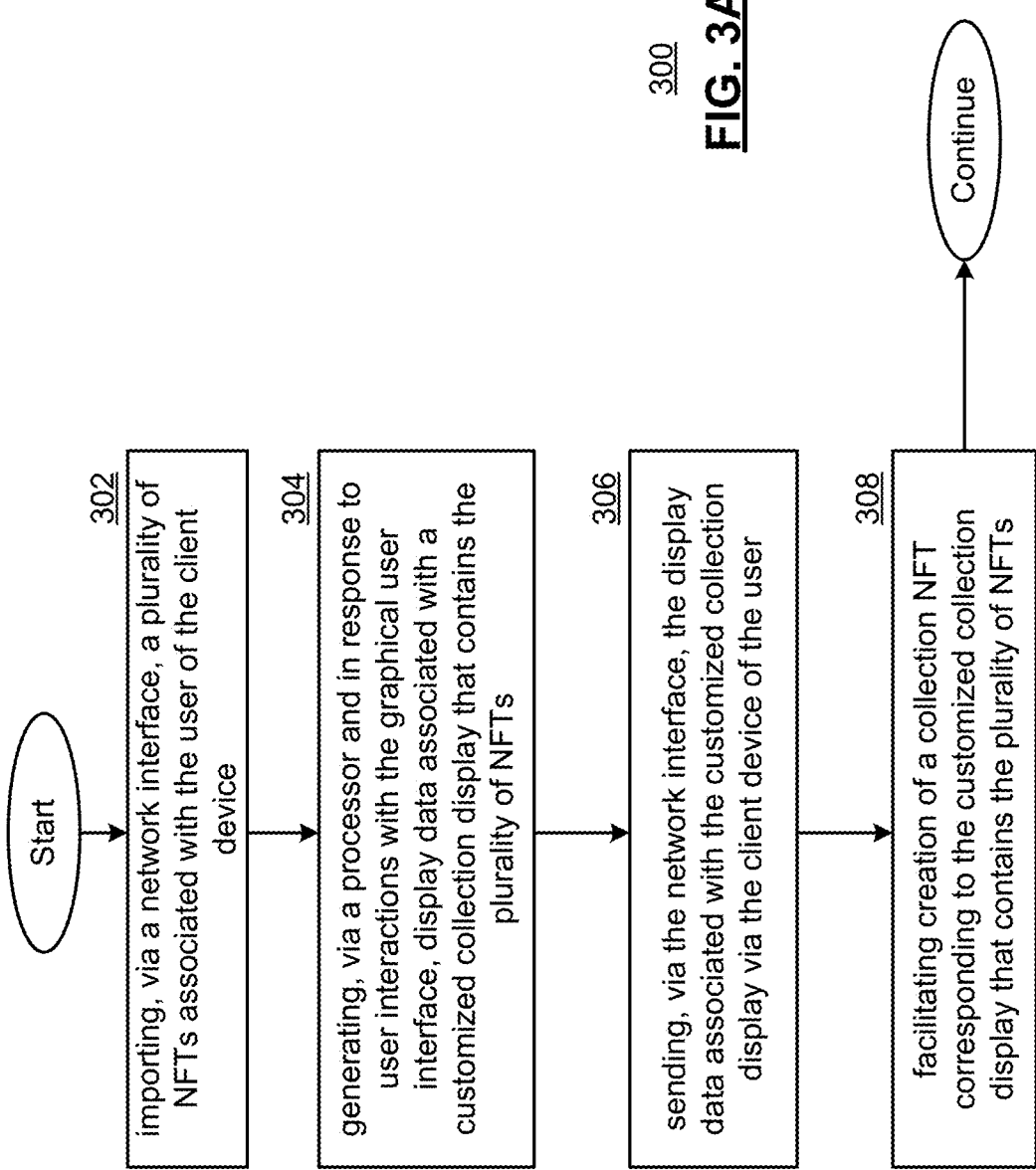

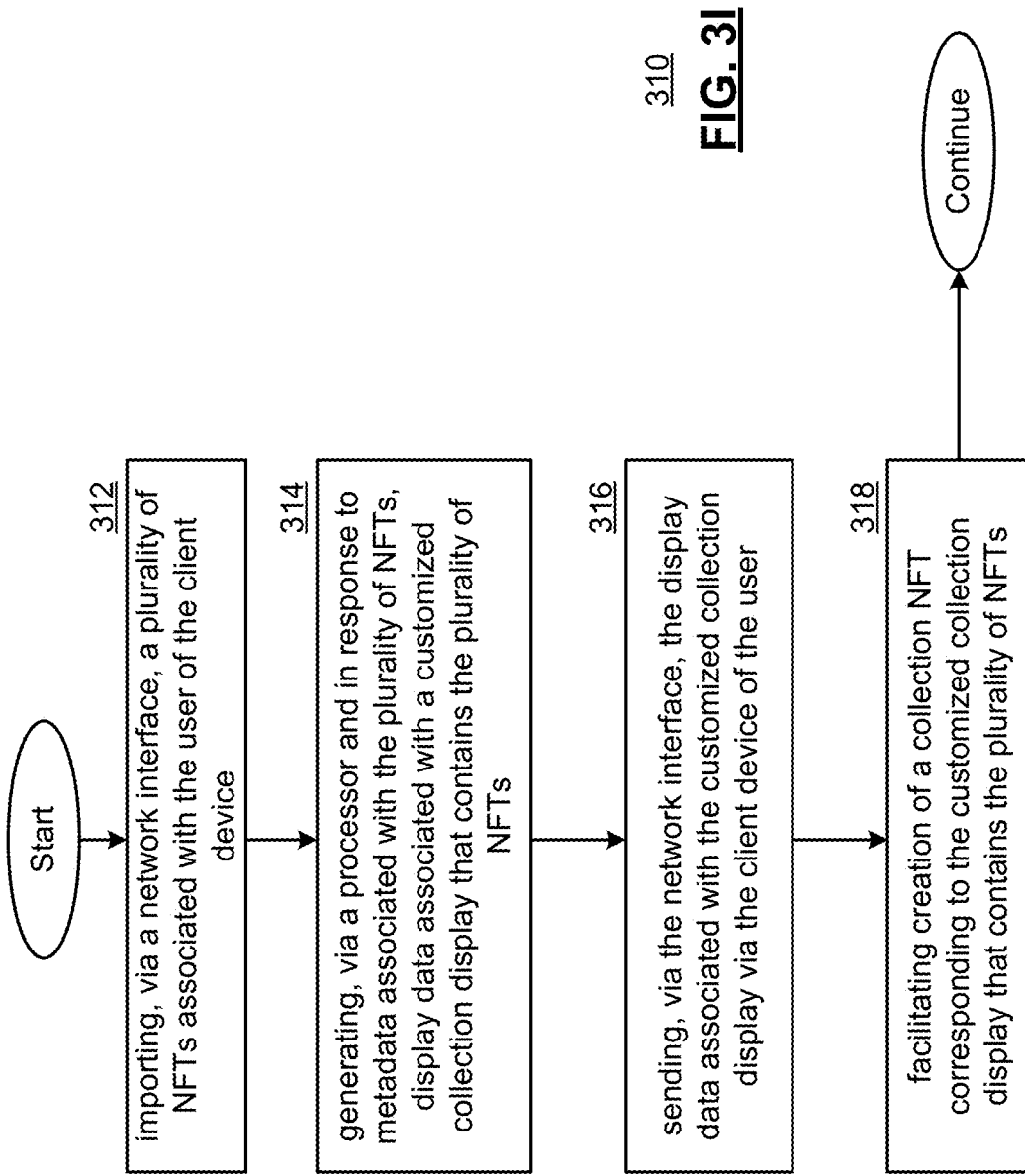

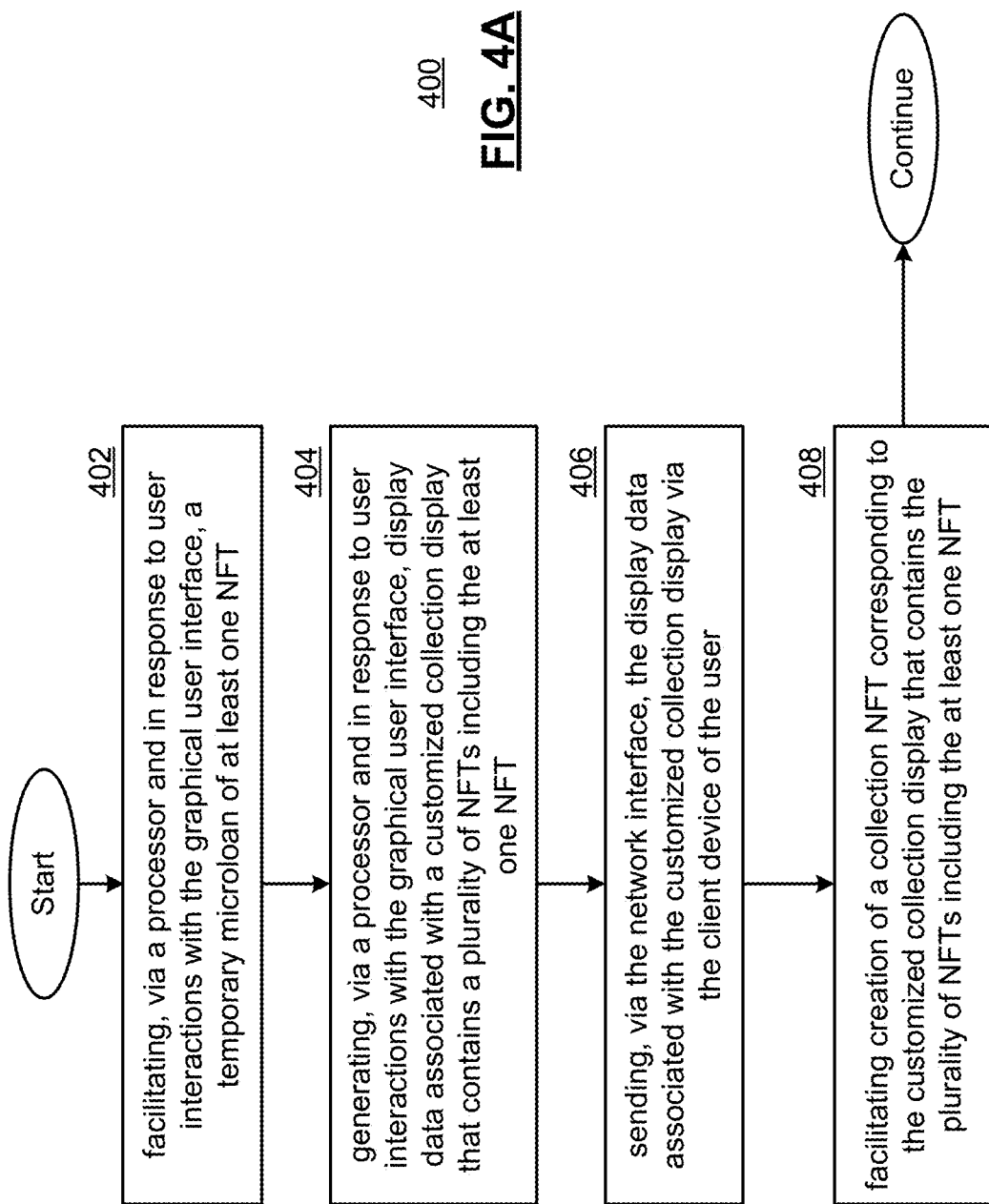

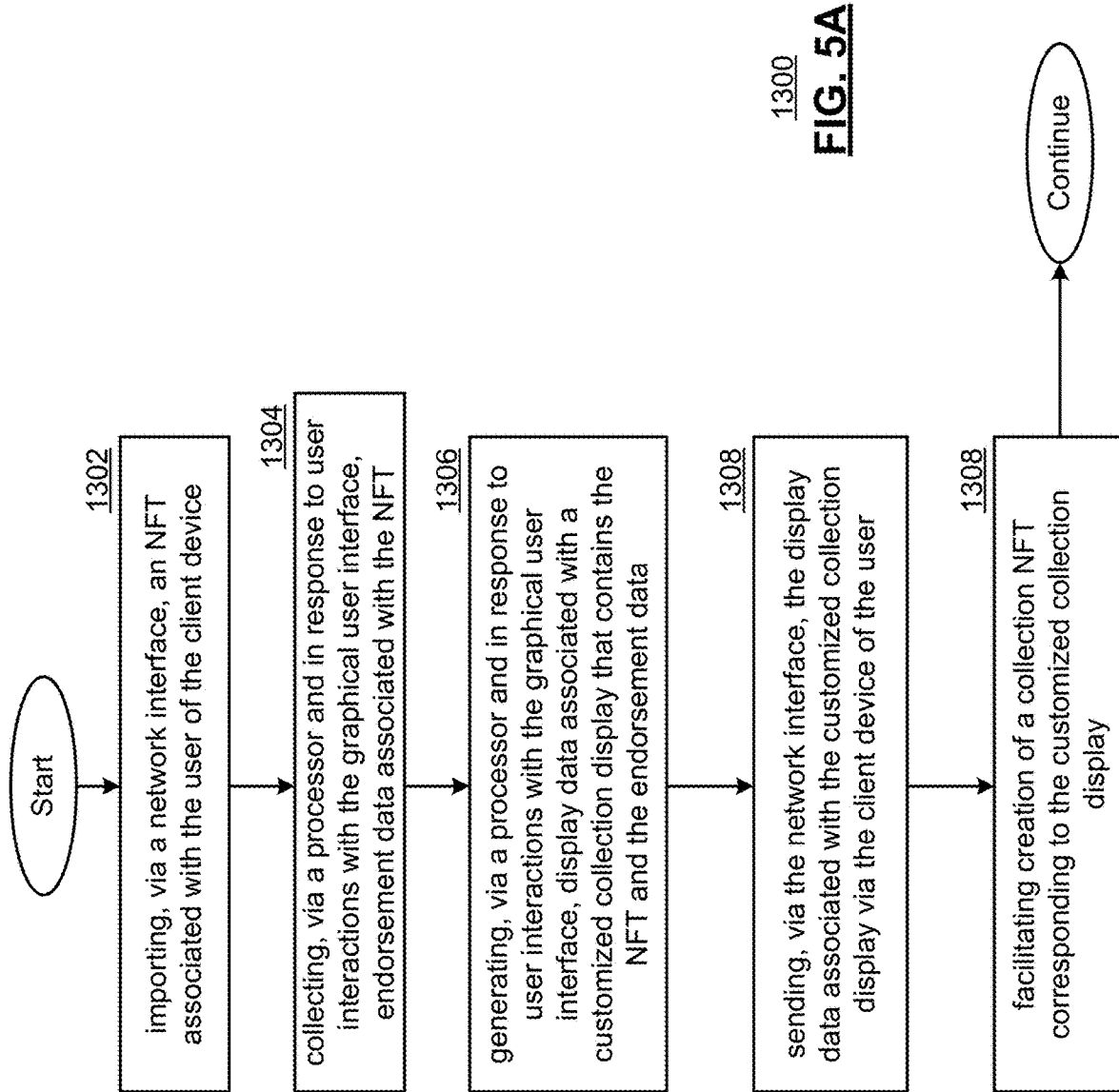

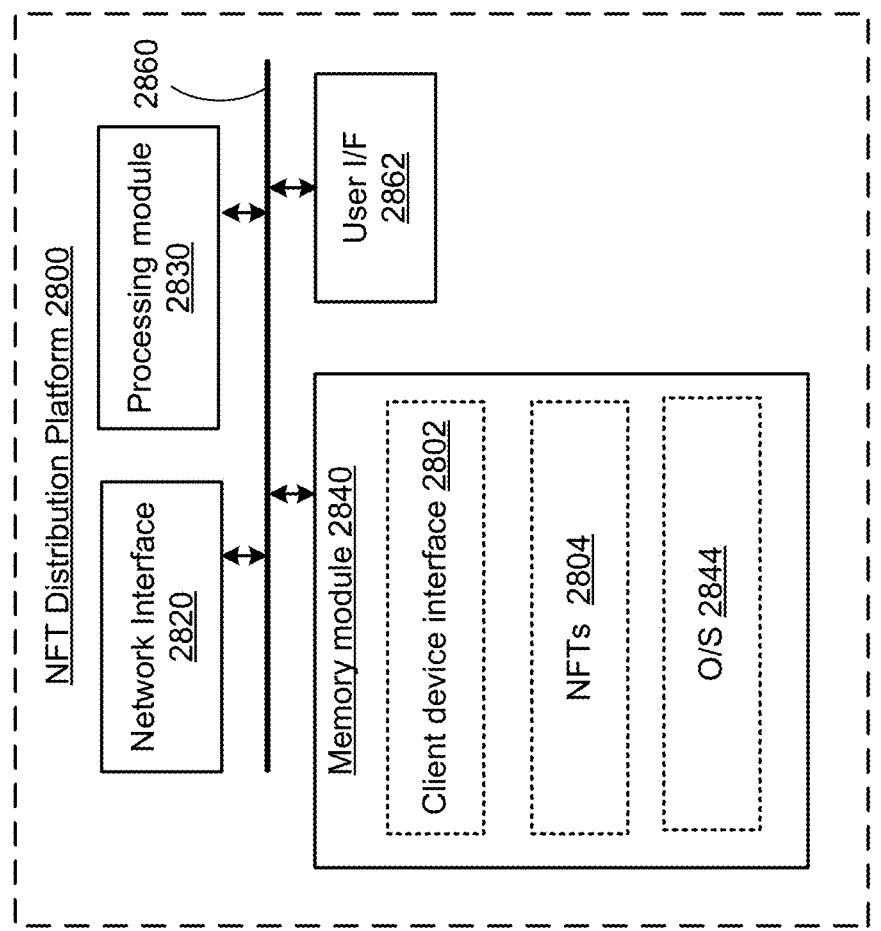
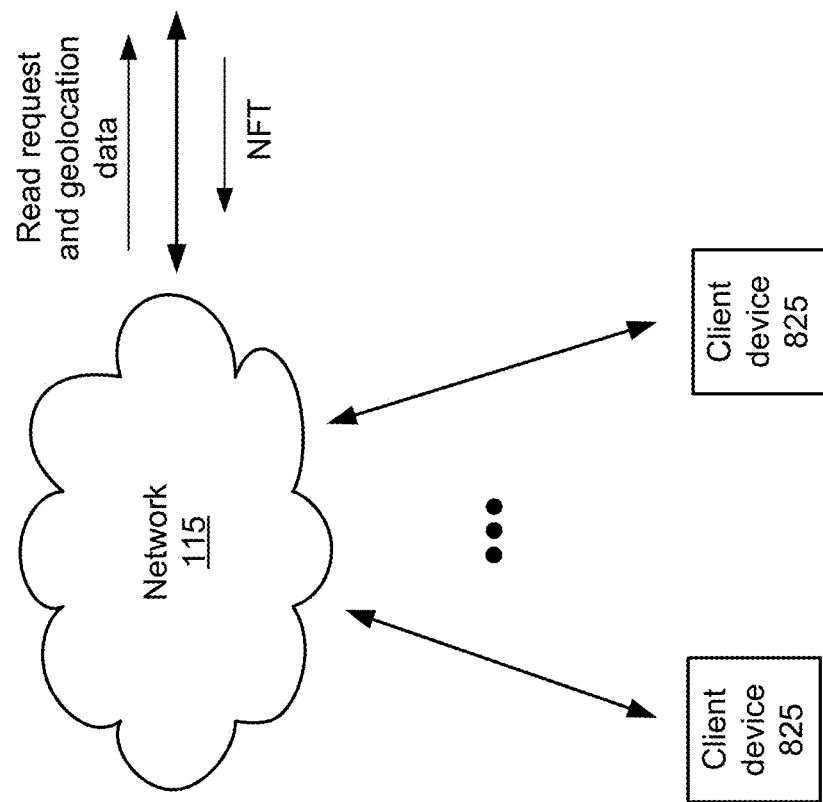
FIG. 7

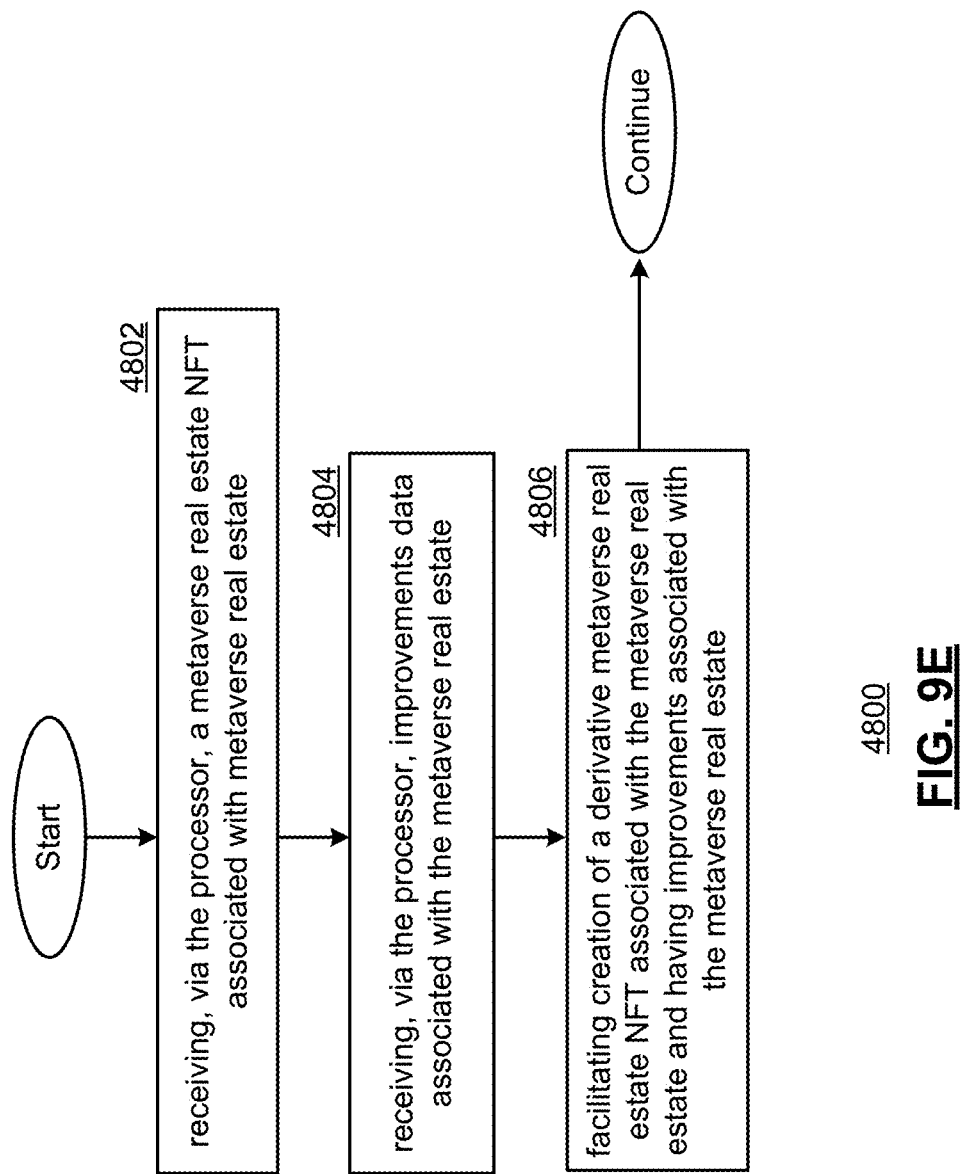

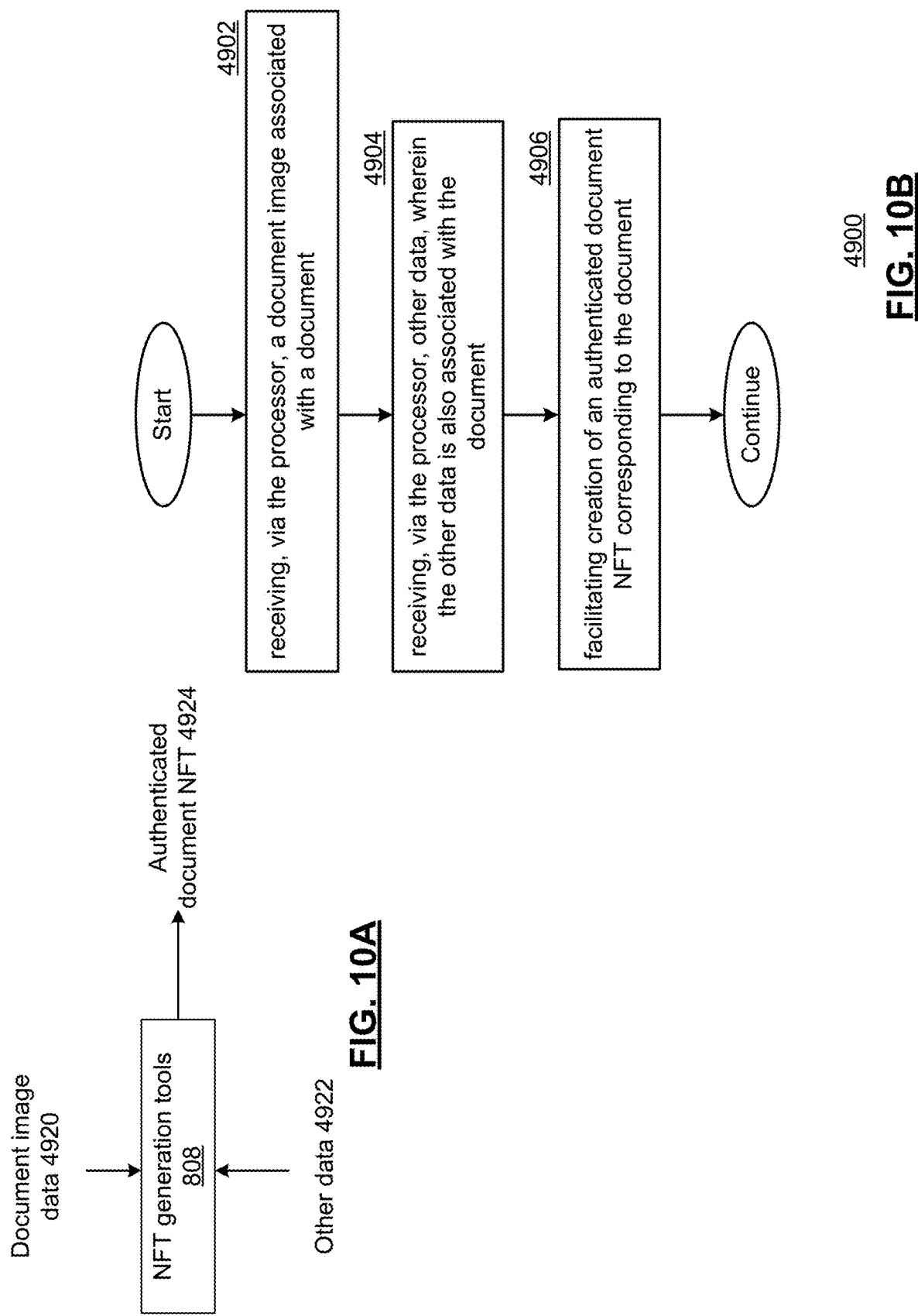

6200-10

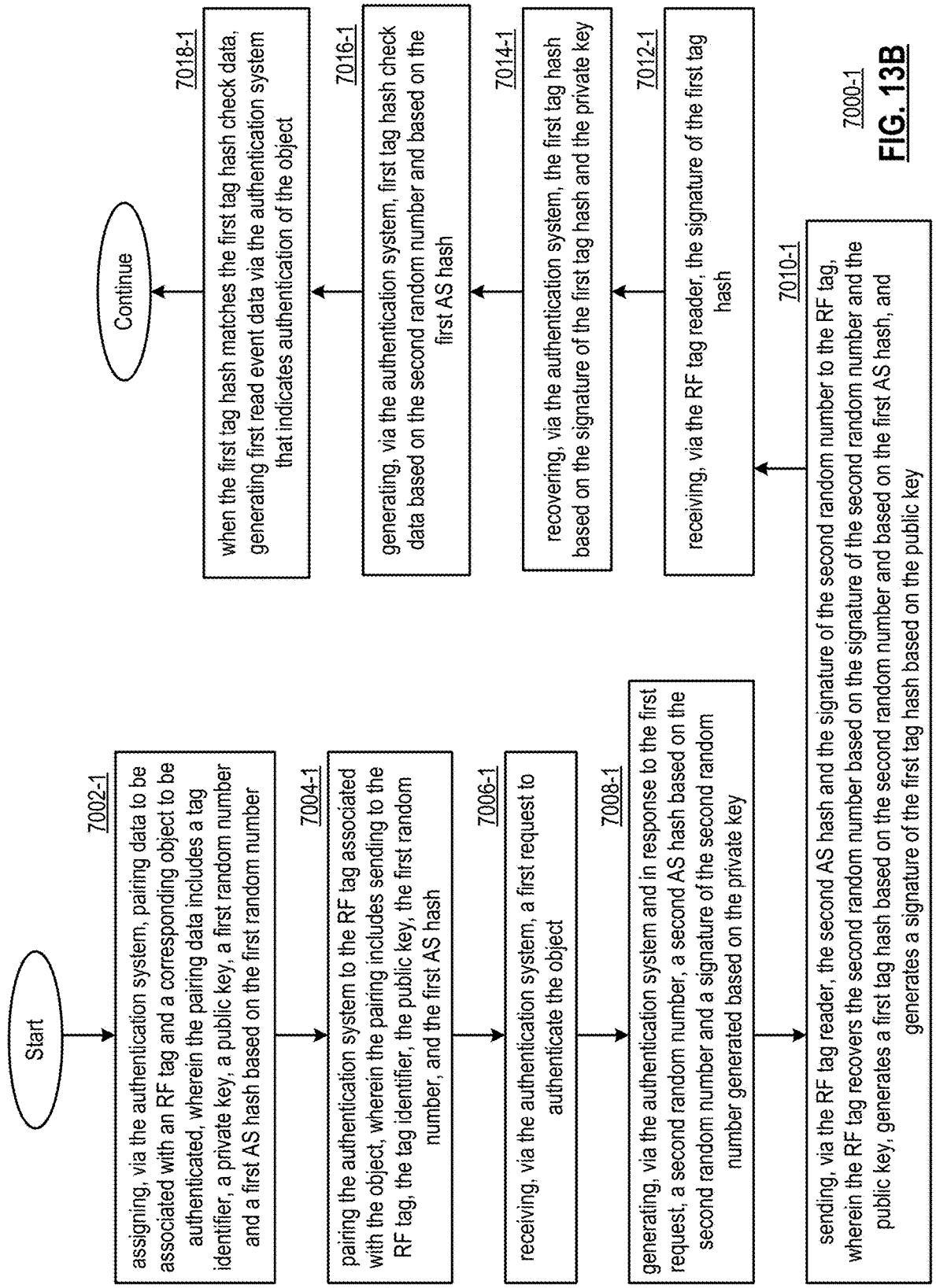

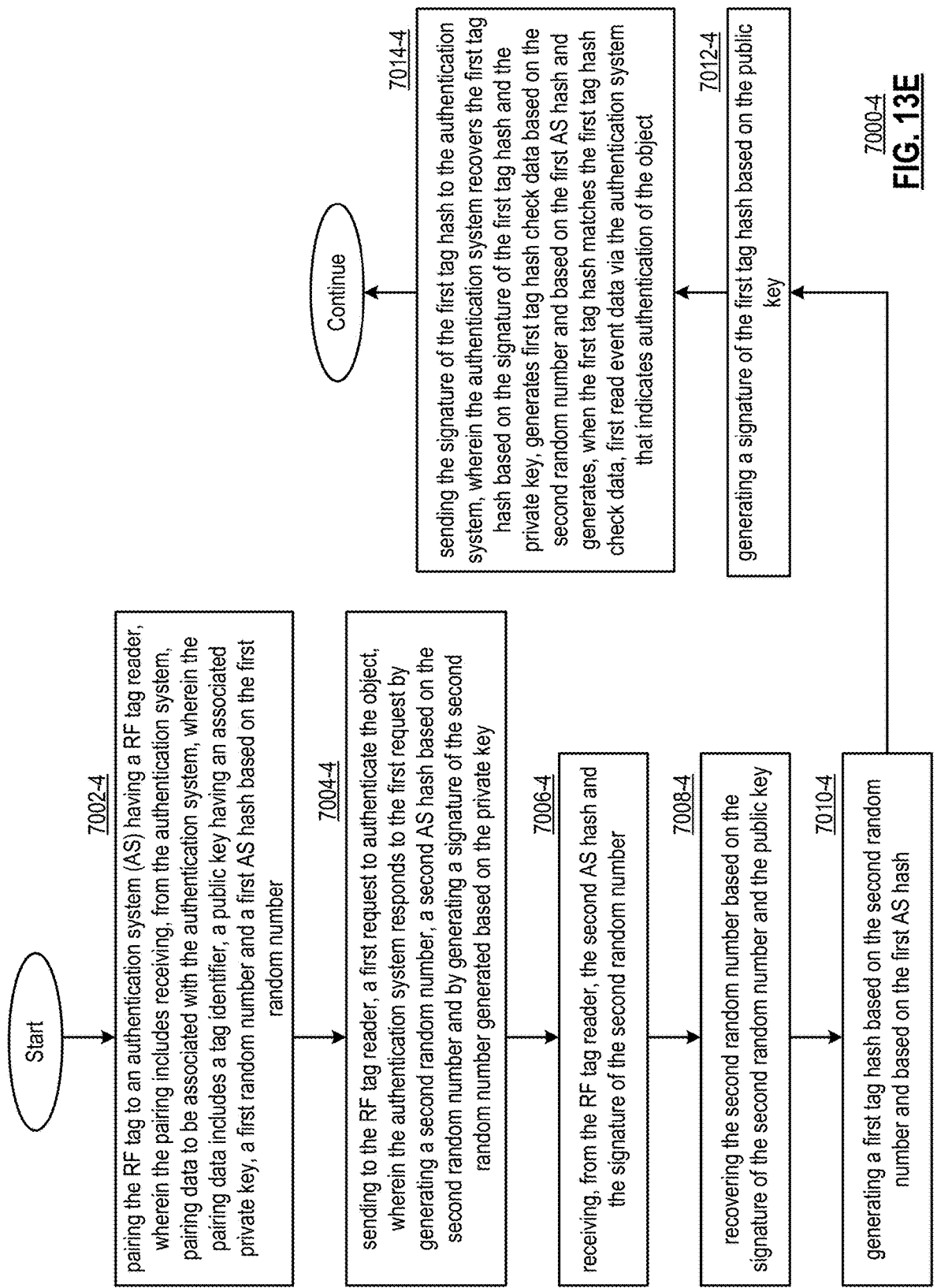

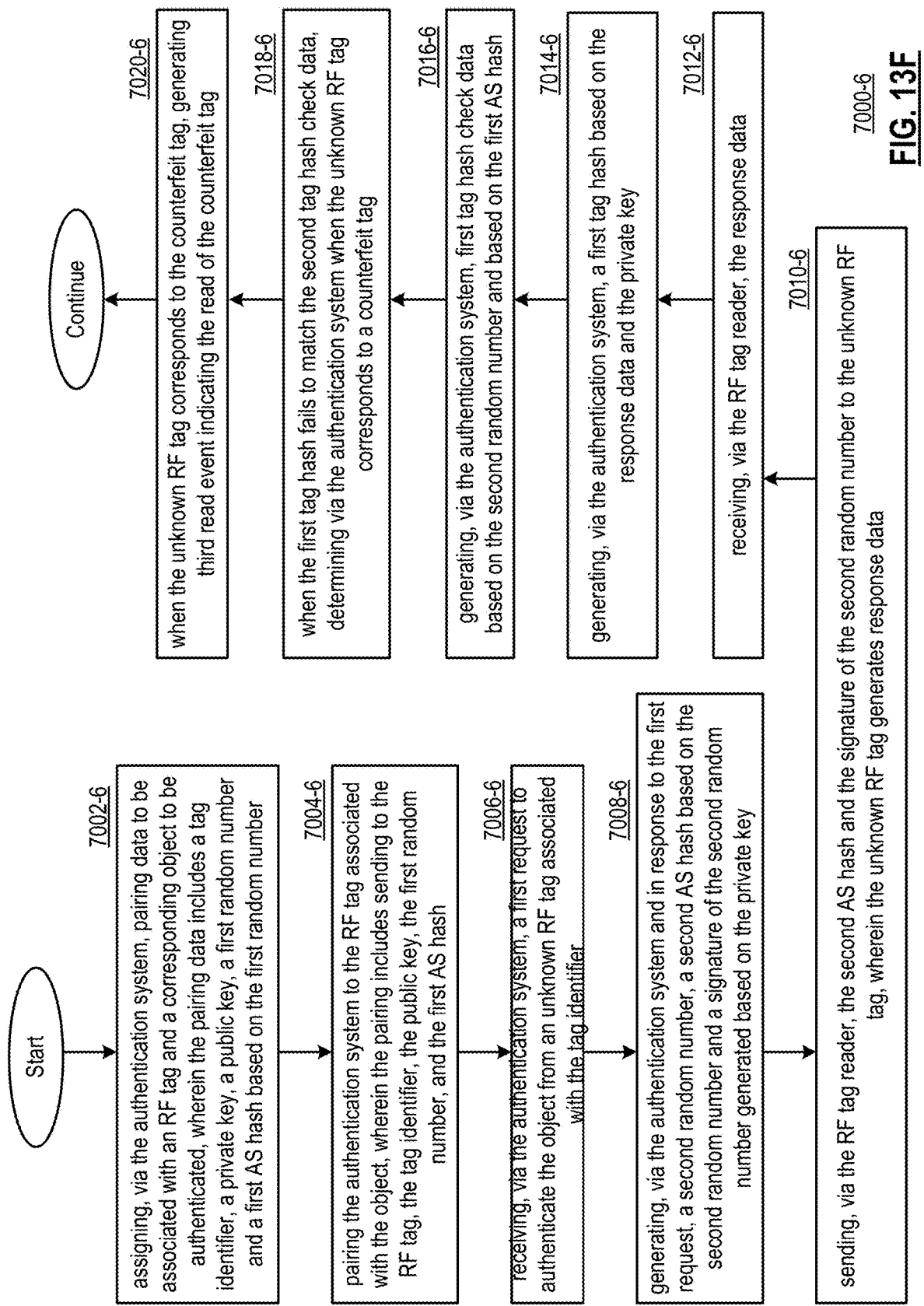

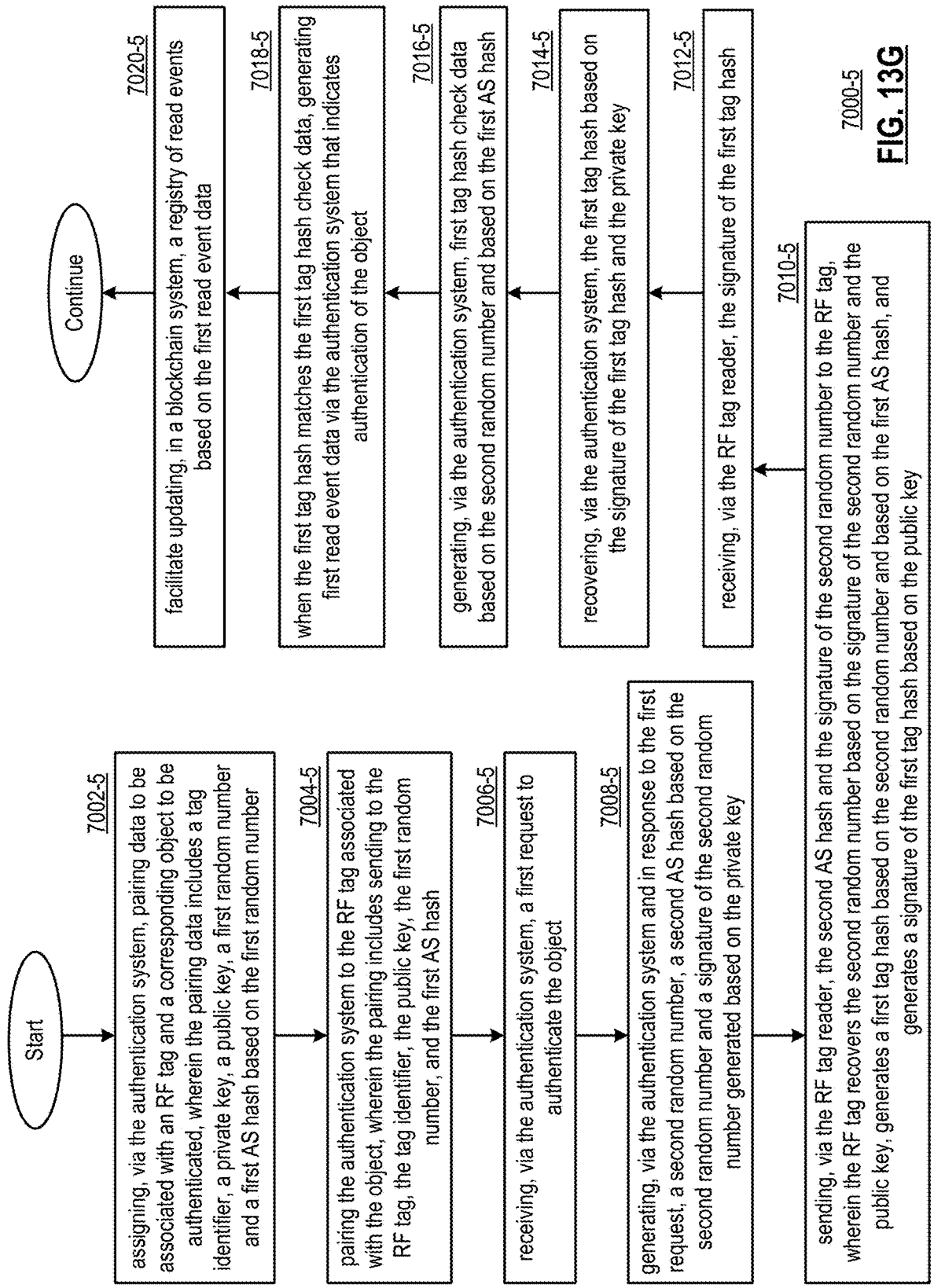

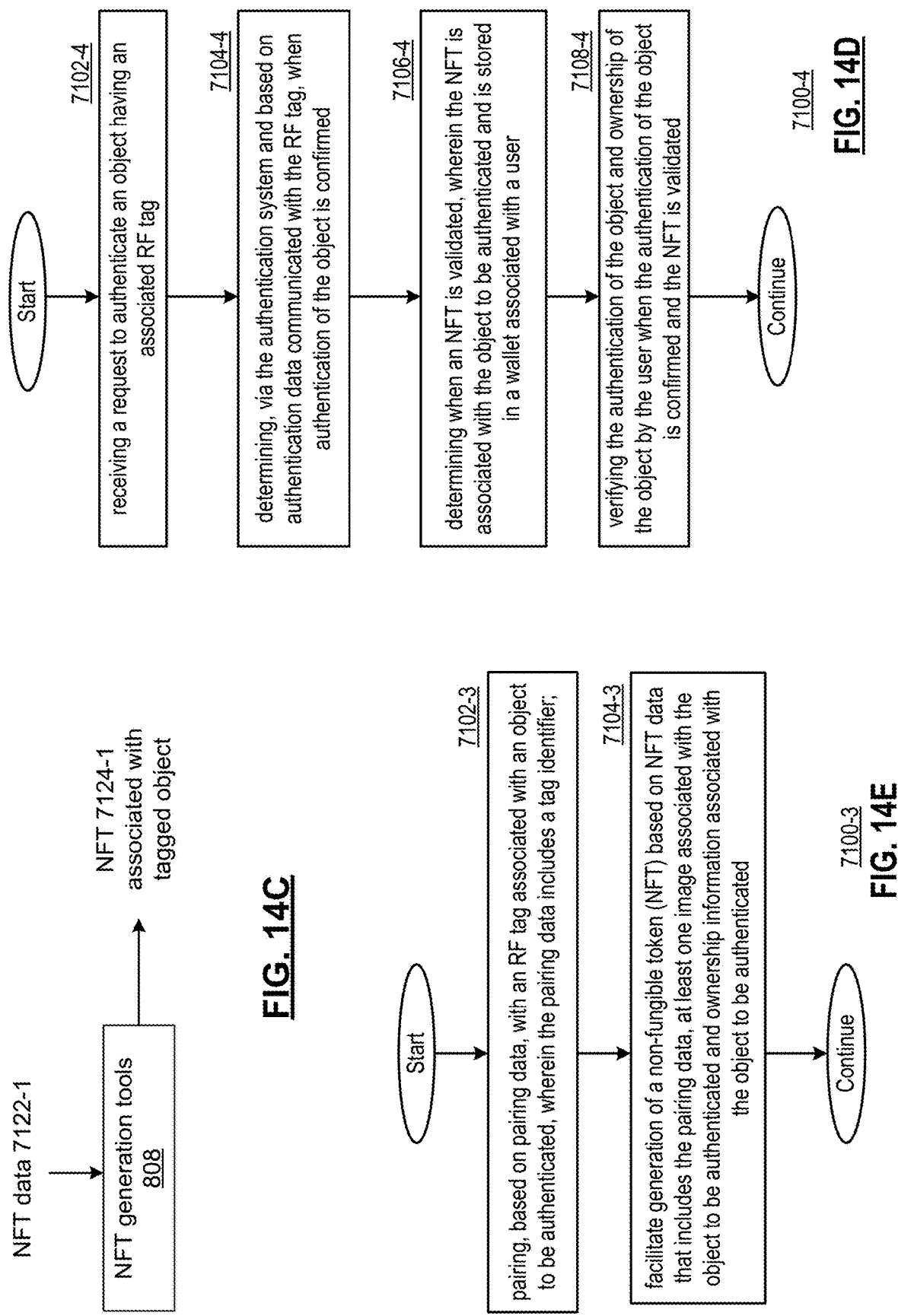

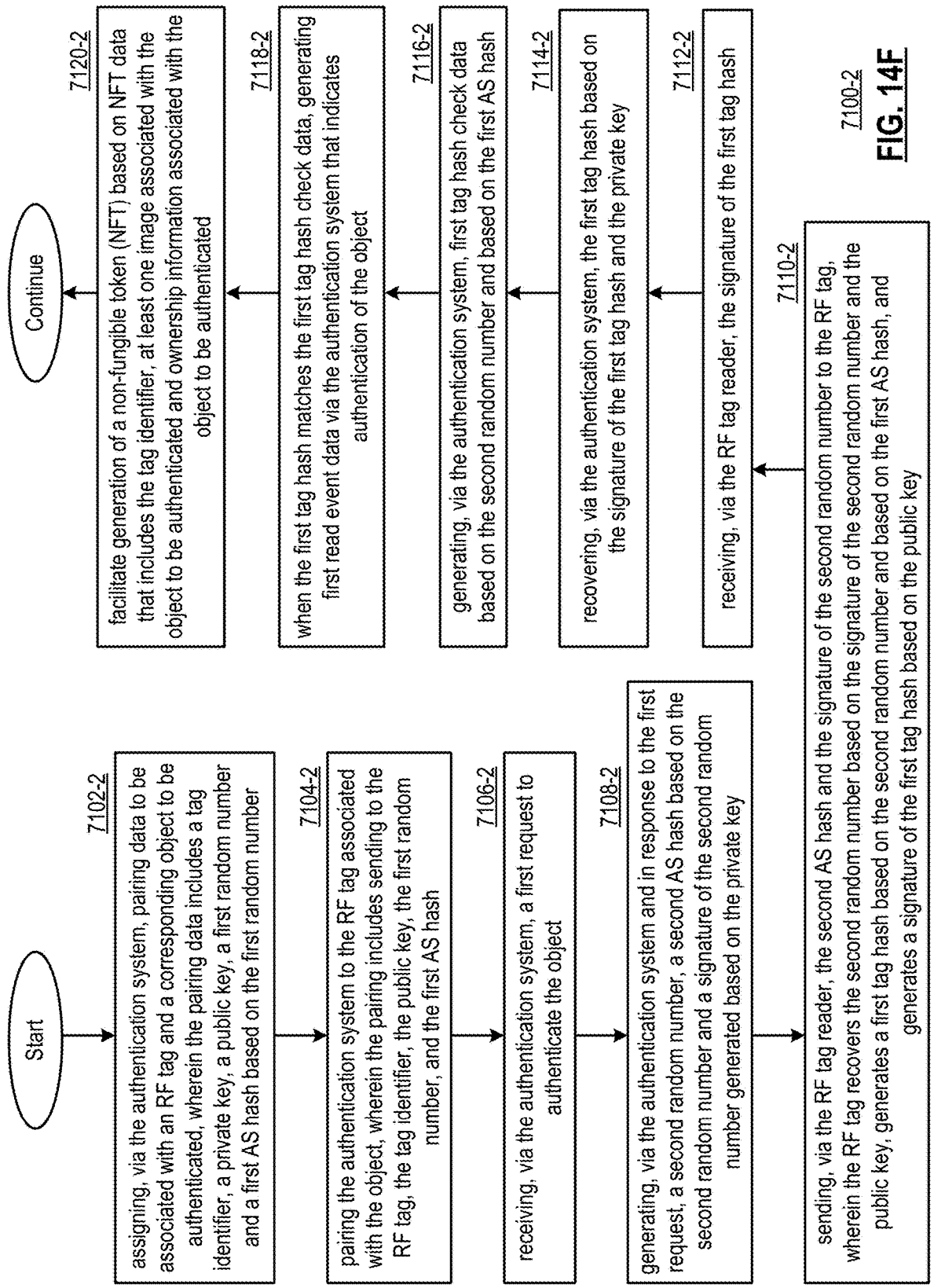

NFT-BASED AUTHENTICATION SYSTEM FOR TAGGED OBJECTS AND METHODS FOR USE THEREWITH

CROSS-REFERENCE TO RELATED APPLICATIONS

The present U.S. Utility patent application claims priority pursuant to 35 U.S.C. § 120 as a continuation-in-part of U.S. Utility application Ser. No. 17/819,016, entitled "GAME PLATFORM USING PLAYER TOKEN NFTS AND METHODS FOR USE THEREWITH", filed Aug. 11, 2022, which claims priority pursuant to 35 U.S.C. § 119(e) to U.S. Provisional Application No. 63/364,568, entitled "NFT GAME PLATFORM WITH MULTIPLAYER SUPPORT AND METHODS FOR USE THEREWITH", filed May 12, 2022; U.S. Provisional Application No. 63/364,571, entitled "NFT GAME PLATFORM USING GAME TOKEN NFTS AND METHODS FOR USE THEREWITH", filed May 12, 2022; U.S. Provisional Application No. 63/364,573, entitled "NFT GAME PLATFORM USING PLAYER TOKEN NFTS AND METHODS FOR USE THEREWITH", filed May 12, 2022; and U.S. Provisional Application No. 63/364,578, entitled "NFT GAME PLATFORM USING PLAYER TOKEN NF TS OR GAME TOKEN NFTS AND METHODS FOR USE THEREWITH", filed May 12, 2022, all of which are hereby incorporated herein by reference in their entirety and made part of the present U.S. Utility patent application for all purposes.

U.S. Utility application Ser. No. 17/819,016 also claims priority pursuant to 35 U.S.C. § 120 as a continuation-in-part of U.S. Utility application Ser. No. 17/806,766, entitled "SYSTEM FOR VALIDATING TICKET TRANSACTIONS VIA TICKET NFTS AND METHODS FOR USE THEREWITH", filed Jun. 14, 2022, which is a continuation-in-part of U.S. Utility application Ser. No. 17/661,362, entitled "SYSTEM FOR VALIDATING PLAY OF GAME APPLICATIONS VIA GAME NFTS AND METHODS FOR USE THEREWITH", filed Apr. 29, 2022, which claims priority pursuant to 35 U.S.C. § 119(e) to U.S. Provisional Application No. 63/362,581, entitled "SYSTEM FOR VALIDATING PLAY OF GAME APPLICATIONS VIA GAME NFTS AND METHODS FOR USE THEREWITH", filed Apr. 6, 2022, all of which are hereby incorporated herein by reference in their entirety and made part of the present U.S. Utility patent application for all purposes.

U.S. Utility application Ser. No. 17/661,362 also claims priority pursuant to 35 U.S.C. § 120 as a continuation-in-part of U.S. Utility application Ser. No. 17/656,084, entitled "FACILITATING PLAY OF GAME NFTS VIA A CLIENT DEVICE", filed Mar. 23, 2022, which claims priority pursuant to 35 U.S.C. § 119(e) to U.S. Provisional Application No. 63/262,536, entitled "NFT COLLECTION PLATFORM AND METHODS FOR USE THEREWITH", filed Oct. 14, 2021; U.S. Provisional Application No. 63/262,762, entitled "NFT COLLECTION PLATFORM FOR PROCESSING NFTS AND DATA AND METHODS FOR USE THEREWITH", filed Oct. 20, 2021; U.S. Provisional Application No. 63/262,858, entitled "NFT COLLECTION PLATFORM FOR PROCESSING NFTS AND DATA AND METHODS FOR USE THEREWITH", filed Oct. 21, 2021; U.S. Provisional Application No. 63/263,844, entitled "NFT COLLECTION PLATFORM FOR RENDERING NFTS IN AN ENVIRONMENT AND METHODS FOR USE THEREWITH", filed Nov. 10, 2021; U.S. Provisional Application No. 63/264,811, entitled "CLIENT DEVICE FOR NFTS AND METHODS FOR USE THEREWITH", filed Dec. 2, 2021; U.S. Provisional Application No. 63/265,754, entitled "REAL ESTATE NFTS AND METHODS FOR USE THEREWITH", filed Dec. 20, 2021; U.S. Provisional Application No. 63/266,478, entitled "AUTHENTICATED LICENSE NFTS AND METHODS FOR USE THEREWITH", filed Jan. 6, 2022; U.S. Provisional Application No. 63/297,394, entitled "GENERATION OF ENHANCEMENT NF TS AND METHODS FOR USE THEREWITH", filed Jan. 7, 2022; U.S. Provisional Application No. 63/302,757, entitled "GENERATION OF NFT GALLERIES AND METHODS FOR USE THEREWITH", filed Jan. 25, 2022; U.S. Provisional Application No. 63/302,768, entitled "ENHANCEMENT OF REAL ESTATE NFTS VIA NFT GALLERIES", filed Jan. 25, 2022; U.S. Provisional Application No. 63/305,559, entitled "AUTHENTICATING NFT TRANSACTIONS VIA CONDITIONAL NFTS", filed Feb. 1, 2022; U.S. Provisional Application No. 63/305,505, entitled "GENERATING A SECURE REAL-TIME NFT REPOSITORY FOR AUTHENTICATING NFT TRANSACTIONS", filed Feb. 1, 2022; U.S. Provisional Application No. 63/306,405, entitled "GENERATING NFTS WITH FRACTIONAL RIGHTS IN ASSETS", filed Feb. 3, 2022; U.S. Provisional Application No. 63/306,412, entitled "GENERATING NF TS WITH FRACTIONAL RIGHTS IN A COLLECTABLE", filed Feb. 3, 2022; U.S. Provisional Application No. 63/307,349, entitled "STREAMING OF VIDEO NFTS TO A CLIENT DEVICE", filed Feb. 7, 2022; U.S. Provisional Application No. 63/308,546, entitled "NODE NFTS WITH TRANSACTION UPDATES", filed Feb. 10, 2022; U.S. Provisional Application No. 63/309,382, entitled "GENERATING PLAYABLE GAME NFTS", filed Feb. 11, 2022; and U.S. Provisional Application No. 63/310,376, entitled "GENERATING UPDATED TEAM NFTS BASED ON TEAM DATA", filed Feb. 15, 2022, all of which are hereby incorporated herein by reference in their entirety and made part of the present U.S. Utility patent application for all purposes.

U.S. Utility application Ser. No. 17/806,766 claims priority pursuant to 35 U.S.C. § 119(e) to U.S. Provisional Application No. 63/365,010, entitled "SYSTEM FOR VALIDATING TICKET TRANSACTIONS VIA TICKET NFTS AND METHODS FOR USE THEREWITH", filed May 19, 2022; and U.S. Provisional Application No. 63/365,012, entitled "METHOD AND SYSTEM FOR AUTHENTICATING TICKET NFT TRANSACTIONS IN REAL-TIME", filed May 19, 2022, both of which are hereby incorporated herein by reference in their entirety and made part of the present U.S. Utility patent application for all purposes.

The present U.S. Utility patent application claims priority pursuant to 35 U.S.C. § 119(e) to U.S. Provisional Application No. 63/373,231, entitled "NFT-BASED AUTHENTICATION SYSTEM FOR TAGGED OBJECTS AND METHODS FOR USE THEREWITH", filed Aug. 23, 2022; and U.S. Provisional Application No. 63/373,230, entitled "TAG-BASED AUTHENTICATION SYSTEM AND METHODS FOR USE THEREWITH", filed Aug. 23, 2022, both of which are hereby incorporated herein by reference in their entirety and made part of the present U.S. Utility patent application for all purposes.

TECHNICAL FIELD

The present disclosure relates to processing systems and applications used in the collection, generation, display and use of non-fungible tokens (NFTs) or other digital tokens.

BRIEF DESCRIPTION OF THE SEVERAL VIEWS OF THE DRAWINGS

FIG. 3A presents a flowchart representation of an example method.

FIG. 3I presents a flowchart representation of an example method.

FIG. 4A presents a flowchart representation of an example method.

FIG. 5A presents a flowchart representation of an example method.

FIG. 7 presents a block diagram representation of an example system.

FIG. 9E presents a flowchart representation of an example method.

FIG. 10A presents a block diagram/flow representation of an example of NFT generation.

FIG. 10B presents a flowchart representation of an example method.

FIG. 13B presents a flowchart representation of an example method.

FIG. 13E presents a flowchart representation of an example method.

FIG. 13F presents a flowchart representation of an example method.

FIG. 13G presents a flowchart representation of an example method.

FIG. 14C presents a block diagram representation of an example of NFT generation.

FIG. 14D presents a flowchart representation of an example method.

FIG. 14E presents a flowchart representation of an example method.

FIG. 14F presents a flowchart representation of an example method.

DETAILED DESCRIPTION

Figure 1A:
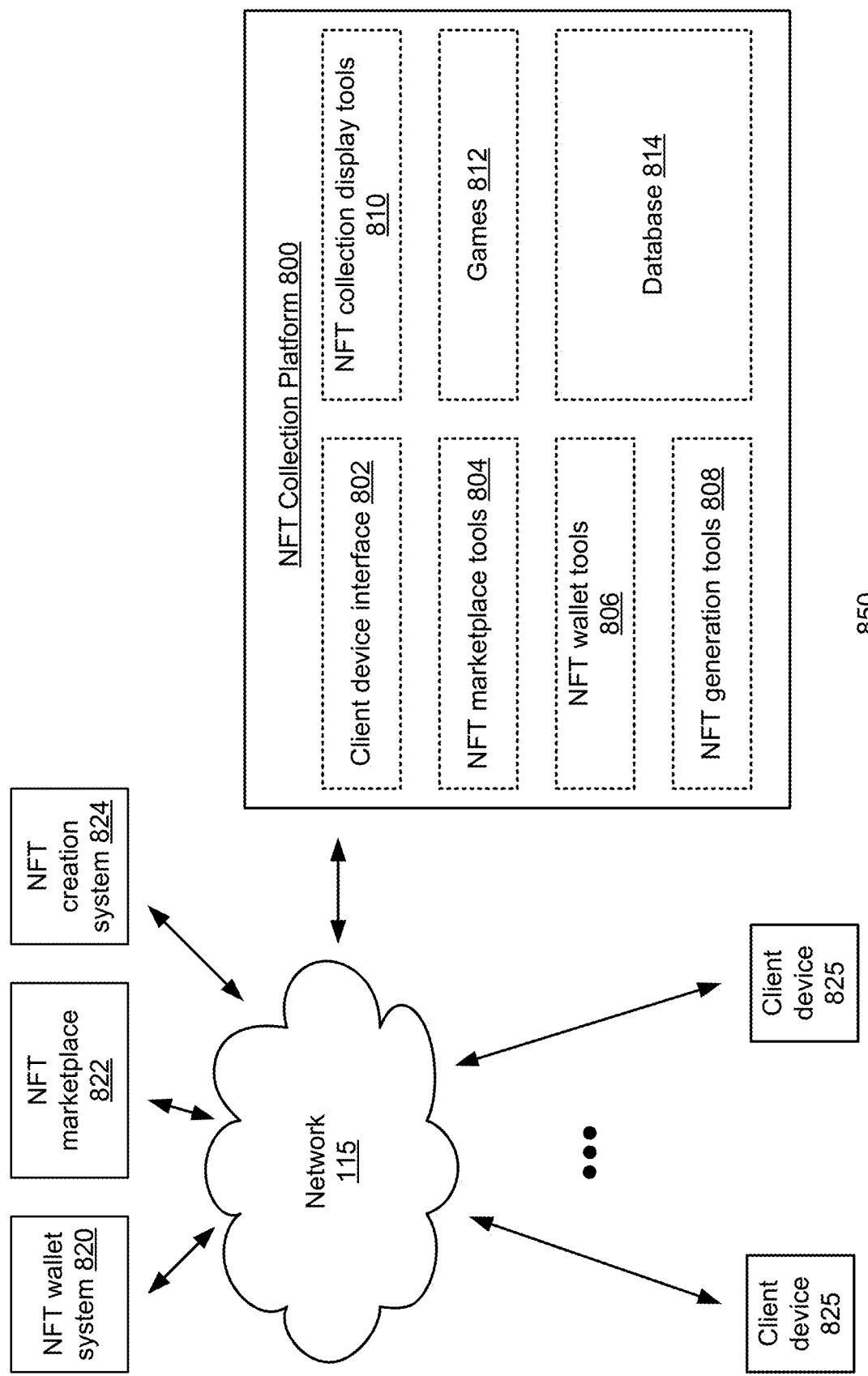
FIG. 1A presents a block diagram representation of an example system.

FIG. 1A presents a block diagram representation of an example system in accordance with various examples. In particular, a system 850 is presented that includes an NFT collection platform 800 that communicates with client devices 825 via a network 115. The network 115 can be the Internet or other wide area or local area network, either public or private. The client devices 825 can be computing devices such as laptops, smartphones, smart watches, tablets, desktops, or other computing devices associated with users, for example, buyers, sellers, collectors and/or users of NFTs.

NFT creation and ownership is growing worldwide. Existing platforms provide tools to create NFTs, marketplaces for buying and selling NFTs and wallets to securely hold them. Many NFT purchasers however, view NFTs similarly to cryptocurrency, purely as financial investments to be collected and later sold. Unlike cryptocurrencies which are fungible tokens, NFTs have a non-fungible (e.g. unique or limited) component that can correspond to photographs, graphics, art, video, games or other media or imagery that can be displayed, used in authentication and/or to provide other support for transactions and/or used in game play and for other utilitarian purposes, etc.

In the example shown, the NFT collection platform 800 includes a client device interface 802 for interacting with the client devices 825, NFT marketplace tools 804, NFT wallet tools 806, NFT generation tools 808, NFT collection display tools 810, one or more games 812 that can be played using NFTs that have been collected including game NFTs that include and/or otherwise associated with, or correspond to, playable game content, and a database 814 for storing user and account information, preferences, display settings and other data associated with users of the NFT collection platform 800. The NFT collection platform 800 can include or be implemented via one or more servers, a cloud computing system, an InterPlanetary File System (IPFS) or other decentralized or distributed computer system of individual computers and/or nodes and/or a centralized computing system.

For example, the client device interface 802 can operate in conjunction with each client device 825 and via network 115 to generate a graphical user interface. This graphical user interface is based on display data generated by the NFT collection platform 800 in a format for display on a display device associated with the client devices 825. This graphical user interface generates input data that is received by the NFT collection platform 800 from the client devices 825 in response to user interaction with the graphical user interface.

In various examples, the NFT collection platform 800 can serve the needs of a collector of NFTs by providing a system that offers new experiences that support various collector and/or use behaviors in the NFT world and metaverse including the collection, display, and use of NFTs and their corresponding content. The NFT collection display tools 810 can include a high-fidelity customizable page builder so each collector can personalize and display their NFTs in an environment. The NFT collection platform 800 can provide and support a collection social media site that, for example, is similar to MySpace, Facebook, or OnlyFans, but specifically directed to the arrangement, posting, sharing and/or display of collections of NFTs.

In the most basic mode of operation, the NFT collection platform 800 improves the technology of NFT systems by allowing the user to collect, arrange and display NFTs they have purchased so that the user, and other users, can enjoy and admire the NFTs they have collected. The NFT collection platform 800 not only allows users to curate, display and use their collections, to play games associated with their NFTs and/or also allows users to create a social/professional profile of their NFT property—enabling users to get creative with how their collections are presented, used and displayed. In addition, when a group of NFTs is collected and/or when a personalized/curated collection page, set and/or collection display is built, the NFT collection platform 800 improves the technology of NFT systems by allowing the user to mint a new "collection NFT" using blockchain-based, distributed computer network, and/or other crypto-based NFT creation techniques, for example and authenticated based on the user's ownership of the underlying NFTs.

Furthermore, the NFT collection platform 800 allows users to buy, sell, loan, borrow and trade NFTs with other users, including their own collection NFTs created based on their own collections. In various examples, the NFT collection platform 800 may not include a NFT creator, marketplace or wallet itself. The NFT generation tools 808, NFT wallet tools 806 and NFT marketplace tools 804 can reside on the NFT collection platform 800 and interface with one or more NFT wallet systems 820, NFT marketplaces 822 and/or NFT creation systems 824 to enable transactions/interactions/abilities at a metaverse level, offering collectors new and unique experiences, pre and post purchase, across all different NFT's and blockchains in one place. The NFT collection platform 800 improves the technology of NFT systems by allowing the user to perform the functions above in a fashion, that can be blockchain, wallet, and marketplace agnostic.

It should be noted that the system 850 can operate via blockchain-based technologies. In blockchain, a growing list of records, called "blocks", are linked together using cryptography and spread over a decentralized computer system/network or other distributed network of participants. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. The distributed nature of this process over different nodes, the contemporaneous nature of geographically distinct calculations, coupled with the extreme computational complexity of the required calculations means that these blockchain-based technologies cannot practically be performed by the human mind.

It should be noted, that while the NFT wallet system 820, NFT marketplace 822 and NFT creation system 824 are shown as separate entities and as being external to the NFT collection platform 800, other configurations are possible where two or more of these entities share a common platform and/or the functions and features of one or more of these entities can be incorporated within the NFT collection platform 800 itself.

It should also be noted that while client device interface 802, NFT marketplace tools 804, NFT wallet tools 806, NFT generation tools 808, NFT collection display tools 810, games 812 and database 814 are shown as being internal to the NFT collection platform 800, in other examples, any subset of the various elements of the NFT collection platform 800 can be implemented external to the NFT collection platform 800 and coupled to the other components via the network 115. Furthermore, the NFT collection platform 800 can be implemented in a cloud computing configuration with any or all of the various elements of the NFT collection platform 800 implemented within the cloud.

The further operation of this system will be described in greater detail in conjunction with the figures that that follow, including many optional functions and features and examples thereof.

Figure 1B:
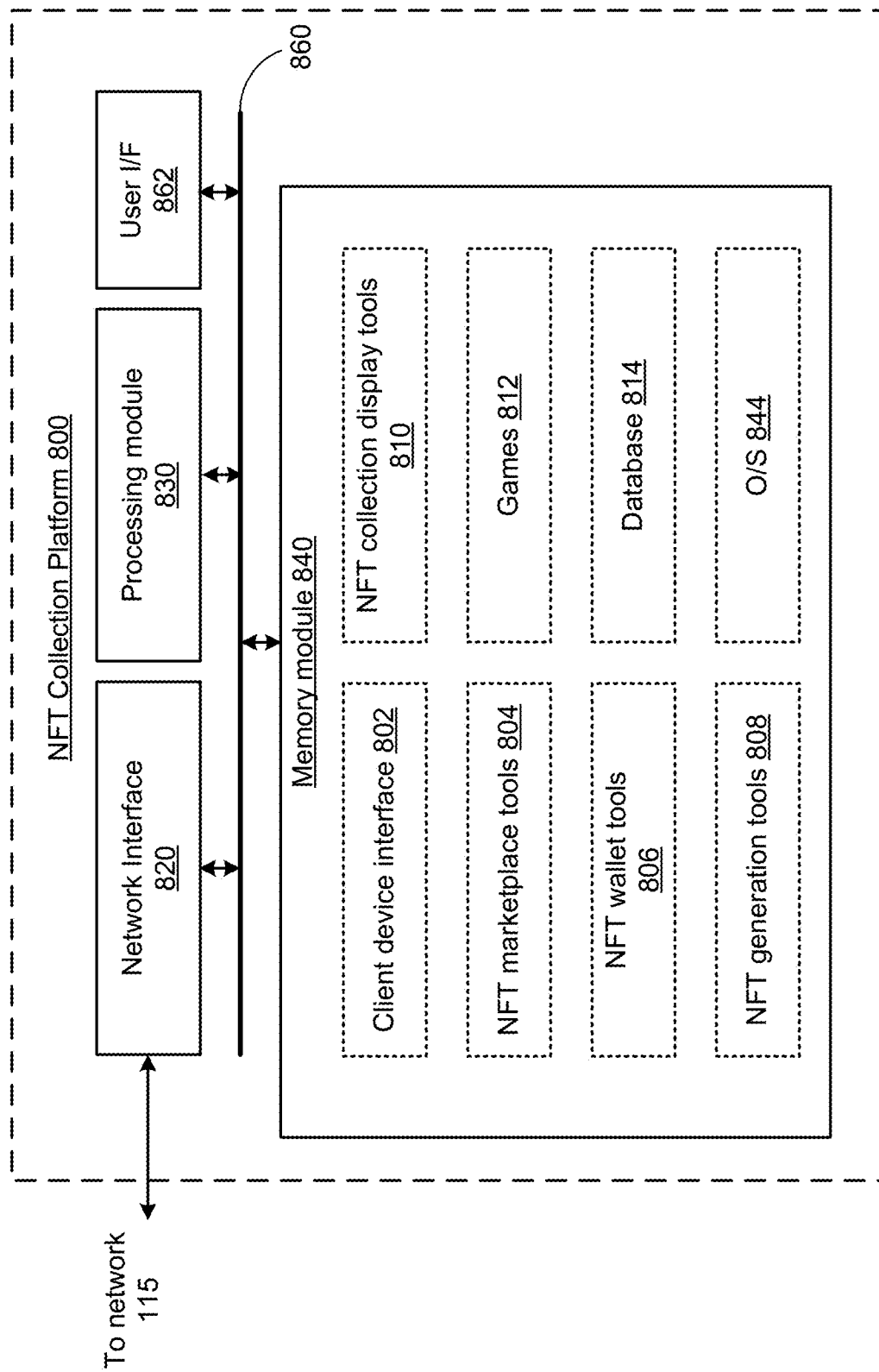
FIG. 1B presents a block diagram representation of an example non-fungible token (NFT) collection platform.

FIG. 1B presents a block diagram representation of an NFT collection platform 800 in accordance with various examples. In particular, the NFT collection platform 800 includes a network interface 820 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT collection platform 800 also includes a processing module 830 and memory module 840 that stores an operating system (O/S) 844 such as an Apple, Unix, Linux or Microsoft operating system or other operating system, client device interface 802, NFT marketplace tools 804, NFT wallet tools 806, NFT generation tools 808, NFT collection display tools 810, games 812 and database 814. In particular, the O/S 844, the client device interface 802, NFT marketplace tools 804, NFT wallet tools 806, NFT generation tools 808, NFT collection display tools 810, and games 812 each include operational instructions that, when executed by the processing module 830, cooperate to configure the processing module 830 into a special purpose device to perform the particular functions of the NFT collection platform 800 described herein.

The NFT collection platform 800 may include a user interface (I/F) 862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT collection platform 800 and that generate data in response to the administrator's interaction with NFT collection platform 800.

The processing module 830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 840. The memory module 840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 860, other architectures are possible including additional data buses and/or direct connectivity between one or more elements. Further, the NFT collection platform 800 can include one or more additional elements that are not specifically shown.

Figure 2:
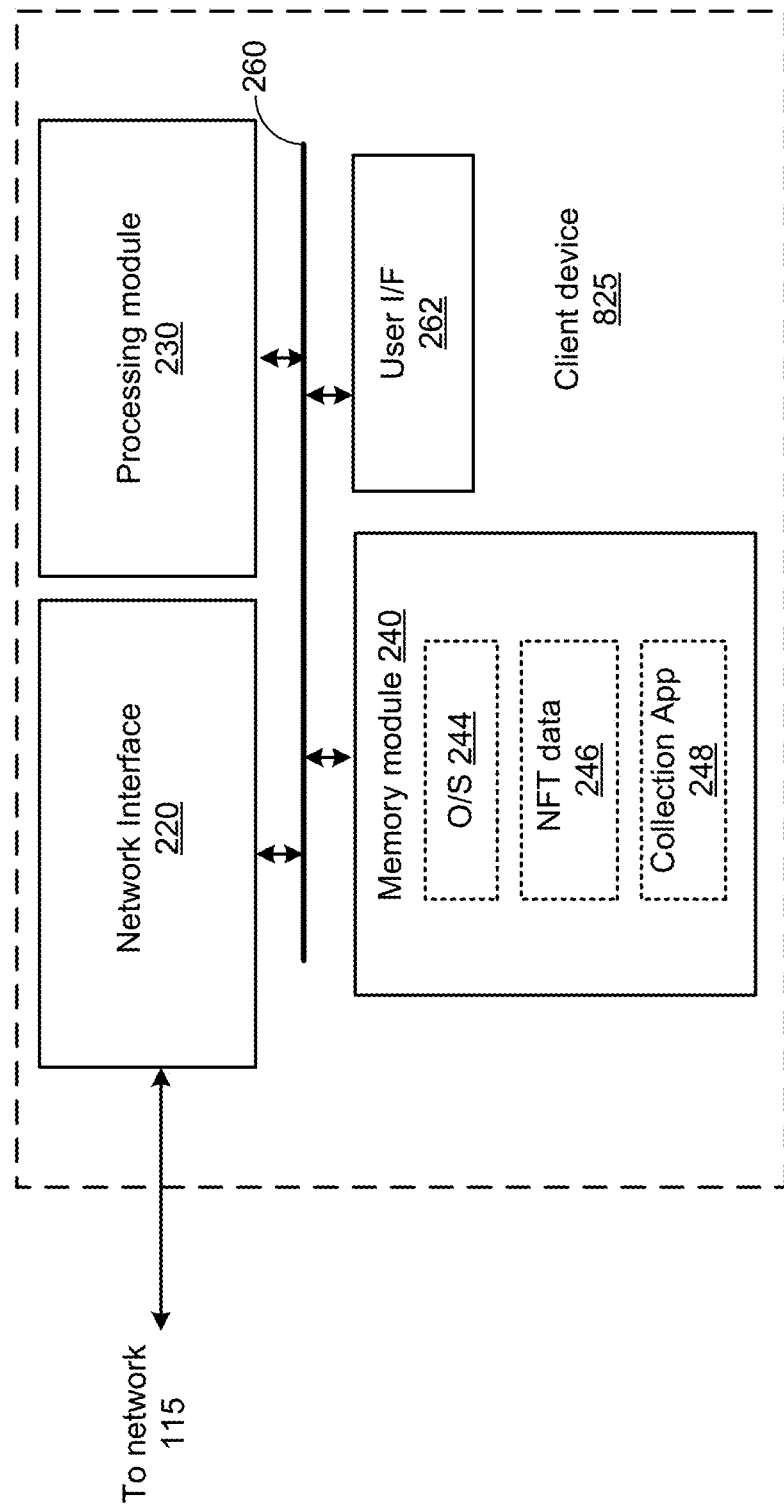
FIG. 2 presents a block diagram representation of an example client device.

FIG. 2 presents a block diagram representation of an example client device in accordance with various examples. In particular, a client device 825 is presented that includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The client device 825 also includes a processing module 230 and memory module 240 that stores an operating system (O/S) 244 such as an Apple, Unix, Linux or Microsoft operating system or other operating system, NFT data 246 associated with one or more NFTs owned by the user, and/or a collection applications 248. In particular, the O/S 244 and collection application 248 each include operational instructions that, when executed by the processing module 230, cooperate to configure the processing module into a special purpose device to perform the particular functions of the client device 825 described herein.

The client device 825 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the client device 825 and that generate data in response to the user's interaction with the client device 825.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the client device 825 can include one or more additional elements that are not specifically shown.

The client device 825 operates, via network interface 220, network 115 and NFT collection platform 800. In various examples, the client device 825 operates to display a graphical user interface generated based on display data from the NFT collection platform 800, including corresponding screen displays. Furthermore, the graphical user interface can operate in response to interactions by a user to generate input data that is sent to the NFT collection platform 800 to control the operation of the NFT collection platform 800 and/or to provide other input.

It should be noted that while the client devices 825 and NFT collection platform 800 are shown as separate devices that communicate via the network 115, it should be noted that any and all of the functionality attributed to the NFT collection platform 800, including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform and communications sent to a NFT collection platform from the client device 825.

FIG. 3A presents a flowchart representation of an example method in accordance with various examples. In particular, a method 300 for use in conjunction with any of the functions and features described herein for generating a collection NFT based on NFTs in a user's collection.

Step 302 includes importing, via a network interface, a plurality of NFTs associated with the user of the client device. Step 304 includes generating, via a processor and in response to user interactions with the graphical user interface, display data associated with a customized collection display that contains the plurality of NFTs. Step 306 includes sending, via the network interface, the display data associated with the customized collection display via the client device of the user. Step 308 includes facilitating creation of a collection NFT corresponding to the customized collection display that contains the plurality of NFTs.

FIGS. 3B-3F and 3H present pictorial representations of example screen displays. In particular, screen displays of a graphical user interface generated based on display data from the NFT collection platform 800 are shown. In the example below, three NFTs are used to design and create a new collection NFT based on a common theme, the 1999 Chicago Bulls team in the National Basketball association.

Figure 3B:
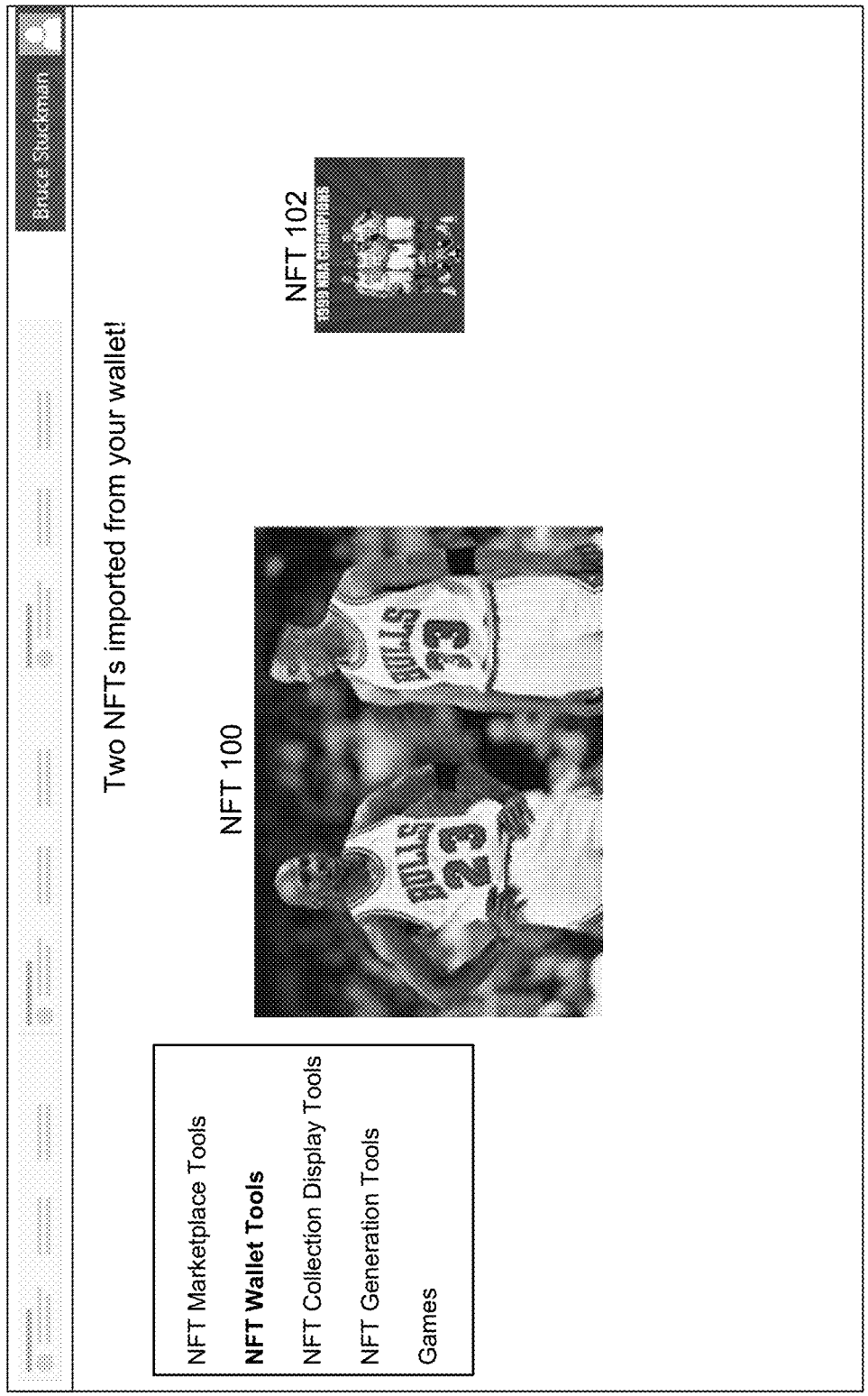
FIGS. 3B-3F and 3H present pictorial representations of example screen displays.

In FIG. 3B, the user "Bruce Stuckman" is logged into the NFT collection platform 800. The user has interacted with NFT wallet tools, such as NFT wallet tools 804, to import NFTs 100 and 102 from his wallet residing in NFT wallet system 820. In this example, the NFTs 100 and 102 are blockchain authenticated original photographs depicting two different images of the 1999 Chicago Bulls.

Figure 3C:
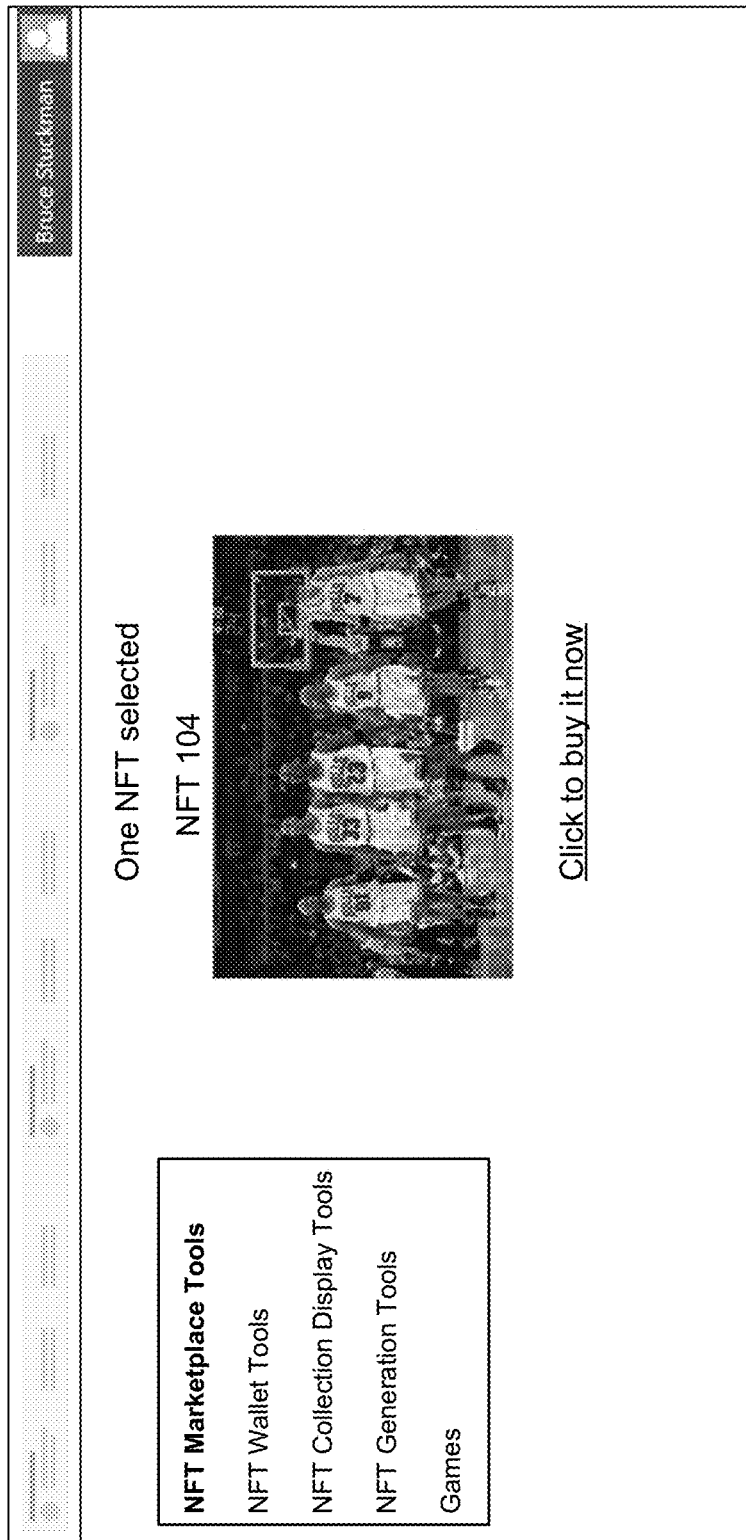
Figure 3D:
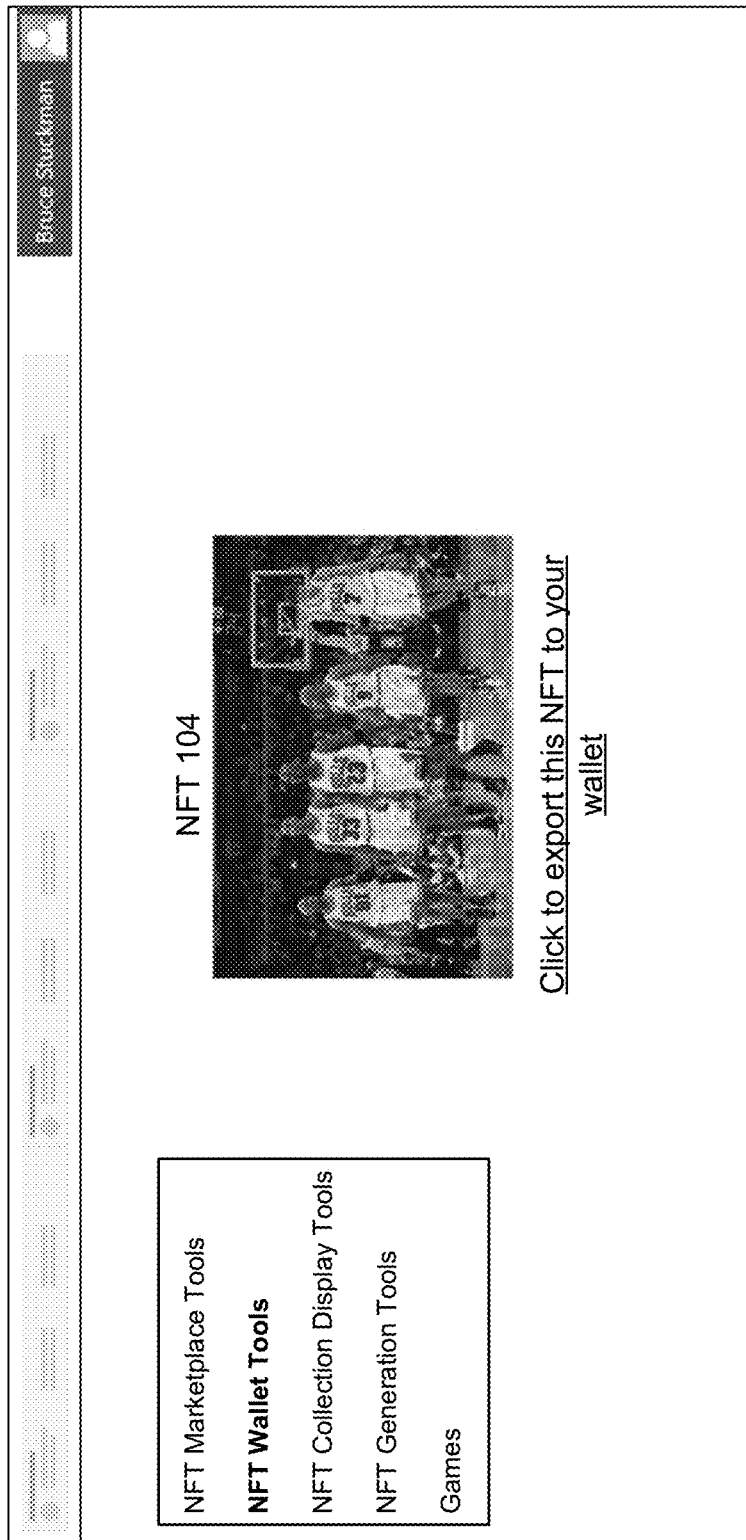
Figure 3E:
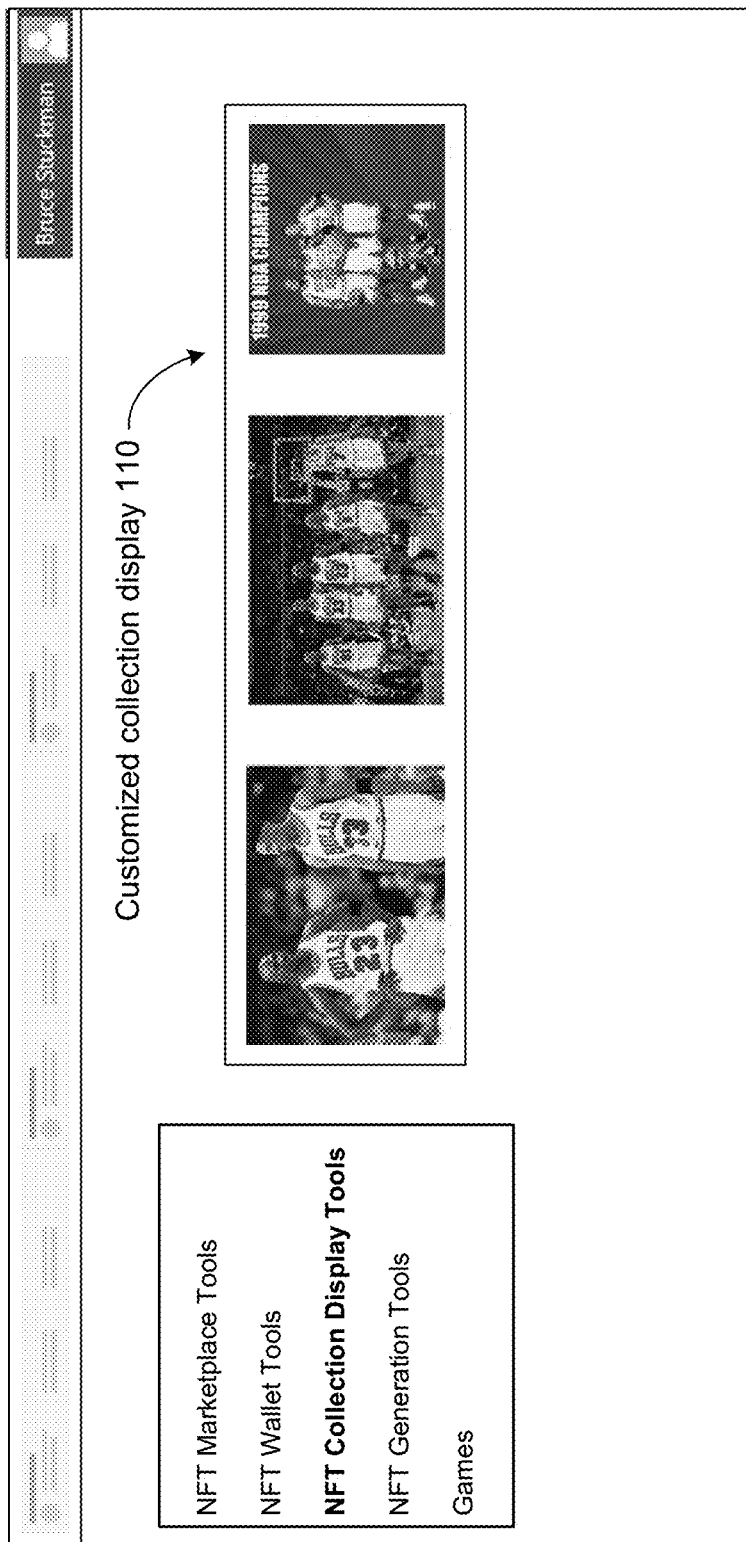

In FIG. 3C, the user has interacted with the NFT marketplace tools, such as NFT marketplace tools 804, to select a new NFT 104 for purchase via an NFT marketplace such as NFT marketplace 822. In FIG. 3D, the wallet tools are used again, this time to export the NFT 104 to the user's wallet. In FIG. 3E, the user has selected and used NFT collection display tools, such as NFT collection display tools 810, to create a customized collection display 110 contain all three 1999 Chicago Bulls-related NFTs he now owns. In the example shown, the user has "dragged and dropped" NFTs he owns in a custom display window and has sized and arranged them into the particular collage that is shown. In other examples, the NFT collection display tools 810 can operate, based on metadata associated with the NFTs of a user indicating content, theme, color themes, subject matter, dates of creation, authorship, ownership, prior ownership, number of prior owners, size, resolution, and other NFT information and metadata, to automatically generate arrangements of custom collection display 110 that may be accepted by the user and/or that may be further arranged by the user to create the final customized collection display 110.

Figure 3F:
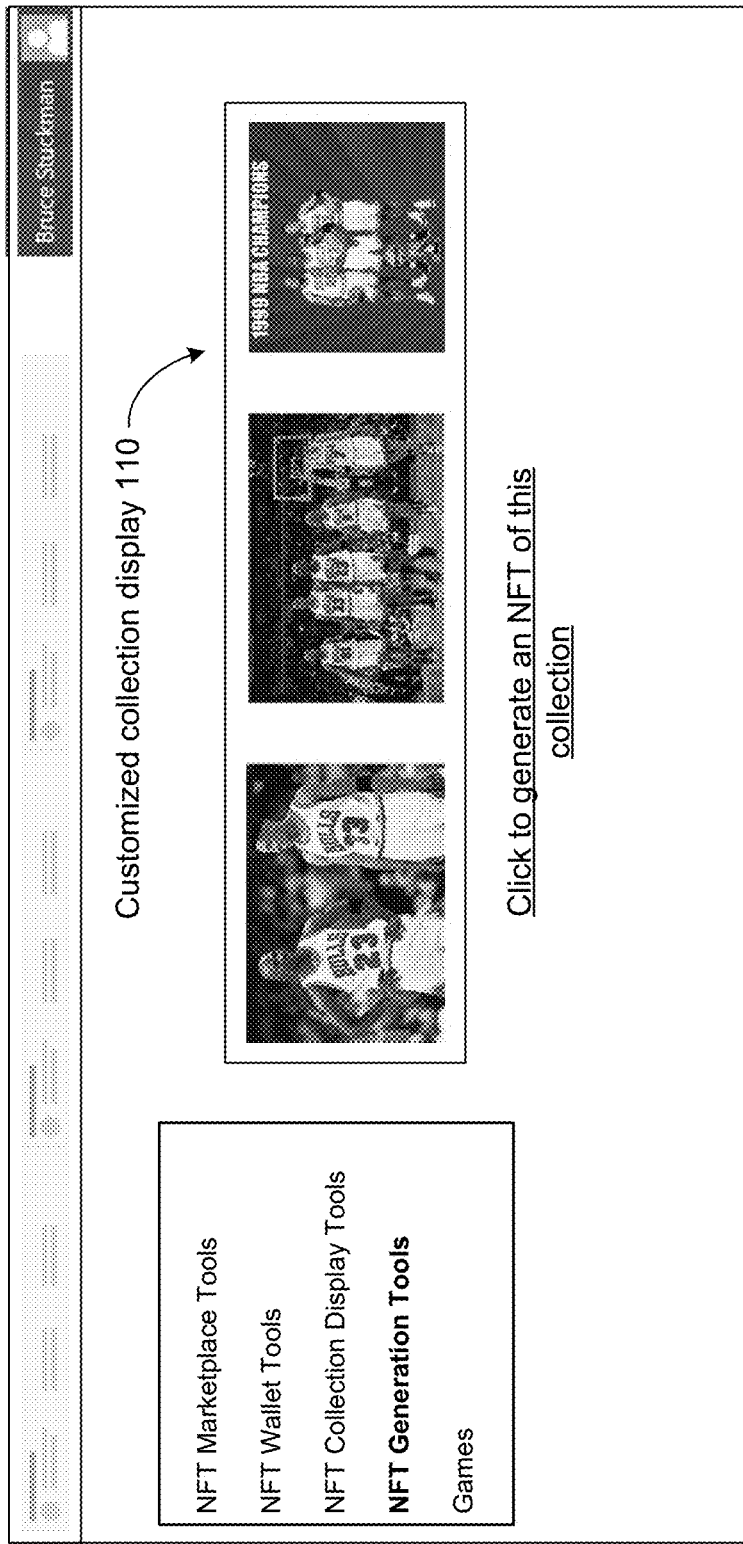

In FIG. 3F, the user has selected NFT generation tools, such as NFT generation tools 808, in order to facilitate, via NFT creation system 824 for example, the creation of a collection NFT from the customized collection display 110.

Figure 3G:
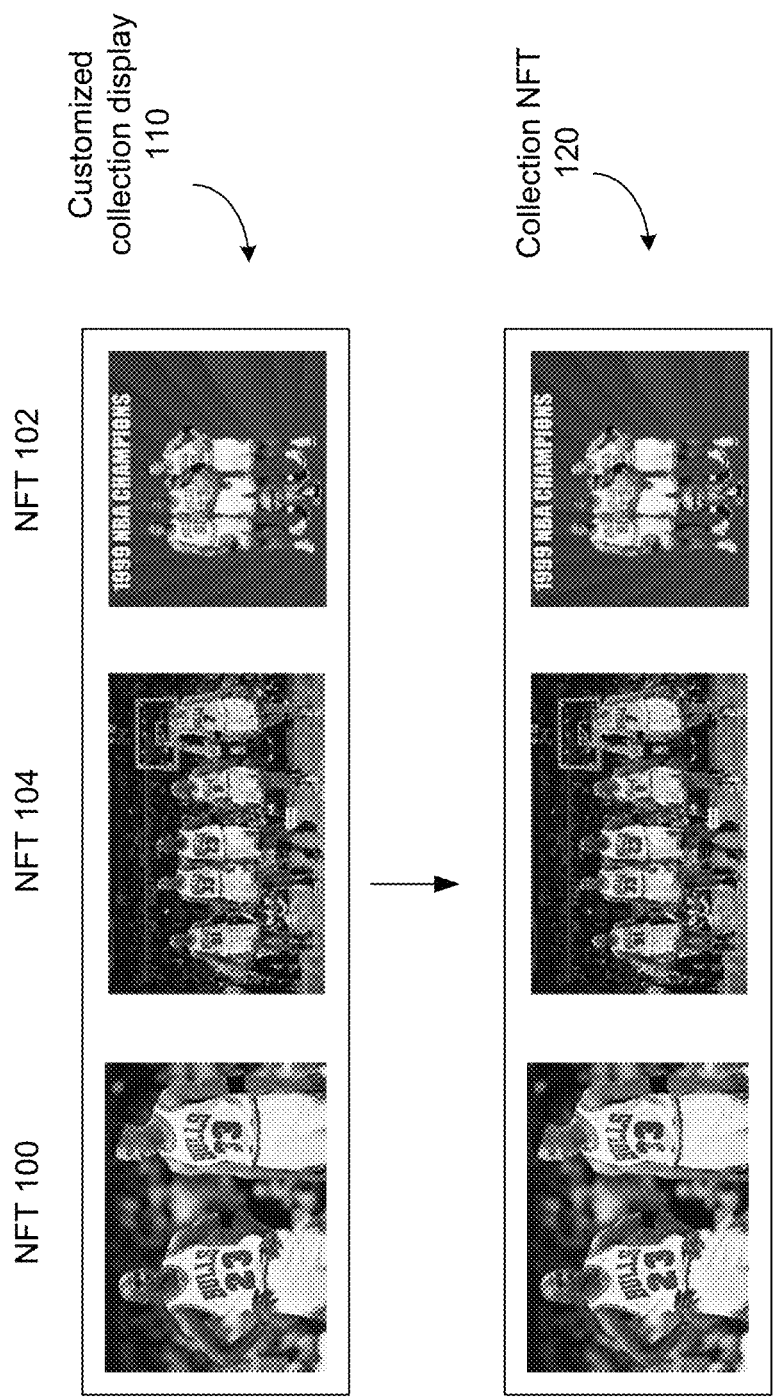
FIG. 3G presents a flow diagram representation of an example process.
Figure 3H:
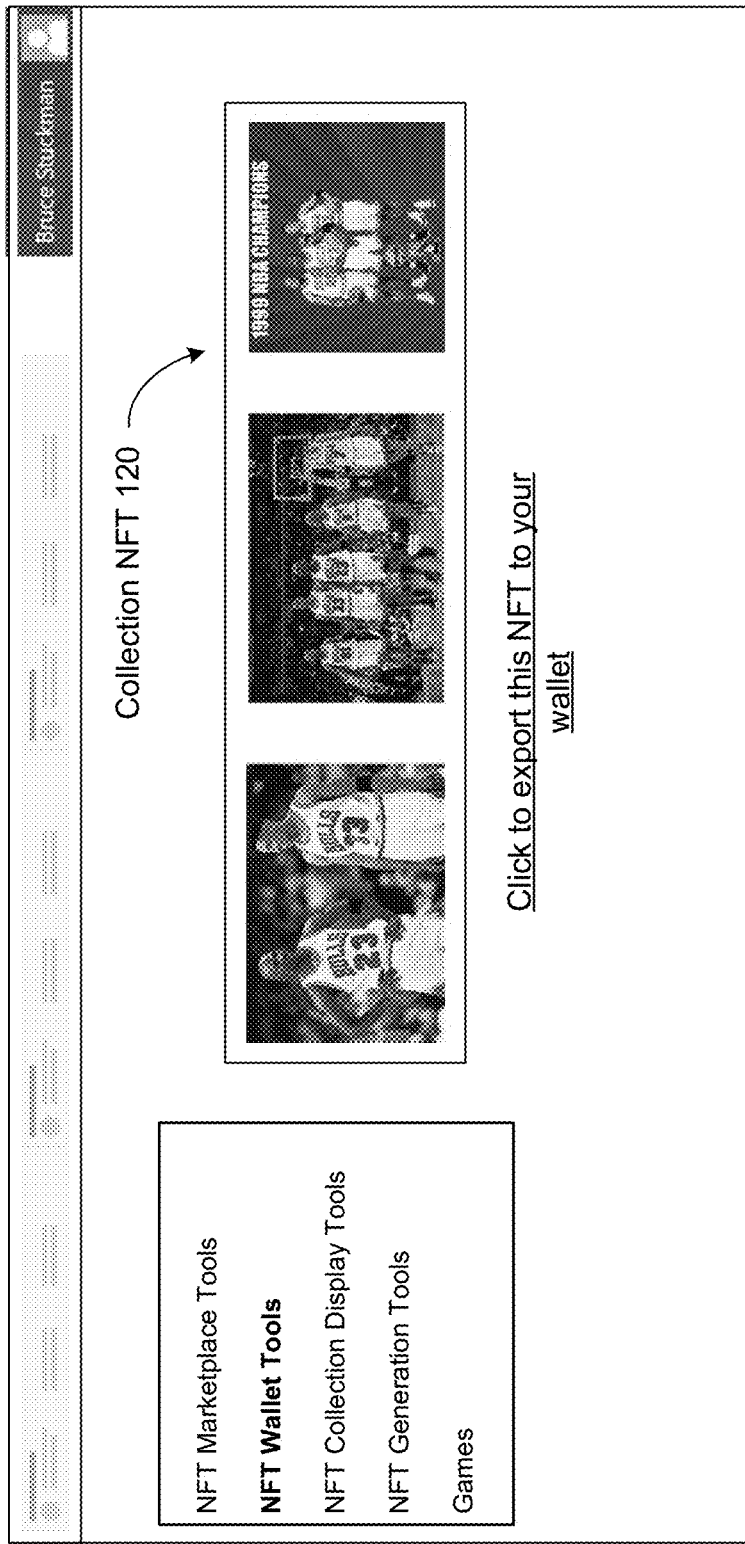

FIG. 3G presents a flow diagram representation of an example process. In the example shown, the collection NFT 120 is created from the customized collection display 110. As previously discussed, the NFT generation tools can operate by, for example, first authenticating the user's rights in the three NFTs and then creating, via NFT creation system 824, a new NFT of the unique customized image with its own blockchain authentication. In various examples, the collection NFT 120 can contain metadata indicating, for example attributions to the sources of the original NFTs in the collection, the creator of the collection NFT, a date of creation, promotion data and coupons related to offers, privileges and/or discounts, title data with respect to title to tangible or intangible real or personal property, warrant data with respect to tangible or intangible real or personal property, transaction data regarding one or more transactions, and/or other metadata. This metadata can be protected via the blockchain and/or other crypto-based NFT creation technology that is employed to create and protect the collection NFT itself—with or without associated image data. In FIG. 3H, the wallet tools are used again, this time to export the collection NFT 120 to the user's wallet.

FIG. 3I presents a flowchart representation of an example method in accordance with various examples. In particular, a method 310 is presented for use in conjunction with any of the functions and features described herein for generating a collection NFT based on NFTs in a user's collection.

Step 312 includes importing, via a network interface, a plurality of NFTs associated with the user of the client device. Step 314 includes generating, via a processor and in response to metadata associated with the plurality of NFTs, display data associated with a customized collection display that contains the plurality of NFTs. Step 316 includes sending, via the network interface, the display data associated with the customized collection display via the client device of the user. Step 318 includes facilitating creation of a collection NFT corresponding to the customized collection display that contains the plurality of NFTs.

FIG. 4A presents a flowchart representation of an example method. In particular, a method 400 for use in conjunction with any of the functions and features described herein in generating a collection NFT based on at least one NFT accessed via a temporary micro-loan.

Step 402 includes facilitating, via a processor and in response to user interactions with the graphical user interface, a temporary micro-loan of at least one NFT. Step 404 includes generating, via the processor and in response to user interactions with the graphical user interface, display data associated with a customized collection display that contains a plurality of NFTs including the at least one NFT. Step 406 includes sending, via the network interface, the display data associated with the customized collection display via the client device of the user. Step 408 includes facilitating creation of a collection NFT corresponding to the customized collection display that contains the plurality of NFTs including the at least one NFT.

Figure 4B:
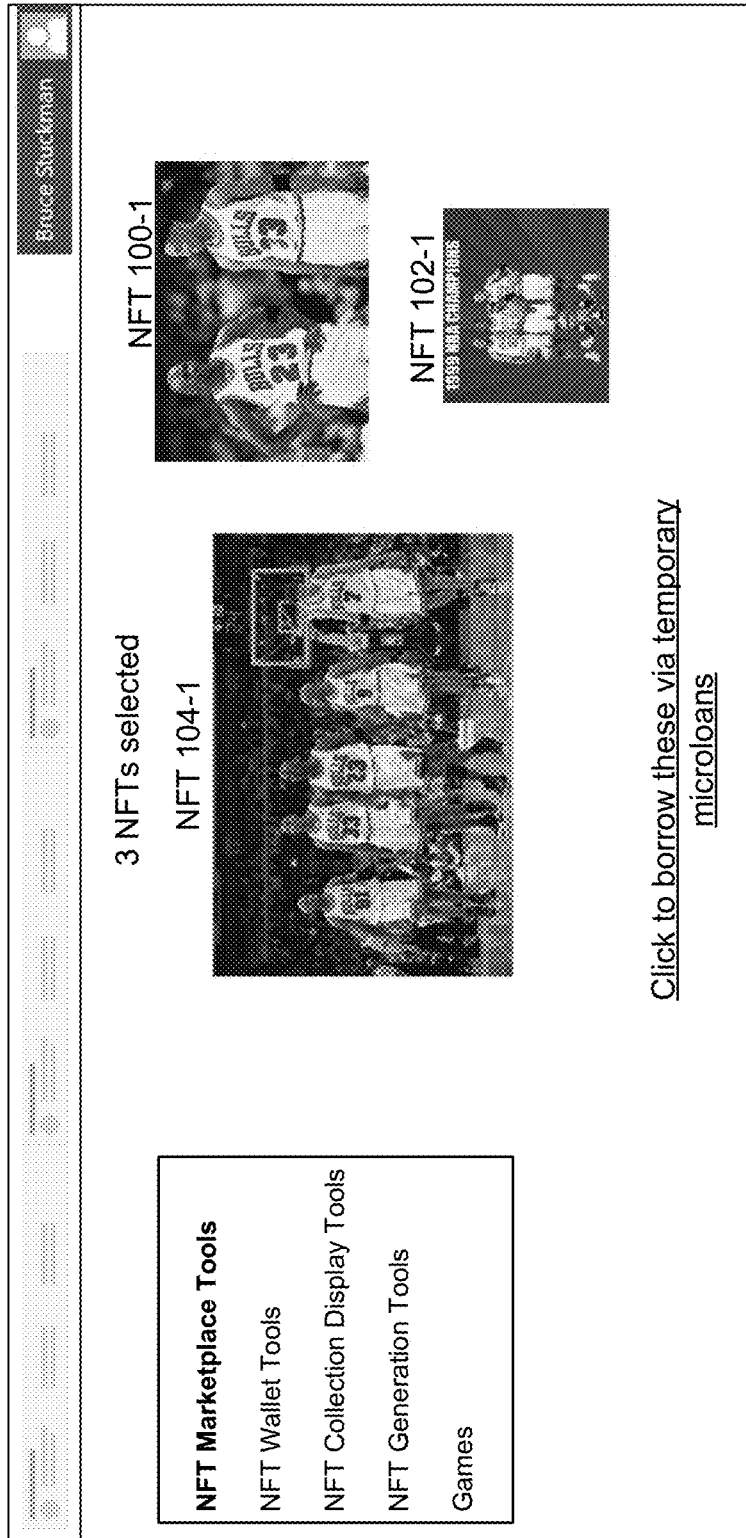
FIG. 4B presents a pictorial representation of an example screen display.

FIG. 4B presents a pictorial representation of an example screen display. In particular, the user has used the marketplace tools to select NFTs 100-1, 102-1, and 104-1. Instead of putting these NFTs up for purchase, the original owners have made them available for temporary micro-loan. This process allows the users can engage to, in exchange for a fee, "borrow" NFTs in order to create a collection NFT. After the Collection NFT is created, or upon the expiration of some predetermined time period (such as 15 minutes, 30 minutes, an hour, a day, etc.) the micro-loaned NFT(s) are returned, expire, deleted or destroyed. Transaction fees apply, a portion of which can be credited to the original NFT owner, the author, including an upfront cost, reward-based payment based on the use and/or performance of the micro-loaned NFT etc. In the alternative, a fixed fee could be charged to the user and credited to the original NFT owner. In various examples, the NFT collection platform 800 may be configured to operate with a single user and/or within a single wallet, and/or to otherwise prohibit the sale or borrowing of micro-loaned NFTs to avoid dilution of the value of the original itself. Furthermore, original and/or derivative NFTs can include restrictions on the total number of micro-loan transactions, the number of simultaneous/contemporaneous micro-loans, restrictions on types of microloan transactions such as normal use loans, staking loans, death match loans, loans less than a predetermined length of time, loans greater than a predetermined length of time, etc.

Consider the following example where an NFT is put up for loan. The proposed loan transaction can include restrictions including an expiration time and/or date, one or N time use in creating a collection NFT or in a game, tournament or challenge, etc. Once the loan is accepted by the borrower, an additional NFT, such as a derivative NFT of the original NFT being loaned, is created on a side chain, layer 1 or 2 blockchain (or "parachain") that can be different from (and/or independent from) the blockchain used to create the original NFT. This new NFT can be created and transferred to the wallet of the borrower via a smart contract that is based on the restrictions. A cryptocurrency market can be used to fund the transaction and/or to collateralize the micro-loan. The new NFT can then be set via the smart contract to automatically expire (e.g. be deleted from the wallet, destroyed or otherwise disabled), when the restrictions are met. In this fashion, if the purpose of the micro-loan is the creation of a collection NFT, the borrowed NFT can automatically expire once the collection NFT is created. It should be noted that the collection NFT can be created via the same blockchain platform (e.g. Ethereum) used to create the original NFT (e.g. not the parachain).

Figure 4C:
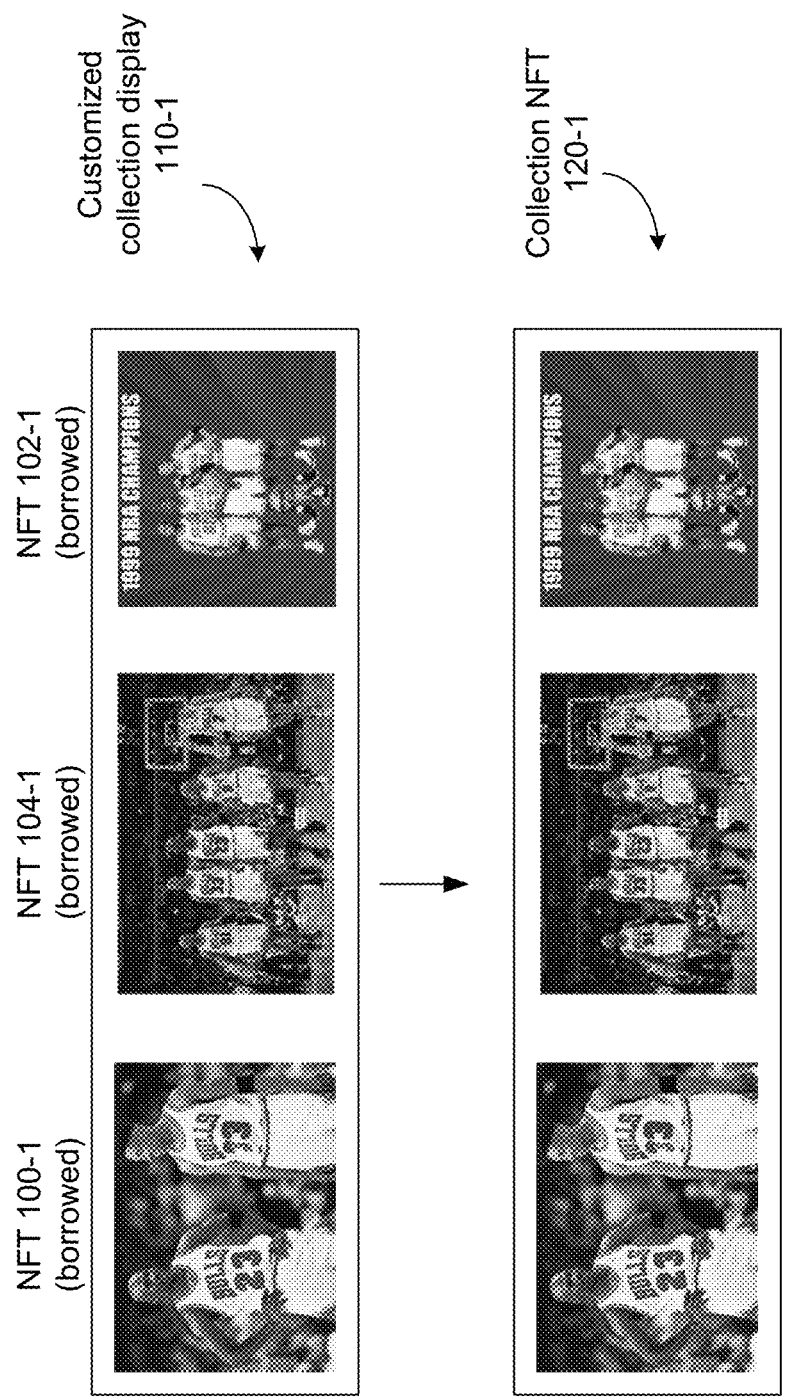
FIG. 4C presents a flow diagram representation of an example process.

FIG. 4C presents a flow diagram representation of an example process where a collection NFT 120-1 is generated based on a customized collection display 110-1 created by the user based on the borrowed NFTs 100-1, 102-1 and 104-1. In various examples, the collection NFT 120-1 metadata can also indicate the original sources of the micro-loans as well as the micro-loaned status of NFTs 100-1, 102-1 and 104-1. While not expressly shown, the collection NFTs based on one or more micro-loaned NFTs, can be created with a visual indication of the original vs. micro-loaned status of the NFTs as appropriate.

FIG. 5A presents a flowchart representation of an example method. In particular, a method 1300 for use in conjunction with any of the functions and features previously described facilitates the collection of endorsements associated with an NFT. Step 1302 includes importing, via a network interface, an NFT associated with the user of the client device. Step 1304 includes collecting, via a processor and in response to user interactions with the graphical user interface, endorsement data associated with the NFT. Step 1306 includes generating, via the processor and in response to user interactions with the graphical user interface, display data associated with a customized collection display that contains the NFT and the endorsement data. Step 1308 includes sending, via the network interface, the display data associated with the customized collection display via the client device of the user. Step 1310 includes facilitating creation of a collection NFT corresponding to the customized collection display.

Figure 5B:
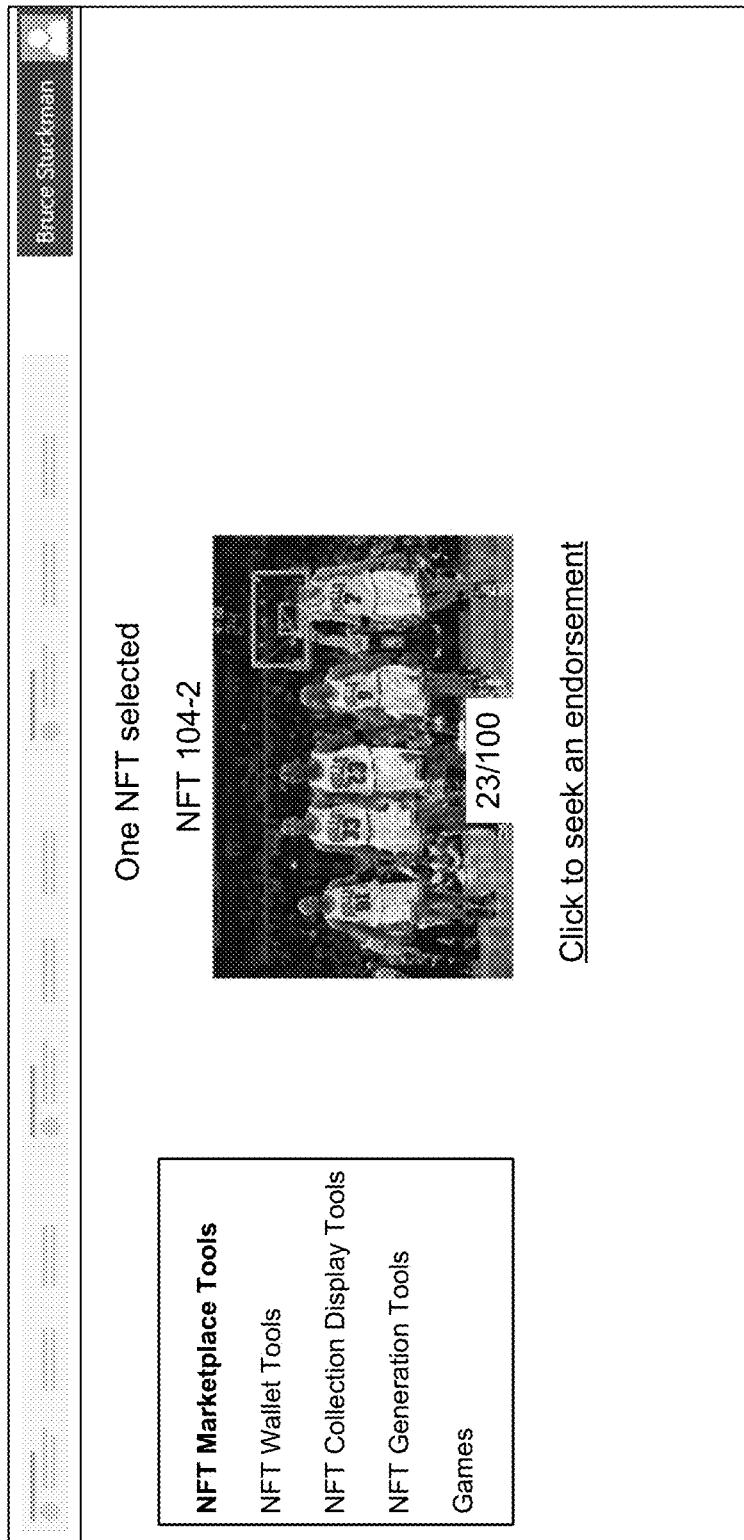
FIGS. 5B and 5C present pictorial representations of example screen displays.
Figure 5C:
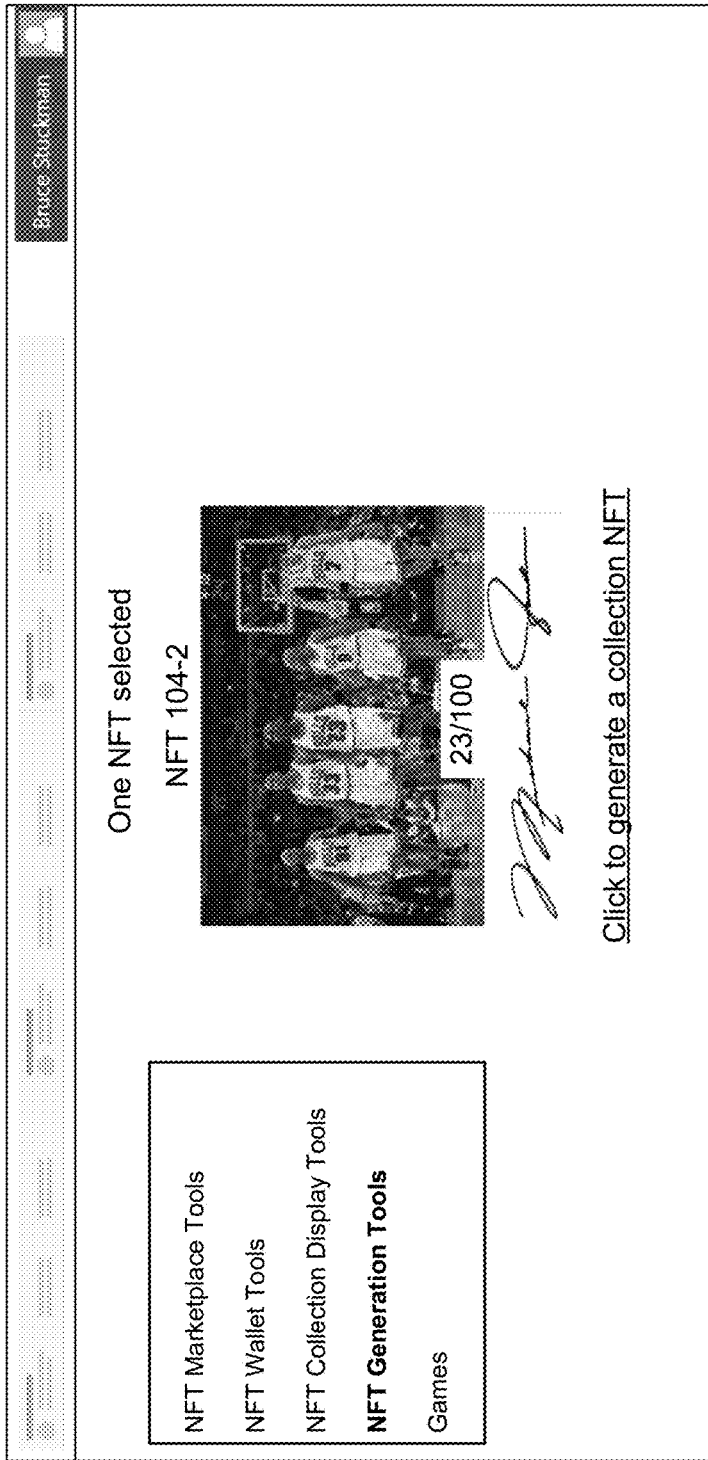

FIGS. 5B and 5C present pictorial representations of example screen displays. In FIG. 5B, the user is interacting with the graphical user interface to use the NFT marketplace tools to seek an endorsement for a selected NFT. After an endorsement in the form of a signature has been received it can be appended to the customized collection display of the NFT. In FIG. 5C, the user interacts with the NFT generation tools to generate a collection NFT that includes both the NFT and the signature. In various examples, this collection NFT 120-6 metadata can also indicate an attribution associated the endorsement itself. Furthermore, the endorsement itself can be an original NFT, a derivative NFT, a micro-loaned NFT or other NFT.

Figure 6:
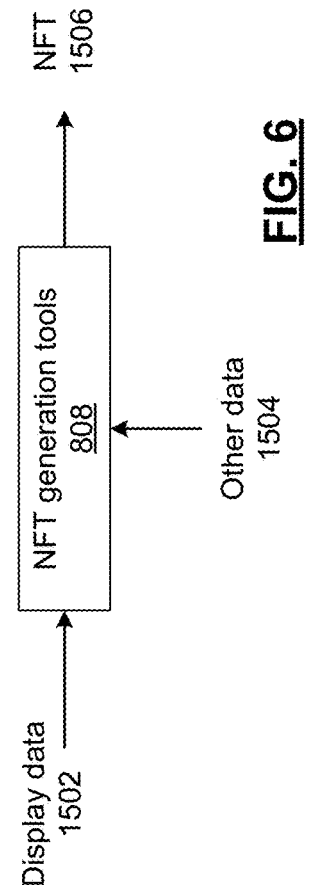
FIG. 6 presents a block diagram/flow representation of an example of NFT generation.

FIG. 6 presents a block diagram/flow representation of an example of NFT generation. In the example shown, NFT generation tools 808 operate to convert display data 1502 and other data 1504 into an NFT 1506. The display data 1502 can correspond to an original NFT, borrowed (e.g. temporary micro-loaned) NFT, a derivative NFT, a customized collection display 110, an original image, and/or other derivatives or micro-loans thereof or other display or image data. In various examples, the NFT generation tools 808 can operate to verify the credentials of any NFTs whose images are contained in the display data 1502, prior to creating the NFT 1506. In this fashion, derivative NFTs can only be created when the source NFT or NFTs are verified—preventing the creation of unauthorized or counterfeit NFTs.

The other data 1504, can be image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the display data 1502.

This other data 1504 can be used to generate an NFT and/or combined with the display data 1502 to create a dataset that includes both the display data 1502 and the other data 1504. This other data 1504 or combined dataset can be protected via the blockchain and/or other crypto-based NFT creation technology that is employed by the NFT generation tools 808 and via the NFT creation system 824 to create and protect the new NFT 1506 itself. It should be noted that the NFT 1506 can include a single derivative or a number of derivatives, including a limited series of derivatives. It should be noted further that some or all of the other data 1504, including restriction data and/or attribution data, can be derived from one or more original NFTs whose images are associated with the display data 1502. Furthermore, some or all of the other data 1504 can be generated in response to user interactions with a graphical user interface generated in conjunction with the NFT collection platform 800.

FIG. 7 presents a block diagram representation of an example system. In particular, a system 2850 is presented that includes an NFT distribution platform 2800 that communicates with client devices 825 via a network 115. The network 115 can be the Internet or other wide area or local area network, either public or private. The client devices 825 can be computing devices associated with users, for example, buyers, sellers, collectors, game players and/or other users of NFTs.

In the example shown, the NFT distribution platform 2800 includes a client device interface 2802 for interacting with the client devices 825, NFTs 2804 to be distributed, and an operating system 2844. One or more of the NFTs 2804 can have geographical restrictions as to distribution that are either part of the NFTs themselves or have restriction data that is stored separately.

The NFT distribution platform 2800 includes a network interface 2820 such as a 3G, 4G, 5G or another cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT distribution platform 2800 also includes a processing module 2830 and memory module 2840 that stores an operating system (O/S) 2844 such as an Apple, Unix, Linux or Microsoft operating system or another operating system, the client device interface 2802, and the NFTs 2804. The O/S 2844 and the client device interface 802 each include operational instructions that, when executed by the processing module 830, cooperate to configure the processing module 830 into a special purpose device to perform the particular functions of the NFT distribution platform 2800 described herein.

The NFT distribution platform 2800 may include a user interface (I/F) 2862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT distribution platform 2800 and that generate data in response to the administrator's interaction with NFT distribution platform 2800.

The processing module 2830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 2840. The memory module 2840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 2860, other architectures are possible including additional data buses and/or direct connectivity between one or more elements. Further, the NFT distribution platform 2800 can include one or more additional elements that are not specifically shown.

For example, the client device interface 2802 can operate in conjunction with each client device 825 and via network 115 to generate a graphical user interface. This graphical user interface is based on display data generated by the NFT distribution platform 2800 in a format for display on a display device associated with the client devices 825. This graphical user interface generates input data that is received by the NFT distribution platform 2800 from the client devices 825 in response to user interaction with the graphical user interface.

In various examples, the NFT distribution platform 2800 can operate to respond to input data from client devices in the form of read requests for NFTs and geolocation data such as GPS coordinates, connection to or proximity with a network element of network 115 or other location data indicating a location of the client device 825. The NFT distribution platform 2800 sends the requested NFT(s) to the requesting client device—only when the geolocation data conforms with restriction data—for example, when the geolocation data indicates a position of the requesting client device within a limited area or proximity indicated by the restriction data.

Figure 8:
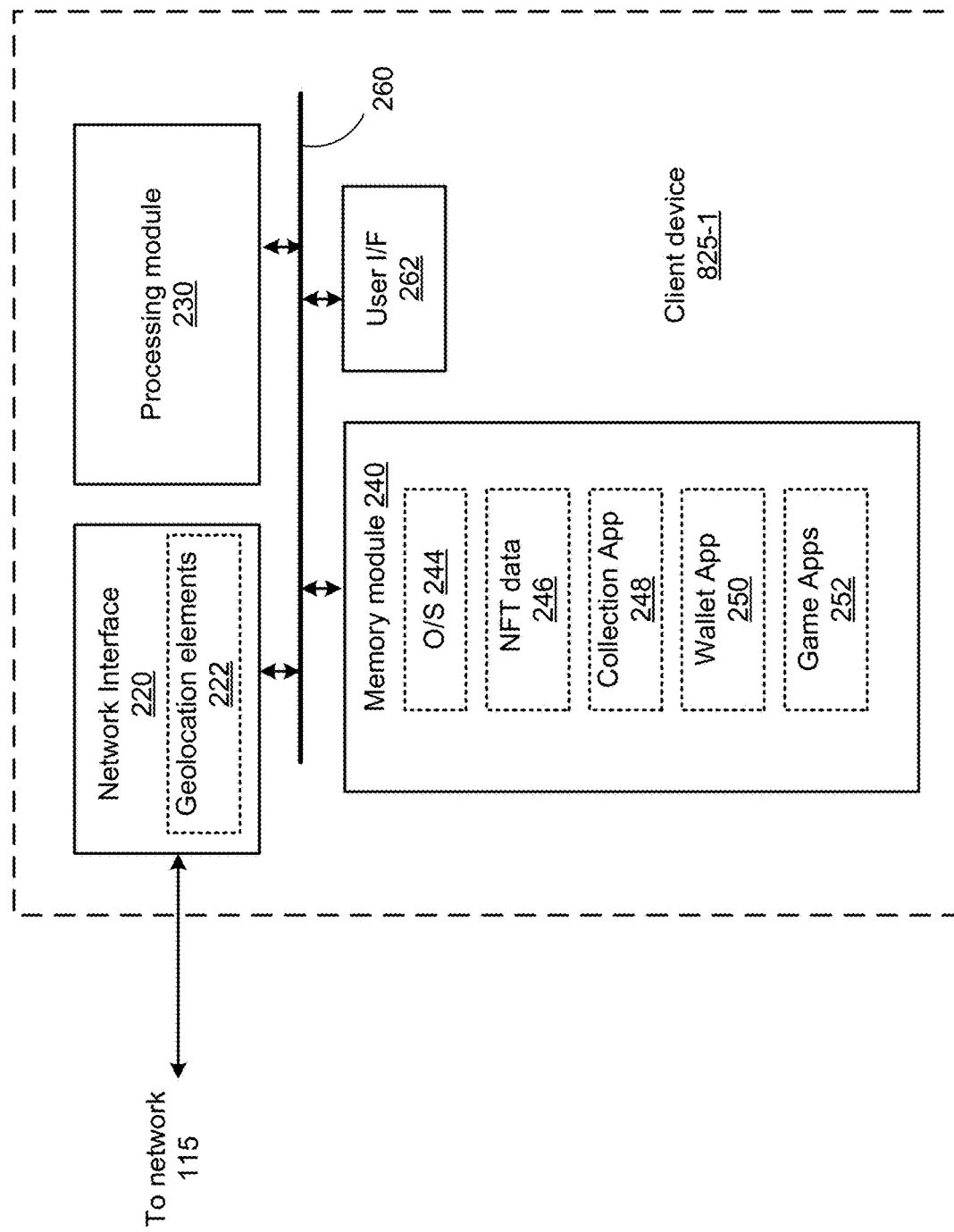
FIG. 8 presents a block diagram representation of an example client device.

FIG. 8 presents a block diagram representation of an example client device. In particular, a client device 825-1 is presented that functions similarly to client device 825, and includes several elements of client device 825 that are referred to by common reference numerals. The client device 825-1 is capable of operating to client device 825 described herein.

In addition, the memory module 240 includes a wallet application (app) 250 that is capable of engaging in financial transactions including credit card transactions and traditional digital payments, is capable of holding crypto-currency and engaging in crypto-currency transactions and is further capable of storing one or more NFTs that are either original NFTs, derivative NFTs, borrowed (temporarily micro-loaned) NFTs, collection NFTs and/or combinations thereof. In various examples, the wallet app 250 is capable of operating in conjunction with the NFT collection platform 800, the NFT distribution platform 2800, the NFT wallet system 820, the NFT marketplace 822, and/or the NFT creation system 824 via network 115.

As will be understood by one skilled in the art, unlike a normal wallet, which can physically hold cash, credit cards, etc., NFT wallets "store" NFTs by storing the NFT data necessary to access the NFT. So, even though a wallet can be said to store an NFT, technically the NFT content is stored on the blockchain, which can only be accessed via the NFT data in the wallet. This NFT data includes metadata, other off-chain data corresponding to the NFT and in particular, a private key. This private key can be considered an indicator of ownership of the NFT and is required to access the NFT via the blockchain. If the NFT data (including the private key) is lost, the NFT can no longer be accessed—and the NFT is itself "lost" for all intents and purposes, even though it remains immutably stored on the blockchain.

Also, the memory module 240 includes one or more game apps 252 that represent either stand alone games of the client device 825-1 or that operate in conjunction with the games 812 of the NFT collection platform 800 and/or interface with the NFT distribution platform 2800. This allows, for example, a user of client device 825-1 to engage in (e.g. play) games associated with NFT content, and engage in other activities that involve the acquisition, collection, display, distribution, and/or use of one or more NFTs that are either original NFTs, derivative NFTs, borrowed (temporarily micro-loaned) NFTs, collection NFTs and/or combinations thereof.

Furthermore, the network interface 220 includes one more geolocations elements 222 such as a GPS receiver, a ultra-wideband (UWB) transceiver, a Bluetooth transceiver and/or other component(s) that that facilitate the generation of geolocation data and/or facilitate other location-based services. Consider the case where the client device 825 is a smartphone or tablet and the wallet app 250 is an Apple or Android wallet or mobile wallet card that is in a Apple or Android wallet. Once the wallet app 250 is activated, NFTs can be easily added to the wallet. In addition, the wallet app 250 can access the location services of the device, and for example, generate push notifications regarding NFTs that are available near the current location.

In various examples, the geolocation data generating in such a fashion can facilitate the generation of geolocation data discussed in conjunction with the operation of NFT distribution platform 2800. In particular, the NFT distribution platform 2800 can automatically detect the presence of the user at a venue based on geolocation data received from the user's client device 825-1 and automatically prompted the user to click to send a read request. In this fashion, the user can be geo-authorized, before the request. In other examples, the NFT distribution platform 2800 can distribute NFTs to client devices 825 based on payments, authentication and/or other criteria that does not rely on geolocation data.

Furthermore, while the client device 825-1 and NFT collection platform 800 (or NFT distribution platform) are shown as separate devices that communicate via the network 115, it should be noted that any and all of the functionality attributed to the NFT collection platform 800 (or NFT distribution platform), including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform (or NFT distribution platform) and communications sent to a NFT collection platform (or NFT distribution platform) from the client device 825.

In addition, NFT generation tools 808 can be used to protect, encrypt and/or authenticate any digital information that could be stored in the wallet app 250, including for example rewards cards, coupons, movie tickets, event tickets, boarding passes, public transit cards, student ID cards, credit cards, debit cards, prepaid cards, and loyalty cards. In addition, the functionality of the wallet app 250 can be further expanded to protect other information such as vehicle titles, warranty cards, driver's licenses and other IDs, vaccination records, prescriptions, and/or other medical records, social security cards, financial records, authentication tokens, insurance cards, passwords, user IDs and/or other images and information of a personal and/or sensitive nature. Any of these types of digital information can be protected via an NFT or other blockchain transaction in conjunction, with or without associated image or display data, and with or without metadata and/or "other data" as that term has been used herein in association with the NFT generation tools 808.

Figure 9B:
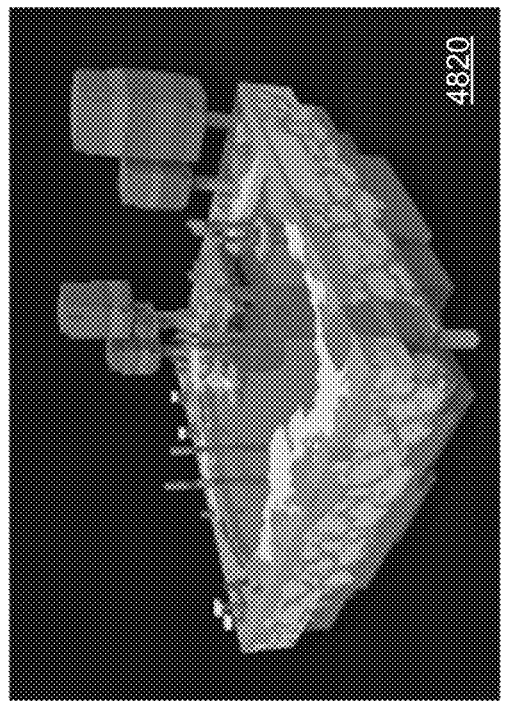
FIG. 9B presents a pictorial representation of an example NFT.
Figure 9C:
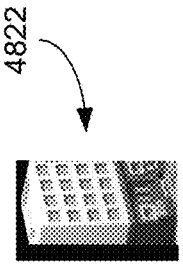
FIG. 9C presents a pictorial representation of an example improvement.
Figure 9A:
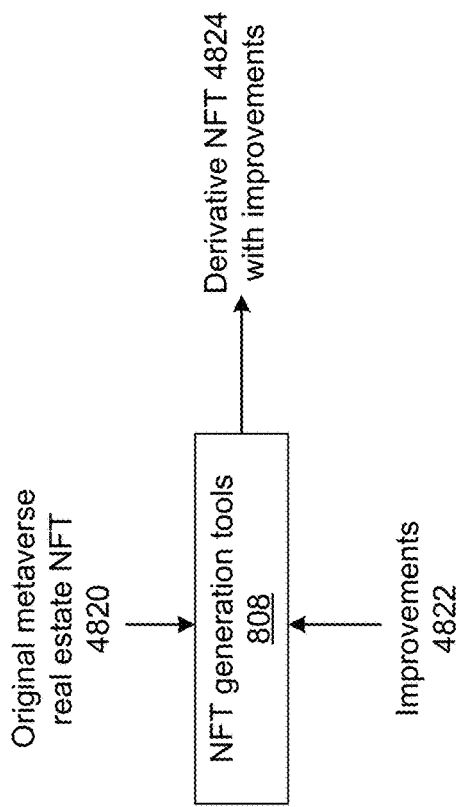
FIG. 9A presents a block diagram/flow representation of an example of NFT generation.

FIG. 9A presents a block diagram/flow representation of an example of NFT generation. In the example shown, an original metaverse real estate NFT 4820 corresponds to a portion/plot of real estate that is used in a game or metaverse application. An example is shown in FIG. 9B. The original metaverse real estate NFT 4820 can be purchased by the user, created or leveled-up via game play or otherwise acquired by the user of a metaverse application or game.

Figure 9D:
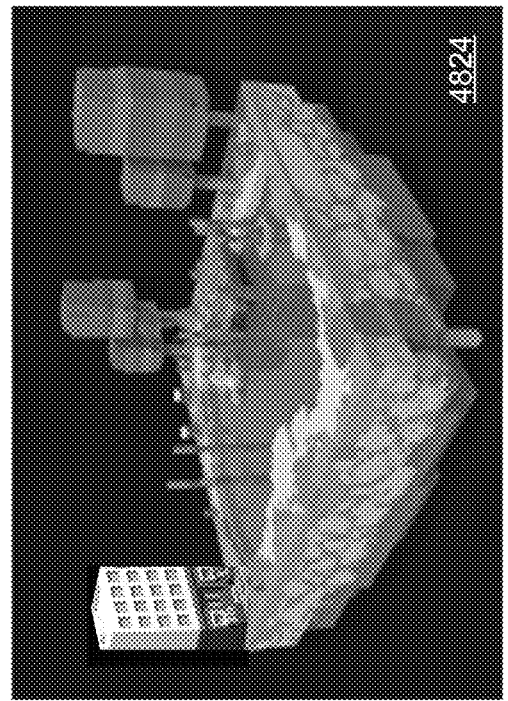
FIG. 9D presents a pictorial representation of an example NFT.

The NFT generation tools 808 are used to generate a derivative NFT 4824 or other metaverse real estate NFT that is based on the improvements 4822 shown in FIG. 9C. In the example shown the improvements 4822 correspond to a building or other structure, however, other real estate improvements can likewise be implemented. In various example, the derivative NFT 4824 with improvements shown in FIG. 9D can be created on a parachain or other sidechain that is different from the blockchain on which the original metaverse real estate NFT 4820 resides or the same blockchain on which the original metaverse real estate NFT 4820 resides.

FIG. 9E presents a flowchart representation of an example method. In particular, a method 4800 is presented for use in conjunction with any of the functions and features described herein. Step 4802 includes receiving, via the processor, a metaverse real estate NFT associated with metaverse real estate. Step 4804 includes receiving, via the processor, improvements data associated with the metaverse real estate. Step 4806 includes facilitating creation of a derivative NFT associated with the metaverse real estate and having improvements associated with metaverse real estate.

FIG. 10A presents a block diagram/flow representation of an example of NFT generation. In the example shown, document image data 4920 and other data corresponding to a document are used to generate an authenticated document NFT 4924 via the NFT generation tools 808. These authenticated document NFTs 4924 can be stored in an NFT wallet associated with the mobile phone or other client device associated with the user and can be used, for example, in place of coupons, cards, legal documents, medical documents, financial documents, IDs, credit cards, licenses and/or other important documents associated with a user that normally exist in non-digital, e.g. paper or plastic form. The authenticated document NFT 4924 can be used to prevent fraud and/or promote privacy in transactions via secure user and/or document authentication. In various examples, the authenticated document NFT 4924 can be presented and analyzed via secured blockchain or other crypto transactions at the time of a transaction in order to authenticate the identity of the user and/or to verify the accuracy and authentic nature of the other data 4922 and/or to facilitate the security of the transaction.

FIG. 10B presents a flowchart representation of an example method. In particular, a method 4900 is presented for use in conjunction with any of the functions and features described herein. Step 4902 includes receiving, via the processor, a document image associated with a document. Step 4904 includes receiving, via the processor, other data, wherein the other data is also associated with the document. Step 4906 includes facilitating creation of an authenticated document NFT corresponding to the document.

Figure 11B:
FIG. 11B presents a pictorial representation of an example NFT.
Figure 11C:
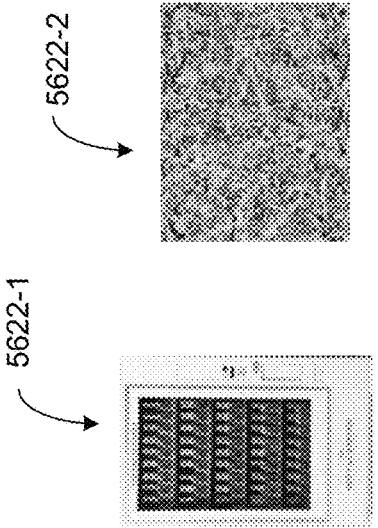
FIG. 11C presents a pictorial representation of example enhancements.
Figure 11A:
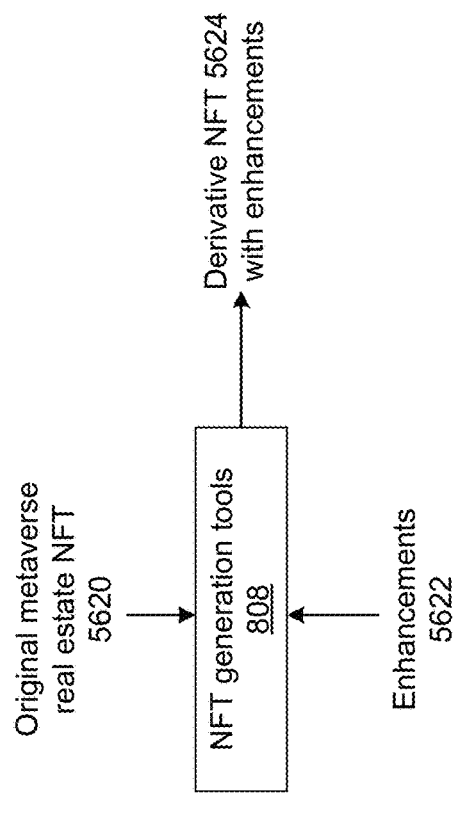
FIG. 11A presents a block diagram/flow representation of an example of NFT generation.

FIG. 11A presents a block diagram/flow representation of an example of NFT generation. The NFT generation tools 808 are used to generate a derivative NFT 5624 based on an original metaverse real estate NFT 5620 and based on the enhancement data 5622.

In the example shown in FIG. 11B, an original metaverse real estate NFT 5620 corresponds to real estate having an interior room that is used in a game or metaverse application. The original metaverse real estate NFT 5620 can be purchased by the user, created or leveled-up via game play or otherwise acquired by the user of a metaverse application or game.

The NFT generation tools 808 are used to generate a derivative NFT 5624 or other metaverse real estate NFT that is based on the enhancements data 5622 shown in FIG. 11C. In the example shown the enhancements 5622-1 and 5622-2 correspond to a Moet & Chandon vending machine and a Jackson Pollock painting that are acquired either as image data or as individual NFTs. While particular enhancements are shown, other real estate enhancements can likewise be implemented including statues and other art, rugs, lamps, furniture and other furnishings and accessories, outdoor objects, appliances, knick-knacks, machinery and other virtual objects for decorating or finishing an office, home, factory, venue or other real estate.

Figure 11D:
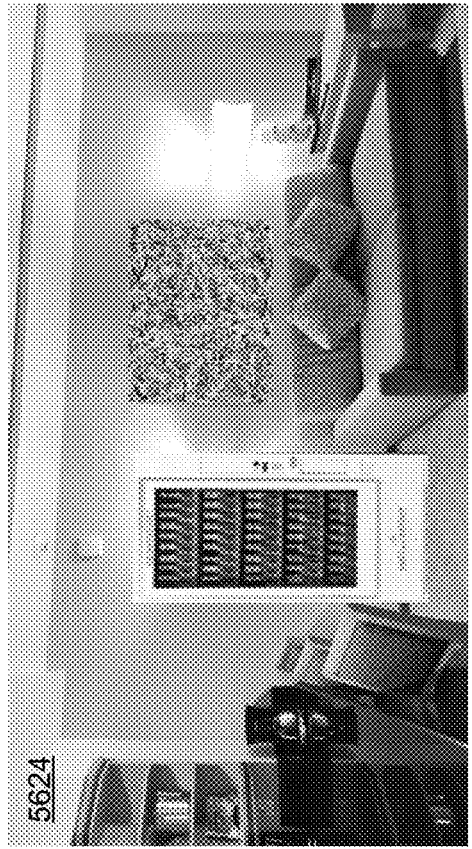
FIG. 11D presents a pictorial representation of an example NFT.

In the example shown in FIG. 11D, the user has placed the enhancements 5622-1 and 5622-2 as desired before creating the derivative NFT 5624. The derivative NFT 5624 with improvements shown can be created on a parachain or other sidechain that is different from the blockchain on which the original metaverse real estate NFT 5620 resides or the same blockchain on which the original metaverse real estate NFT 5620 resides.

Figure 11E:
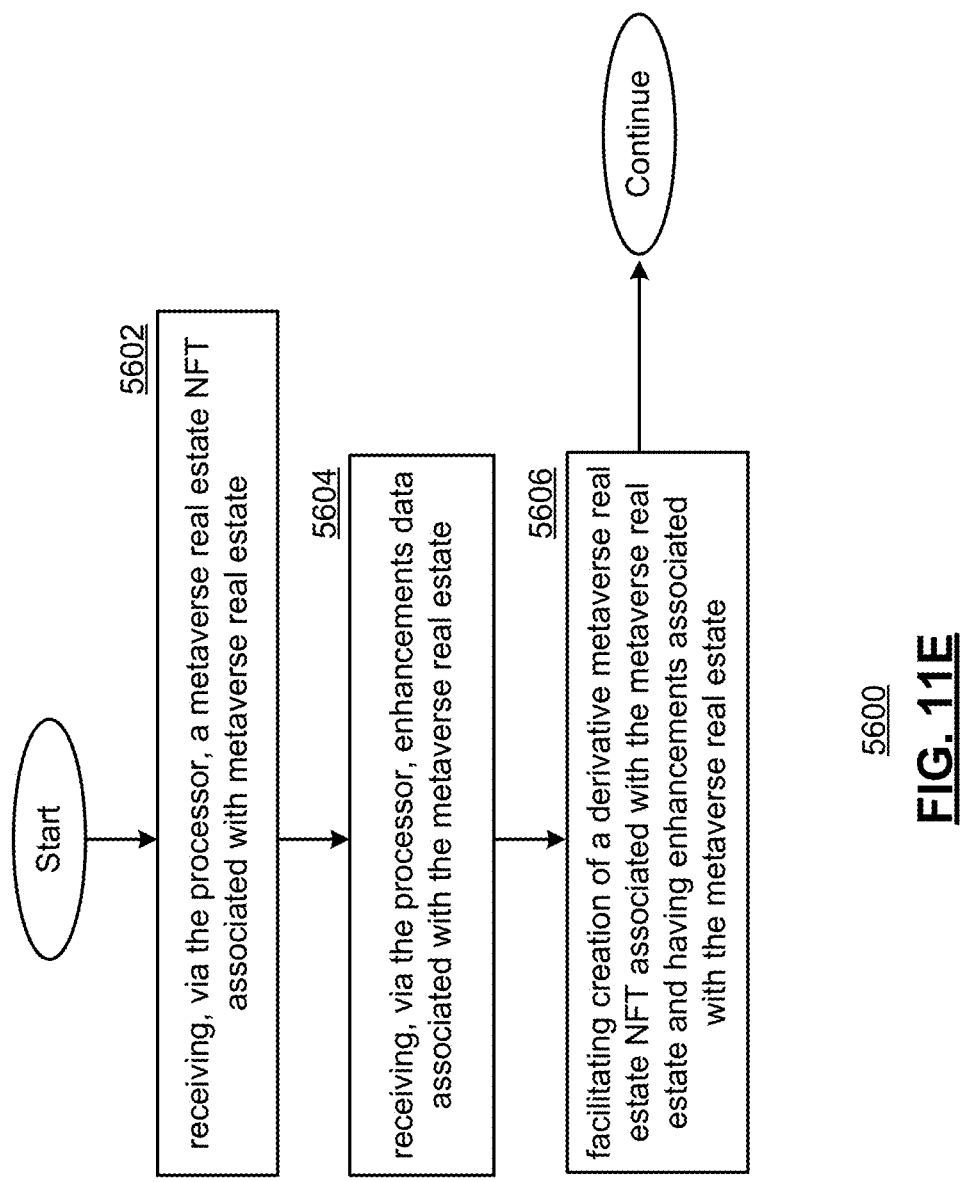
FIG. 11E presents a flowchart representation of an example method.

FIG. 11E presents a flowchart representation of an example method. In particular, a method 5600 is presented for use in conjunction with any of the functions and features described herein. Step 5602 includes receiving, via the processor, a metaverse real estate NFT associated with metaverse real estate. Step 5604 includes receiving, via the processor, enhancement data associated with the metaverse real estate. Step 5606 includes facilitating creation of a derivative NFT associated with the metaverse real estate and having enhancements associated with metaverse real estate.

Figure 12A:
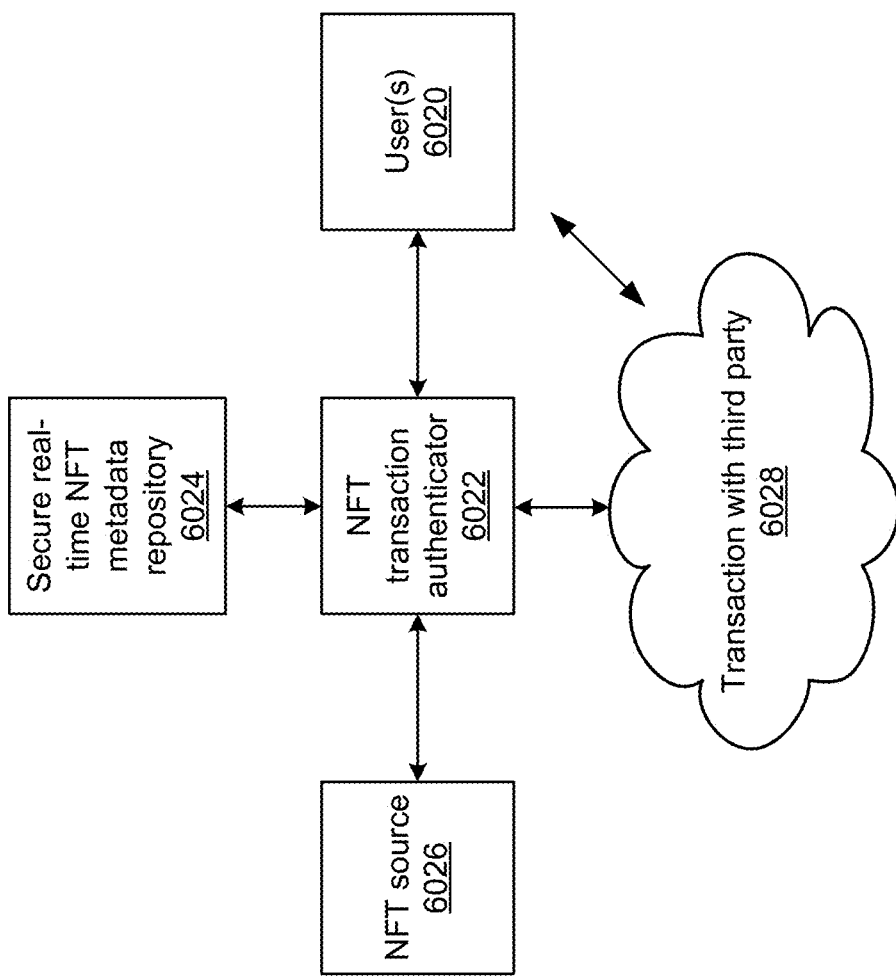
FIG. 12A presents a block diagram of an example system.

FIG. 12A presents a block diagram of an example system. In particular, a system is shown that can be implemented similarly to, or in conjunction with, NFT collection platform 800. The system includes an NFT transaction authenticator 6022 and a secure real-time NFT metadata repository 6024. In various examples, the NFT transaction authenticator 6022 and the secure real-time NFT metadata repository 6024 can be implemented via one or more modules that include a network interface, processing circuitry and memory. The secure real-time NFT metadata repository 6024 stores NFT metadata received in conjunction with NFTs created via metadata source 6026, such as one or more NFT creation systems 824. The NFTs are associated with one or more users 6020.

In operation, the NFT transaction authenticator 6022 responds to transaction requests from a user associated with an NFT to authenticate the NFT and the user and to otherwise determine the validity of the transaction that is requested. If the user and the NFT are both authenticated, and the requested transaction is otherwise permissible (e.g. not restricted by conditions on use or other transaction restrictions), then the NFT transaction authenticator 6022 responds by issuing credentials to facilitate the transaction with a third party 6028. As will be discussed herein, the maintenance and use of the secure real-time NFT metadata repository 6024 allows authentication of NFT related transactions in real-time—avoiding possible delays in performing, for example, complex blockchain transactions via an NFT source 6026 where the NFT was minted and/or otherwise maintained.

Consider the following example where an NFT is created via NFT source 6026. In addition to other NFT data, the NFT has metadata that uniquely identifies the NFT, a hash or other NFT authentication metadata that can be used to authenticate the NFT and/or transaction restriction metadata indicating possible restrictions on transactions/use conditions involving the NFT. Furthermore, when the NFT is created and/or acquired by a user, user-specific user authentication metadata is acquired or created and stored on the blockchain with the NFT with the other metadata. This user authentication metadata can include one or more passwords, answers to security questions, identifiers of recognized devices such as a device identifier of a personal cellphone, laptop, tablet, computer or other known and/or trusted device, one or more trusted networks of the user, other multifactor authentication data such as personal information, known answers to security questions, biometric data related to fingerprints, retinal scans, facial features or other biometrics of the user and/or other user authentication data that can be used to determine if a user is the owner of the NFT or otherwise an authorized user and in particular, whether or not the user is (or is not) who they claim to be.

The metadata associated with the NFT is indexed by NFT identifier and stored on the secure real-time NFT metadata repository 6024 for use by the NFT transaction authenticator 6022 in authenticating NFT-related transactions. This metadata is available from the repository on a real-time basis (e.g., is available with an acceptable amount of latency associated with a corresponding transaction). The metadata in the secure real-time NFT metadata repository 6024 is also synced periodically with the NFT via the NFT source 6026 to reflect any changes in the NFT itself. While some metadata, such as an NFT identifier, NFT authentication metadata and/or transaction restriction metadata may be made accessible to the user who holds the NFT, in various examples, the user authentication metadata in particular, can be encrypted in such a fashion that is decryptable by the secure real-time NFT metadata repository 6024—but not by the user. In various examples, the secure real-time NFT metadata repository 6024 lacks a general network connection and is connected to the NFT transaction authenticator 6022 via a dedicated and/or otherwise secured connection or is otherwise walled-off from other network connections of the NFT transaction authenticator 6022. This helps prevent unauthorized tampering with the sensitive data stored therein.

When a user 6020 proposes an NFT-related transaction, the NFT transaction authenticator 6022 collects from the user as part of the transaction request (a) an identifier of the NFT, and NFT authentication data corresponding to the NFT (b) user authentication data user, and (c) information on the proposed transaction. The NFT transaction authenticator 6022 determines whether or not the identifier corresponds to a valid NFT. If so, it retrieves the metadata associated with the NFT from secure real-time NFT metadata repository 6024. The NFT transaction authenticator 6022 authenticates the NFT by comparing the NFT authentication data to the NFT authentication metadata to determine if they match. The NFT transaction authenticator 6022 can also authenticate the user 6020 to the NFT by comparing the user authentication data to the user authentication metadata to determine if they match. If authentication succeeds, the NFT transaction authenticator 6022 facilitates the transaction with the third party 6028 by authorizing completion of the transaction, e.g. by issuing a credential to the third party 6028. The credential can include any message, object, or data structure that vouches for the identity of the user, the authenticity of the NFT and/or the validity of the transaction, through some method of security, trust and/or authentication.

In this fashion, the NFT transaction authenticator 6022 can authenticate transactions such as access to a flight via a driver's license or passport NFT, sale of a vehicle, real estate via a title NFT, a credit, debit or gift card transaction via a credit, debit or gift card NFT, the sale of a stock or bond via a stock or bond certificate NFT, warranty transactions via a warranty card NFT, access to events via venue ticket NFTs and/or vaccination card NFTs, coupon redemption via a coupon NFT, access to a vehicle, dwelling or office via a key NFT, etc. Furthermore, the NFT transaction authenticator 6022 can authenticate transactions such as sales and/or micro-loans of NFTs itself.

It should be noted that some NFTs are conditional, e.g. that have restrictions on their use and/or the transactions that are permitted. Depending on the type of transaction, the NFT transaction authenticator 6022 can also operate to compare transaction data received from the user to transaction restrictions metadata to determine if a transaction is permitted—before it is authorized. In this fashion, a credit, debit or gift card transaction can be halted if an expiration date or transaction limit has been exceeded. A warranty transaction can be halted if the warranty has expired. A key access for a pool, gym or office can be halted based on date, day of week or time of day restrictions, etc.

Furthermore, in sales transactions and/or micro-loans that have been authorized, the NFT transaction authenticator 6022 can also operate to note the pending sale or micro-loan in the secure real-time NFT metadata repository 6024 or otherwise place a hold on the NFT to prevent another sales or micro-loan until the repository is updated in a future sync with the NFT source 6026. Furthermore, in some cases the NFT corresponds to an expendable asset such as a venue ticket, gift card, coupon, etc. The NFT transaction authenticator 6022 can also operate to determine that the NFT is expended, based on the transaction restrictions metadata and the transaction data. In response to such a determination, NFT transaction authenticator 6022 can then update the secure real-time NFT metadata repository to indicate the NFT is expended. In any of these cases above, the secure real-time NFT metadata repository may facilitate updating of the NFT source 6026 to reflect an authorized transaction via notifications and/or that an NFT has been expended.

Figure 12B:
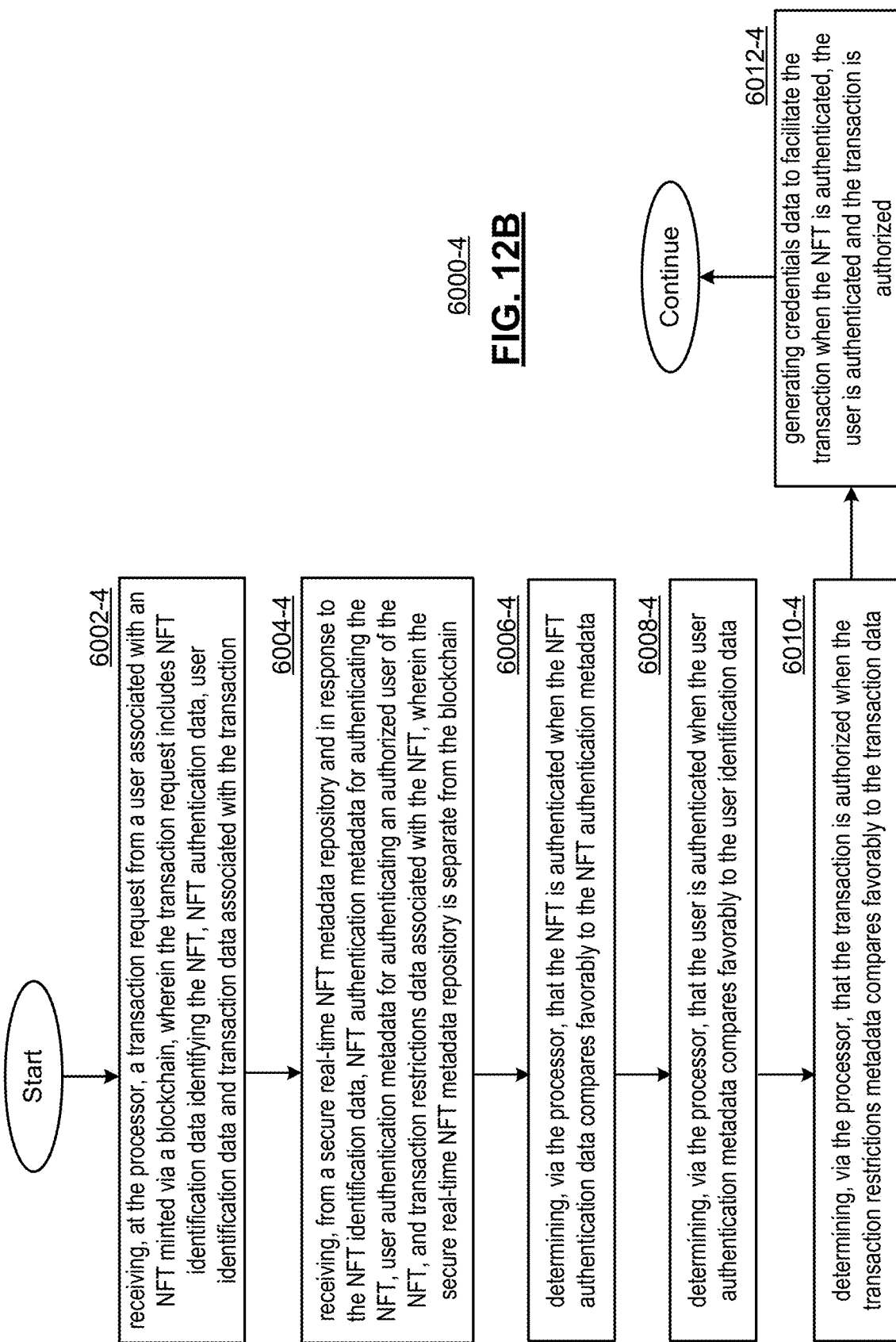
FIG. 12B presents a flowchart representation of an example method.

FIG. 12B presents a flowchart representation of an example method. In particular, a method 6000-4 is presented for use in conjunction with any of the functions and features described herein. Step 6002-4 includes receiving, at the processor, a transaction request from a user associated with an NFT minted via a blockchain, wherein the transaction request includes NFT identification data identifying the NFT, NFT authentication data, user identification data and transaction data associated with the transaction. Step 6004-4 includes receiving, from a secure real-time NFT metadata repository and in response to the NFT identification data, NFT authentication metadata for authenticating the NFT, user authentication metadata for authenticating an authorized user of the NFT, and transaction restrictions data associated with the NFT, wherein the secure real-time NFT metadata repository is separate from the blockchain.

Step 6006-4 includes determining, via the processor, that the NFT is authenticated when the NFT authentication data compares favorably to the NFT authentication metadata. Step 6008-4 includes determining, via the processor, that the user is authenticated when the user authentication metadata compares favorably to the user identification data. Step 6010-4 includes determining, via the processor, that the transaction is authorized when the transaction restrictions metadata compares favorably to the transaction data. Step 6012-4 includes generating credentials data to facilitate the transaction when the NFT is authenticated, the user is authenticated and the transaction is authorized.

Figure 12C:
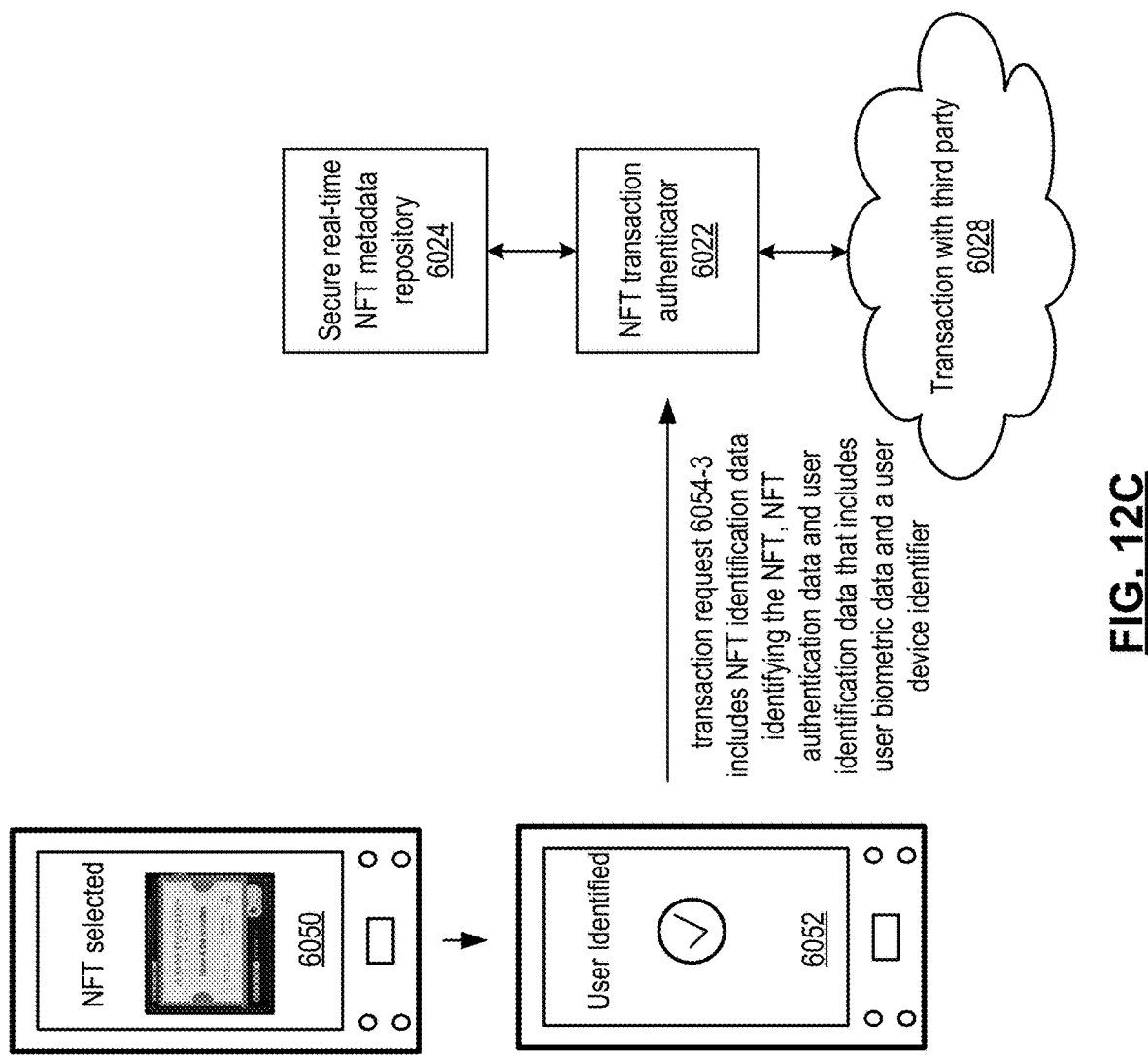
FIG. 12C presents a pictorial block diagram/flow representation of an example of transaction authentication.

FIG. 12C presents a pictorial block diagram/flow representation of a further example of transaction authentication. In this case, the transaction request 6054-1 includes NFT identification data identifying the NFT, NFT authentication data, and also user identification data that includes both a user device identifier and user biometric data that was collected via the client device 825 as part of its own user authentication process.

Again, the NFT transaction authenticator 6022 can in operate in conjunction with the secure real-time NFT metadata repository 6024 for example, to authenticate the transaction with the third party 6028. In this additional case, the user authentication mechanisms of the client device are used in the transaction of the authentication process. Once the user is identified by a trusted device, the device identifier of the trusted device can be in combination with the user biometrics collected by that device to provide further security for the proposed transaction.

Figure 12D:
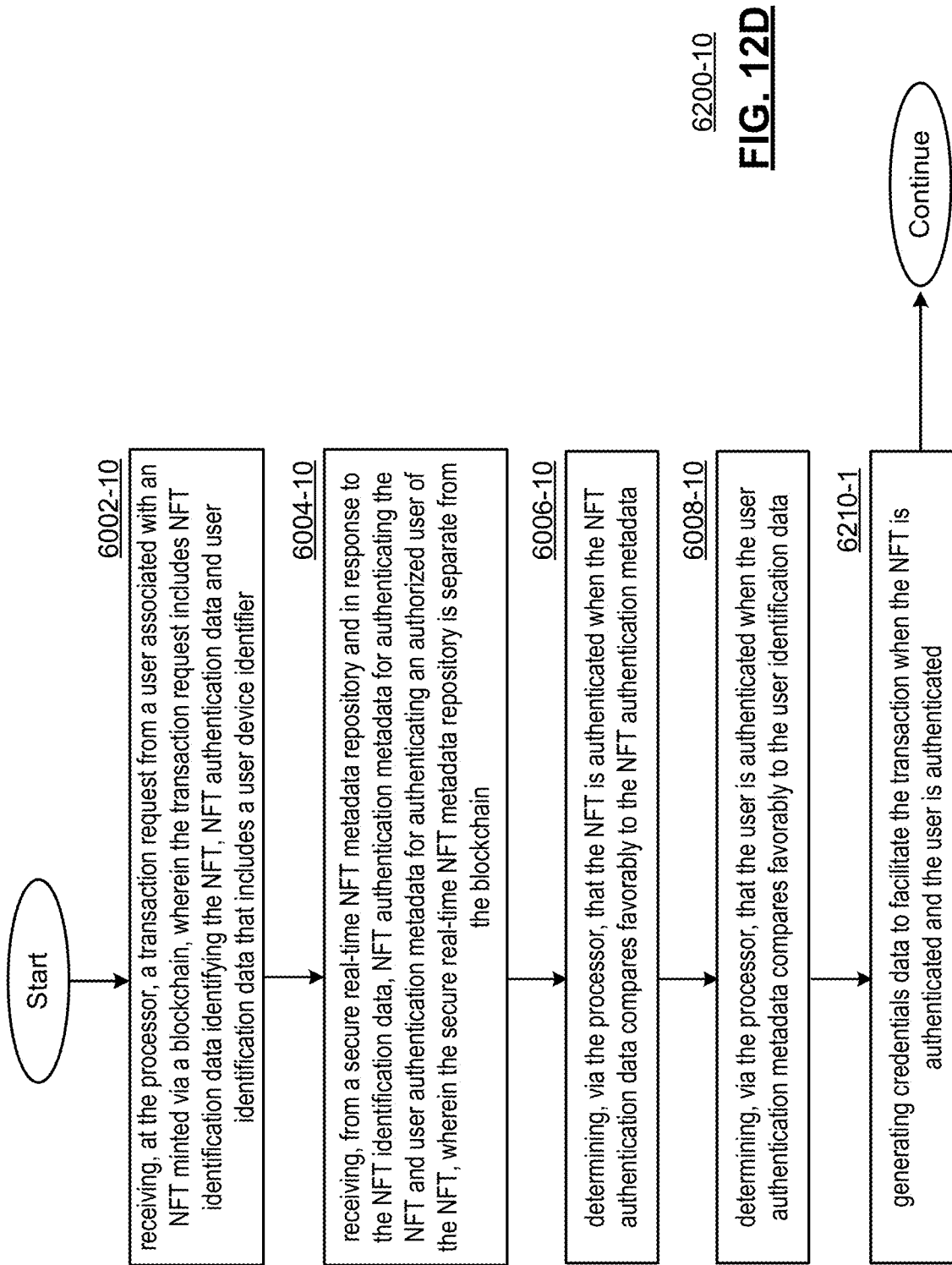
FIG. 12D presents a flowchart representation of an example method.

FIG. 12D presents a flowchart representation of an example method. In particular, a method 6000-10 is presented for use in conjunction with any of the functions and features described herein. Step 6002-10 includes receiving, at the processor, a transaction request from a user associated with an NFT minted via a blockchain, wherein the transaction request includes NFT identification data identifying the NFT, NFT authentication data and user identification data that includes a user device identifier. Step 6004-10 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-10 includes determining, via the processor, that the NFT is authenticated when the NFT authentication data compares favorably to the NFT authentication metadata. Step 6008-10 includes determining, via the processor, that the user is authenticated when the user authentication metadata compares favorably to the user identification data. Step 6010-10 includes generating credentials data to facilitate the transaction when the NFT is authenticated and the user is authenticated.

Figure 13A:
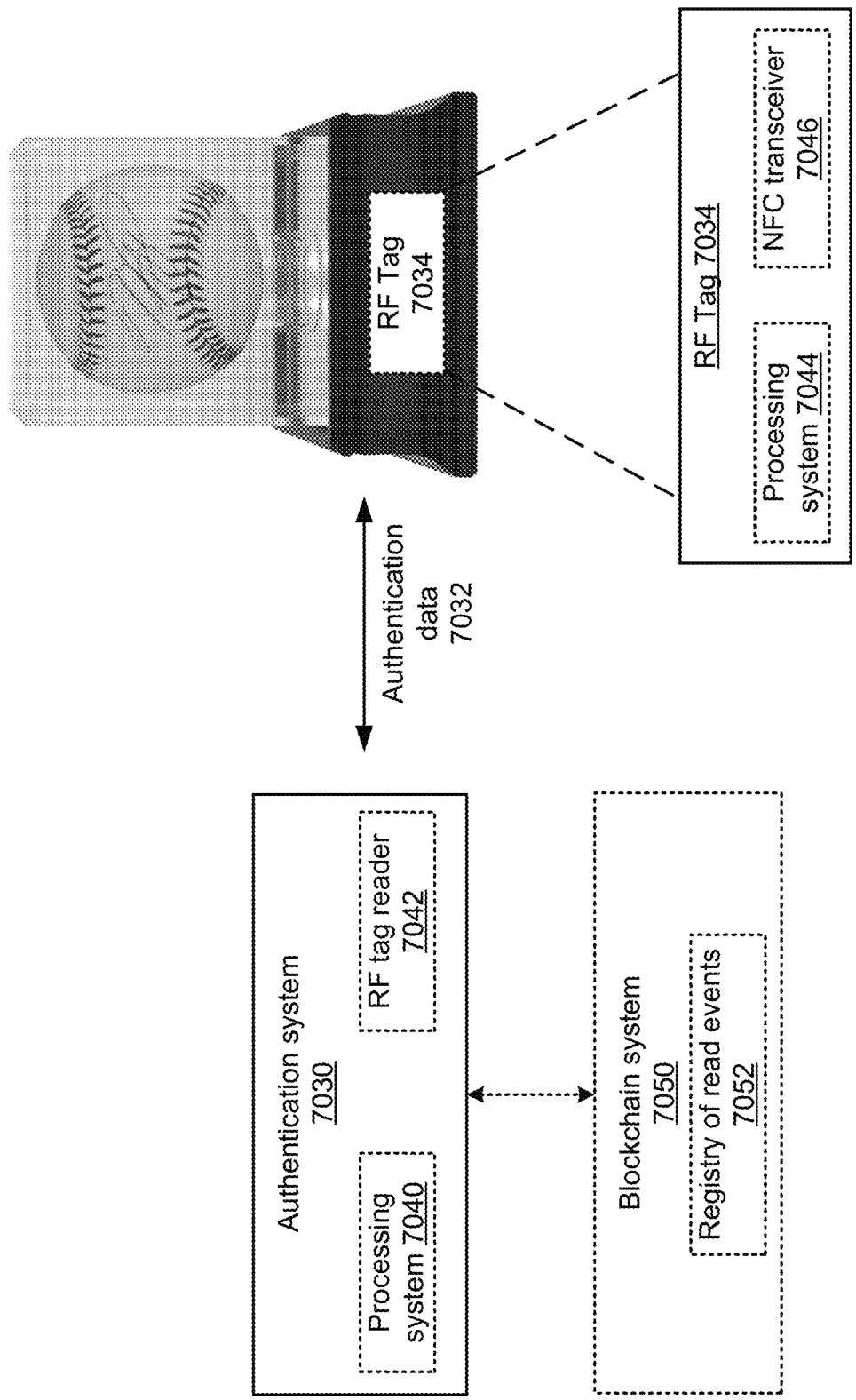
FIG. 13A presents a block diagram representation of an example authentication system.

FIG. 13A presents a block diagram representation of an example authentication system. In particular, an authentication system 7030 is shown that includes a processing system 7040 having a processor and a memory and an RF tag reader 7042 that facilitates communications authentication data between an RF tag 7034 associated with an object to be authenticated and the authentication system. The RF tag includes a near-field communication (NFC) transceiver or other transceiver configured to communicate with the RF tag reader 7042. The RF tag includes a processing system 7044 having a processor and a non-volatile memory. Energy can be harvested from the RF tag reader 7042 and stored, or the power from the reader can directly power the processing system 7044 to respond to read requests.

In the example shown, the RF tag 7034 is embedded in, attached to or otherwise associated with an object to be authenticated, in this case an autographed baseball. During set-up/initialization, the RF tag 7034 undergoes a unique one-time pairing with authentication system 7030 that makes secure and coordinated exchanges possible. The RF tag 7034 is easy to initialize, difficult to duplicate, and detectible if a duplicate (e.g. a counterfeit tagged object) is read by the authentication system 7030. A portion of non-volatile memory can be encrypted and the decryption key can be stored in a special register or memory location that has electronic and/or physical intrusion protections. While the object to be authenticated is represented as a collectable, RF tags 7034 can be associated with other items such as OEM parts, art works, toys, home goods, produce and other food items, pharmaceuticals, luxury items such as designer clothing and accessories, wristwatches and other jewelry, antiques and/or other things that could be the subject of potential counterfeiting.

In various examples, the authentication system 7030 and RF tag 7034 provide a counterfeit-resistant process for verifying the authenticity of the object to be authenticated. When the RF tag reader 7042 comes in range of the RF tag 7034 as part of attempt (e.g., a request) to authenticate the object, the RF tag 7034 and the authentication system 7030 exchange authentication data 7032 that includes an immutable and universally unique identifier of the tag, and a non-repeating, apparently random number. If the request originates from the authentication system 7030 and is not a replay of a previous request, the RF tag 7034 generates a response that reflects the entire sequence of valid exchanges between tag and authentication system—otherwise tag's response contains diagnostic information about the invalid request, decipherable only by authentication service itself.

The authentication service 7030 assesses and publicly reports on the validity of tag responses in a registry of read events 7052 that, for example, includes an event timeline that is stored via the blockchain system 7050. Other ancillary services and apps may use this registry to implement features useful and germane features related to authentication via this high-security process.

In various examples, the authentication system operates by:
- assigning, via the authentication system, pairing data to be associated with an RF tag and a corresponding object to be authenticated, wherein the pairing data includes a tag identifier, a private key, a public key, a first random number and a first AS hash based on the first random number;
- pairing the authentication system to the RF tag associated with the object, wherein the pairing includes sending to the RF tag, the tag identifier, the public key, the first random number, and the first AS hash;
- receiving a first request to authenticate the object;
- generating, in response to the first request, a second random number, a second AS hash based on the second random number and a signature of the second random number generated based on the private key;
- sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key;
- receiving, via the RF tag reader, the signature of the first tag hash;
- recovering the first tag hash based on the signature of the first tag hash and the private key;
- generating, via the authentication system, first tag hash check data based on the second random number and based on the first AS hash; and
- when the first tag hash matches the first tag hash check data, generating first read event data via the authentication system that indicates authentication of the object.

In various examples, the first request to authenticate the object is initiated in response to the RF tag reader coming in range of the RF tag and/or in response to receiving, from the RF tag, the tag identifier. The RF tag can generate the first tag hash based on the second random number and based on the first AS hash and generates the signature of the first tag hash based on the public key in response to determining a hash of the second random number matches the second AS hash. The RF tag can generate the first tag hash based on the second random number and based on the first AS hash and generates the signature of the first tag hash based on the public key further in response to determining that the second random number differs from the first random number.

The method can further include:
- receiving, via the authentication system, a second request to authenticate the object;
- generating, via the authentication system and in response to the second request, a third random number, a third AS hash based on the third random number and a signature of the third random number generated based on the private key;
- sending, via the RF tag reader, the third AS hash and the signature of the third random number to the RF tag, wherein the RF tag recovers the third random number based on the signature of the third random number and the public key, generates a second tag hash based on the third random number and based the first tag hash, and generates a signature of the second tag hash based on the public key;
- receiving, via the RF tag reader, the signature of the second tag hash;
- recovering, via the authentication system, the second tag hash based on the signature of the second tag hash and the private key;
- generating, via the authentication system, second tag hash check data based on the third random number and based on the first tag hash; and
- when the second tag hash matches the second tag hash check data, generating second read event data via the authentication system that indicates authentication of the object.

The RF tag can generate the second tag hash based on the third random number and the first tag hash and generates the signature of the second tag hash based on the public key in response to determining that the third random number differs from the second random number. The RF tag can generate the second tag hash based on the third random number and the first tag hash and generates the signature of the second tag hash based on the public key further in response to determining a hash of the third random number matches the third AS hash. The authentication system can maintain a registry of read events that includes the first read event data and the second read event data.

In various examples, the method can further include: when the second tag hash fails to match the second tag hash check data, determining via the authentication system whether or not the read request corresponds to a counterfeit tag; and when the read request corresponds to the counterfeit tag, generating third read event indicating the read of the counterfeit tag.

Consider the following further example,
- The RF tag 7034 and the authentication system 7030 undergo an initial pairing, privately exchanging encryption keys and setting an initial shared state.
- The authentication system generates a random number at each request to authorize a read cycle, cryptographically signs it, and securely sends the random number and its signature to the tag.
- The tag deciphers the random number, confirms the signature, determines whether or not the random number is a duplicate, updates a hash-chain of random numbers, and securely sends hash-chain to the system.
- The system independently computes its own hash-chain and compares it to the tag's reported hash-chain, confirming the tag's response is valid.
- Communication errors, data corruption, the existence of counterfeit copies of a tag, and the like, may cause authentication system and the tag to have different sequences of random numbers and thus hash-chain values. The authentication system is able to reconcile or properly interpret these differences.
- The system publicly reports the status of each read event on a timeline (such as registry of read events 7052).

Consider the further example that follows. The authentication system 7030 (or more simply, the "system") assigns or records the unique identifier k of each RF tag 7034 (or more simply "tag"), generates a unique private key $e_k$ and its matching public key $d_k$ operating on a field of size $n_k$, selects an initial random number $r_{k_0}$, computes its hash $H_{k_0}$=hash($r_{k_0}$), and assigns:

to tag: $\{k, d_k, n_k, H_{k_0}, r_{k_0}\}$;
to system: $\{k, e_k, n_k, H_{k_0}, \{r_{k_0}\}\}$;

At the start of a read event(authentication request), the authentication system 7030 generates a random number $r_{k_j}$, such that $r_{k_j} > r_{k_{j-1}}$, to authorize the $j^{th}$ read event of tag k, privately shares a cryptographically signed copy of $r_{k_j}$ with tag, and updates its own state after a successful response from tag k:

$\{k, e_k, n_k, H_{k_{j-1}}, \{r_{k_0} \ldots r_{k_{j-1}}\}\} \Rightarrow \{k, e_k, n_k, H_{k_j}, \{r_{k_0} \ldots r_{k_j}\}\}$;

likewise tag updates its state after confirming the signature of $r_{k_j}$, and confirming $r_{k_j}$ is not a duplicate or playback of a previous read event:

$\{k, d_k, n_k, H_{k_{j-1}}, r_{k_{j-1}}\} \Rightarrow \{k, d_k, n_k, H_{k_j}, r_{k_j}\}$ here $H_{k_j}$ is the hash-chain of $\{r_{k_0} \ldots r_{k_j}\}$, $H_{k_0}$=hash($r_{k_0}$) and $H_{k_j}$=hash($H_{k_{j-1}}$+$r_{k_j}$)

Consider the further example.

1. The RF tag reader 7042 (or more simply, the "reader") queries the tag's unique identity k and forwards it to the authentication system;
2. The system receives k, generates a new random number $r_{k_j}$ (for example, if $r_{k_j}$ is a 256-bit number, we may reserve the most significant 32 bits of $r_{k_j}$ to embed j and use the least significant 224 bits for the random portion) such that $r_{k_j} > r_{k_{j-1}}$
3. The system computes its hash $h_{k_j}$=hash($r_{k_j}$), and its ciphertext $C_{k_j}$ using the private key $\{e_k, n_k\}$, and returns the privately signed $r_{k_j}$ as $\{h_{k_j}, C_{k_j}\}$;
4. The reader forwards signed read authorization code $\{h_{k_j}, C_{k_j}\}$ to the tag;
5. The tag receives $\{h_{k_j}, C_{k_j}\}$, recovers $r_{k_j}$ using the public key $\{d_k, n_k\}$, and tests that $h_{k_j}$=hash($r_{k_j}$) and $r_{k_j} > r_{k_{j-1}}$; if true, the tag computes $H_{k_j}$=hash($H_{k_{j-1}}$+$r_{k_j}$) and its ciphertext $C_{k_j}'$ using the public key $\{d_k, n_k\}$, updates $\{k, d_k, n_k, H_{k_{j-1}}, r_{k_{j-1}}\} \Rightarrow \{k, d_k, n_k, H_{k_j}, r_{k_j}\}$, and returns $\{k, C_{k_j}'\}$; otherwise, tag generates a partially random number r', reserving two bits to indicate test results—for example, if a diagnostic value contains 64 bits, 62 random bits plus 2 error bits, and a chained hash contains many more bits, say 256, the mere differential in size makes a diagnostic value distinguishable from a hash value. However, the ciphertext of either will have roughly the same number of bits. The net effect is, lacking access to the private key, the tag's public response to valid read requests is indistinguishable from its response to invalid requests.
6. The tag computes its ciphertext $C_{k_j}'$ with the public key $\{d_k, n_k\}$, and returns $\{k, C_{k_j}'\}$;
7. The reader forwards $\{k, C_{k_j}'\}$ to the authentication system;
8. The authentication system receives tag's response, deciphers $C_{k_j}'$ using the private key $\{e_k, n_k\}$, and determines if the response is a diagnostic or a hash value. If a hash value is detected, taking into account that one or more $r_k$ may be lost to tag, the system seeks a subset of random numbers, $\{r_1' \ldots r_i'\}_m \in \{r_{k_0} \ldots r_{k_j}\}$, that produces a match to tag's reported hash-chain, $H_m = H_{k_j}$, in which case tag is proved valid; if two or more m distinct sequences of random numbers produce a match, a counterfeit tag is in play.
9. The authentication system publishes a timeline of tag read events on a public ledger (such as a blockchain system 7050) with an informative status code, for example: {timestamp, k, status_code}; read events not sanctioned by system may or may not be published, and the system may take or recommend remedial actions.

The following methodology can be employed in step 8 above to correct for missing $r_k$ at the tag, and for system missing one or more $H_k$ tag generated but did not reach system.

The authentication system maintains an ordered list of all random $r_k$ issued to tag k, $\{r_{k_0} \ldots r_{k_j}\}$. Since, system must account for tag missing one or more $r_k$ it also constructs sequences of $r_k'$ that are subsets, $\{r_{k_0}' \ldots r_{k_i}'\}_m \in \{r_{k_0} \ldots r_{k_j}\}$, i≤j, that result in system's calculation of hash-chain, $H_m$, matching tag's, $H_{k_j}$.

If more than one valid sequence of $r_k'$ exists (m≥2) between a tag and system, then one or more counterfeit copies of tag k are in play. There may be utility in tracking when a counterfeit copy emerges, a new distinct sequence forms, tracking these branches separately. This includes tracking the node (a specific $r_{k_n}'$ in a sequence m), when the node (random number) was originally issued, and when the branching tag first contacted system with a response to a read request. The system also decides if, when and how this information is publicly revealed, leaving the option to privately share information in a different form with a registered tag owner.

Search Algorithm

1. When the system receives a new $H_{k_j}$ from the tag, it selects a prior valid sequence from among the m available and tries all combinations of "unclaimed" random numbers from the master set, $\{r_{k_q} \ldots r_{k_j}\}$, where $r_{k_q}$ is the first random number larger than $r_{k_j}'$ from the selected subset sequence $\{r_{k_0}' \ldots r_{k_i}'\}_m$. If a match is found, the selected sequence m is updated, if not, the next sequence is selected and the process (1) is repeated.
2. If no match is produced as described in 1 above, it may be a tag branched at an earlier node in a sequence. To resolve, we walk backward through each sequence, $\{r_{k_0}' \ldots r_{k_i}'\}_m \Rightarrow \{r_{k_0}' \ldots r_{k_i}'\}_m$, and repeat 1 until a match is found or options are exhausted.

Each sequence is indexed by its cumulative hash-chain values for efficiency in implementing step 2:

$\{(H_0, r_0'), (H_1, r_1'), \ldots, (H_i, r_i')\}_m$, where: $H_0$=hash($r_0'$) and $H_i$=hash($H_{i-1}$+$r_i'$)

In various examples, detectable status codes and error conditions include at least the following:

| Status code | Tag bits | Description of published status codes (can be summed) |
|---|---|---|
| 1 | | service received a valid response |
| 2 | | service received a valid response outside the allotted time interval (timed-out) |
| 4 | | service received a response that is a replay of a previous valid response |

| Status code | Tag bits | Description of published status codes (can be summed) |
|---|---|---|
| 8 | | service has detected a duplicate (counterfeit) tag |
| 16 | | service received an invalid hash value from tag |
| 32 | 11 | service received an invalid diagnostic code, expected a hash value instead |
| 64 | 00\|10 | tag received an invalid read authorization code |
| 128 | 01 | tag received a replay of a previous valid read authorization code |

Consider the further example where an alternate read cycle is constructed that does not rely on authentication system knowing tag identifier k in advance. In this case there is an additional public key, $\{d, n\}$, shared with every tag, which does not need to be kept private. Initial pairing information becomes:

- to tag: $\{k, d, n, d_k, n_k, H_{k_0}, r_{k_0}\}$;
- to system: $\{k, e, d, n, e_k, d_k, n_k, H_{k_0}, \{r_{k_0}\}\}$;
- The reader requests a read authorization code from the authentication system;
- The system receives reader's request and generates a new random number $r_j$, such that $r_j > r_{j-1}$, computes its hash $h_j = \text{hash}(r_j)$, and its ciphertext $C_j$ using the general private key $\{e, n\}$, and returns the signed $r_j$ as $\{h_j, C_j\}$;

may be utility in allowing these branches to exist, so as to monitor potentially illicit activity;

The authentication system publishes a timeline of tag read events on a public ledger (such as a blockchain) with an informative status code, for example: {timestamp, k, status_code}; read events not sanctioned by system may or may not be published, and the system may take or recommend remedial actions.

FIG. 13B presents a flowchart representation 7000-1 of an example method. In particular, a method is presented for use in conjunction with one or more functions or features described herein. For example, the method can be used with an authentication system or other system that includes a processor and a memory to perform various steps of the

| Tag bits | $r_{j_k}$ | $h_{j_k}$ | Description tag error codes/responses |
|---|---|---|---|
| 00 | invalid | invalid | $r_{k_j} \leq r_{k_{j-1}}$, $h_{k_j} \neq \text{hash}(r_{k_j})$, possible malicious actor |
| 10 | valid | invalid | $r_{k_j} > r_{k_{j-1}}$, $h_{k_j} \neq \text{hash}(r_{k_j})$, possible malicious actor |
| 01 | invalid | valid | $r_{k_j} \leq r_{k_{j-1}}$, $h_{k_j} = \text{hash}(r_{k_j})$, possible malicious actor, replay of a previous read authorization code |
| 11 | valid | valid | $r_{k_j} > r_{k_{j-1}}$, $h_{k_j} = \text{hash}(r_{k_j})$, valid read request, tag returns chained-hash |

The reader forwards signed read authorization code $\{h_j, C_j\}$ to the tag;

The tag receives $\{h_j, C_j\}$, recovers $r_j$ using the general public key $\{d, n\}$, and tests that $h_j = \text{hash}(r_j)$ and $r_j > r_{j-1}$; if true, tag encrypts $r_j$ using its specific public key $\{d_k, n_k\}$ to generate $r_{k_j}$ and computes $H_{k_j} = \text{hash}(H_{k_{j-1}} + r_{k_j})$ and its ciphertext $C_{k_j}'$ using its specific public key $\{d_k, n_k\}$, updates $\{k, d, n, d_k, n_k, H_{k_{j-1}}, r_{j-1}\} \Rightarrow \{k, d, n, d_k, n_k, H_{k_j}, r_j\}$, and returns $\{k, C_{k_j}'\}$; otherwise, the tag generates a partially random number r', reserving two bits to indicate test results, computes its ciphertext $C_{k_j}'$ with the public key $\{d_k, n_k\}$, and returns $\{k, C_{k_j}'\}$;

The reader adds $r_j$ and returns $\{k, r_j, C_{k_j}'\}$ to the authentication system;

The authentication system receives reader's response, deciphers $C_{k_j}'$ using the private key $\{e_k, n_k\}$, converts $r_j$ into $r_{k_j}$ using its copy of tag k's public key $\{d_k, n_k\}$, and determines if the response is a diagnostic or a hash value; if a hash value is detected, taking into account that one or more $r_j$ may be lost to tag, system seeks a subset of random numbers, $\{r_1' \ldots r_i'\}_m \in \{r_{k_0} \ldots r_{k_j}\}$, that produces a match to tag's reported hash-chain, $H_m = H_{k_j}$, in which case tag is proved valid; if two or more m distinct sequences of random numbers produce a match, a counterfeit tag is in play;

The authentication system takes the additional step to record, and places in $r_j$ order, the computed sequence for tag k: $\{r_{k_0} \ldots r_{k_j}\}$. It also track $r_j$ that remain unclaimed by a tag, those that are claimed by a single tag, and those that are claimed by more than one tag (which is evidence of malicious action). Again, there method. Step 7002-1 includes assigning, via the authentication system, pairing data to be associated with an RF tag and a corresponding object to be authenticated, wherein the pairing data includes a tag identifier, a private key, a public key, a first random number and a first AS hash based on the first random number. Step 7004-1 includes pairing the authentication system to the RF tag associated with the object, wherein the pairing includes sending to the RF tag, the tag identifier, the public key, the first random number, and the first AS hash. Step 7006-1 includes receiving, via the authentication system, a first request to authenticate the object. Step 7008-1 includes generating, via the authentication system and in response to the first request, a second random number, a second AS hash based on the second random number and a signature of the second random number generated based on the private key.

Step 7010-1 includes sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key. Step 7012-1 includes receiving, via the RF tag reader, the signature of the first tag hash. Step 7014-1 includes recovering, via the authentication system, the first tag hash based on the signature of the first tag hash and the private key. Step 7016-1 includes generating, via the authentication system, first tag hash check data based on the second random number and based on the first AS hash. Step 7018-1 includes, when the first tag hash matches the first tag hash check data, generating first read event data via the authentication system that indicates authentication of the object.

In various examples, the first request to authenticate the object is initiated in response to the RF tag reader coming in range of the RF tag and/or in response to receiving, from the RF tag, the tag identifier. The RF tag can generate the first tag hash based on the second random number and based on the first AS hash and generates the signature of the first tag hash based on the public key in response to determining a hash of the second random number matches the second AS hash. The RF tag can generate the first tag hash based on the second random number and based on the first AS hash and generates the signature of the first tag hash based on the public key further in response to determining that the second random number differs from the first random number.

The method can further include:
receiving, via the authentication system, a second request to authenticate the object;
generating, via the authentication system and in response to the second request, a third random number, a third AS hash based on the third random number and a signature of the third random number generated based on the private key;
sending, via the RF tag reader, the third AS hash and the signature of the third random number to the RF tag, wherein the RF tag recovers the third random number based on the signature of the third random number and the public key, generates a second tag hash based on the third random number and based the first tag hash, and generates a signature of the second tag hash based on the public key;
receiving, via the RF tag reader, the signature of the second tag hash;
recovering, via the authentication system, the second tag hash based on the signature of the second tag hash and the private key;
generating, via the authentication system, second tag hash check data based on the third random number and based on the first tag hash; and
when the second tag hash matches the second tag hash check data, generating second read event data via the authentication system that indicates authentication of the object.

The RF tag can generate the second tag hash based on the third random number and the first tag hash and generates the signature of the second tag hash based on the public key in response to determining that the third random number differs from the second random number. The RF tag can generate the second tag hash based on the third random number and the first tag hash and generates the signature of the second tag hash based on the public key further in response to determining a hash of the third random number matches the third AS hash. The authentication system can maintain a registry of read events that includes the first read event data and the second read event data.

In various examples, the method can further include: when the second tag hash fails to match the second tag hash check data, determining via the authentication system whether or not the read request corresponds to a counterfeit tag; and when the read request corresponds to the counterfeit tag, generating third read event indicating the read of the counterfeit tag.

Figure 13C:
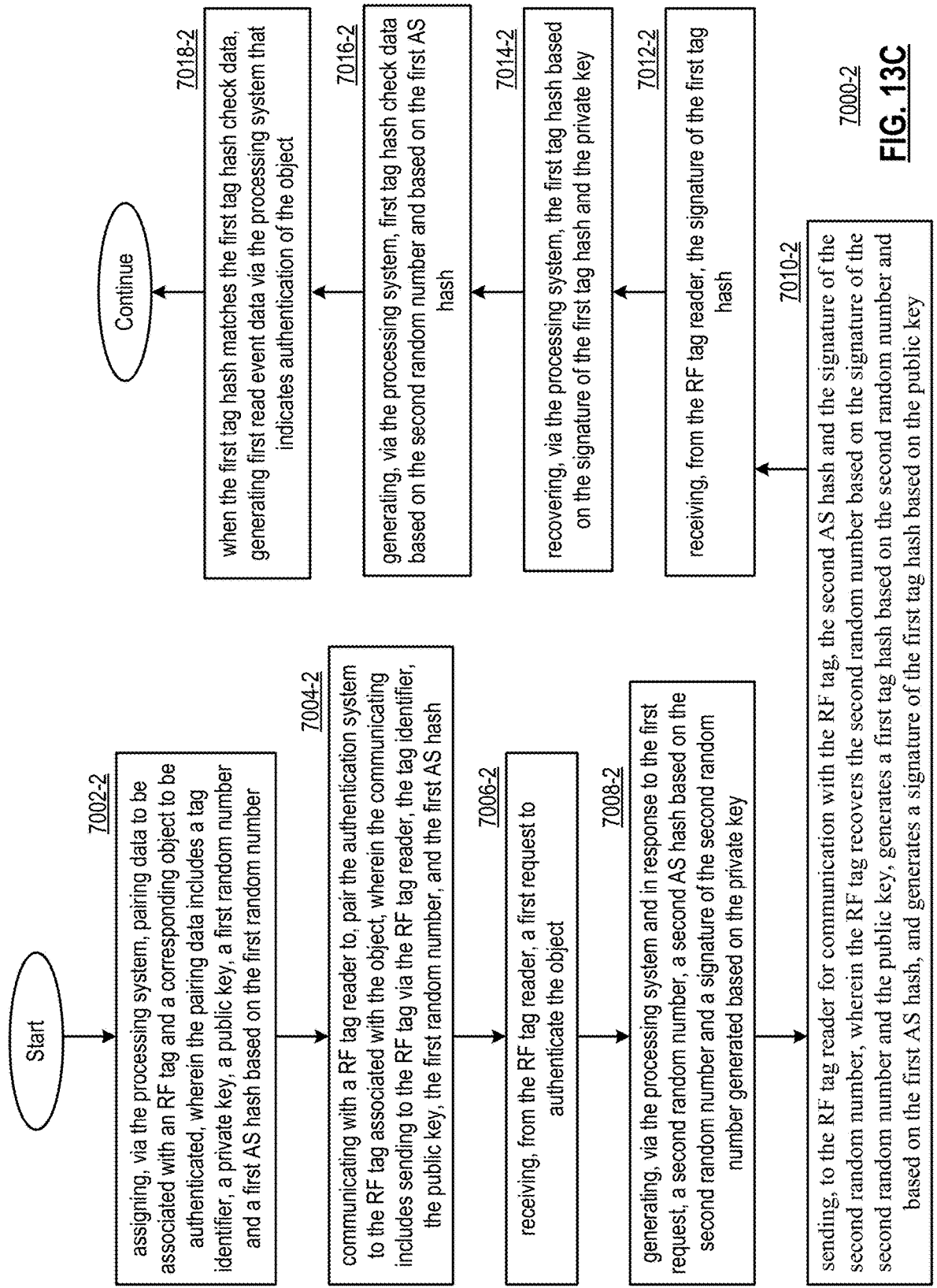
FIG. 13C presents a flowchart representation of an example method.

FIG. 13C presents a flowchart representation 7000-2 of an example method. In particular, a method is presented for use in conjunction with one or more functions or features described herein. For example, the method can be used with an authentication system or other system that includes a processor and a memory to perform various steps of the method. Step 7002-2 includes assigning, via the processing system, pairing data to be associated with an RF tag and a corresponding object to be authenticated, wherein the pairing data includes a tag identifier, a private key, a public key, a first random number and a first AS hash based on the first random number. Step 7004-2 includes communicating with a RF tag reader to, pair the authentication system to the RF tag associated with the object, wherein the communicating includes sending to the RF tag via the RF tag reader, the tag identifier, the public key, the first random number, and the first AS hash. Step 7006-2 includes receiving, from the RF tag reader, a first request to authenticate the object. Step 7008-2 includes generating, via the processing system and in response to the first request, a second random number, a second AS hash based on the second random number and a signature of the second random number generated based on the private key.

Step 7010-2 includes sending, to the RF tag reader for communication with the RF tag, the second AS hash and the signature of the second random number, wherein the RF tag recovers the second random number based on the signature of the second random number and the public key, generates a first tag hash based on the second random number and based on the first AS hash, and generates a signature of the first tag hash based on the public key. Step 7012-2 includes receiving, from the RF tag reader, the signature of the first tag hash. Step 7014-2 includes recovering, via the processing system, the first tag hash based on the signature of the first tag hash and the private key. Step 7016-2 includes generating, via the processing system, first tag hash check data based on the second random number and based on the first AS hash. Step 718-2 includes, when the first tag hash matches the first tag hash check data, generating first read event data via the processing system that indicates authentication of the object.

Figure 13D:
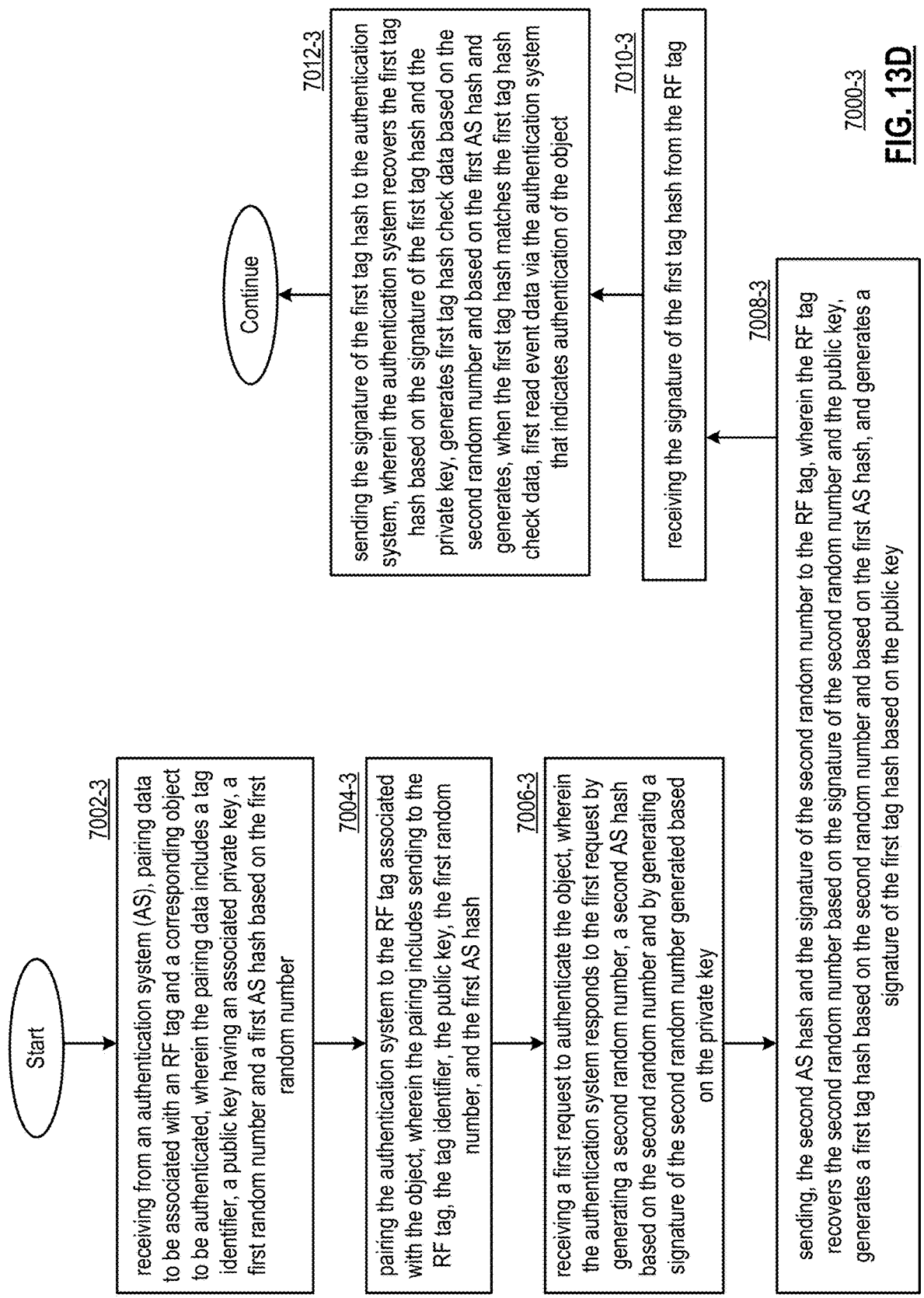
FIG. 13D presents a flowchart representation of an example method.

FIG. 13D presents a flowchart representation 7000-3 of an example method. In particular, a method is presented for use in conjunction with one or more functions or features described herein. For example, the method can be used with a tag reader or other system that includes a processor and a memory to perform various steps of the method. Step 7002-3 includes receiving from an authentication system (AS), pairing data to be associated with an RF tag and a corresponding object to be authenticated, wherein the pairing data includes a tag identifier, a public key having an associated private key, a first random number and a first AS hash based on the first random number. Step 7004-3 includes pairing the authentication system to the RF tag associated with the object, wherein the pairing includes sending to the RF tag, the tag identifier, the public key, the first random number, and the first AS hash. Step 7006-3 includes receiving a first request to authenticate the object, wherein the authentication system responds to the first request by generating a second random number, a second AS hash based on the second random number and by generating a signature of the second random number generated based on the private key. Step 7008-3 includes sending, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key.

Step 7010-3 includes receiving the signature of the first tag hash from the RF tag. Step 7012-3 includes sending the signature of the first tag hash to the authentication system, wherein the authentication system recovers the first tag hash based on the signature of the first tag hash and the private key, generates first tag hash check data based on the second random number and based on the first AS hash and generates, when the first tag hash matches the first tag hash check data, first read event data via the authentication system that indicates authentication of the object.

FIG. 13E presents a flowchart representation 7000-4 of an example method. In particular, a method is presented for use in conjunction with one or more functions or features described herein. For example, the method can be used with an RF tag or other system that includes a processor and a memory to perform various steps of the method. Step 7002-4 includes pairing the RF tag to an authentication system (AS) having a RF tag reader, wherein the pairing includes receiving, from the authentication system, pairing data to be associated with the authentication system, wherein the pairing data includes a tag identifier, a public key having an associated private key, a first random number and a first AS hash based on the first random number. Step 7004-4 includes sending to the RF tag reader, a first request to authenticate the object, wherein the authentication system responds to the first request by generating a second random number, a second AS hash based on the second random number and by generating a signature of the second random number generated based on the private key. Step 7006-4 includes receiving, from the RF tag reader, the second AS hash and the signature of the second random number. Step 7008-4 includes recovering the second random number based on the signature of the second random number and the public key.

Step 7010-4 includes generating a first tag hash based on the second random number and based on the first AS hash. Step 7012-4 includes generating a signature of the first tag hash based on the public key. Step 7014-4 includes sending the signature of the first tag hash to the authentication system, wherein the authentication system recovers the first tag hash based on the signature of the first tag hash and the private key, generates first tag hash check data based on the second random number and based on the first AS hash and generates, when the first tag hash matches the first tag hash check data, first read event data via the authentication system that indicates authentication of the object.

FIG. 13F presents a flowchart representation 7000-6 of an example method. In particular, a method is presented for use in conjunction with one or more functions or features described herein. For example, the method can be used with an authentication system or other system that includes a processor and a memory to perform various steps of the method. Step 7002-6 includes assigning, via the authentication system, pairing data to be associated with an RF tag and a corresponding object to be authenticated, wherein the pairing data includes a tag identifier, a private key, a public key, a first random number and a first AS hash based on the first random number. Step 7004-6 includes pairing the authentication system to the RF tag associated with the object, wherein the pairing includes sending to the RF tag, the tag identifier, the public key, the first random number, and the first AS hash. Step 7006-6 includes receiving, via the authentication system, a first request to authenticate the object from an unknown RF tag associated with the tag identifier. Step 7008-6 includes generating, via the authentication system and in response to the first request, a second random number, a second AS hash based on the second random number and a signature of the second random number generated based on the private key;

Step 7010-6 includes sending, via the RF tag reader, the second AS hash and the signature of the second random number to the unknown RF tag, wherein the unknown RF tag generates response data. Step 7012-6 includes receiving, via the RF tag reader, the response data. Step 7014-6 includes generating, via the authentication system, a first tag hash based on the response data and the private key. Step 7016-6 includes generating, via the authentication system, first tag hash check data based on the second random number and based on the first AS hash. Step 7018-6 includes, when the first tag hash fails to match the second tag hash check data, determining via the authentication system when the unknown RF tag corresponds to a counterfeit tag. Step 7020-6 includes, when the unknown RF tag corresponds to the counterfeit tag, generating third read event indicating the read of the counterfeit tag.

FIG. 13G presents a flowchart representation 7000-5 of an example method. In particular, a method is presented for use in conjunction with one or more functions or features described herein. For example, the method can be used with an authentication system or other system that includes a processor and a memory to perform various steps of the method. Step 7002-5 includes assigning, via the authentication system, pairing data to be associated with an RF tag and a corresponding object to be authenticated, wherein the pairing data includes a tag identifier, a private key, a public key, a first random number and a first AS hash based on the first random number. Step 7004-5 includes pairing the authentication system to the RF tag associated with the object, wherein the pairing includes sending to the RF tag, the tag identifier, the public key, the first random number, and the first AS hash. Step 7006-5 includes receiving, via the authentication system, a first request to authenticate the object. Step 7008-5 includes generating, via the authentication system and in response to the first request, a second random number, a second AS hash based on the second random number and a signature of the second random number generated based on the private key.

Step 7010-5 includes sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key. Step 7012-5 includes receiving, via the RF tag reader, the signature of the first tag hash. Step 7014-5 includes recovering, via the authentication system, the first tag hash based on the signature of the first tag hash and the private key. Step 7016-5 includes generating, via the authentication system, first tag hash check data based on the second random number and based on the first AS hash. Step 7018-5 includes, when the first tag hash matches the first tag hash check data, generating first read event data via the authentication system that indicates authentication of the object. Step 7020-5 includes facilitate updating, in a blockchain system, a registry of read events based on the first read event data.

Figure 14A:
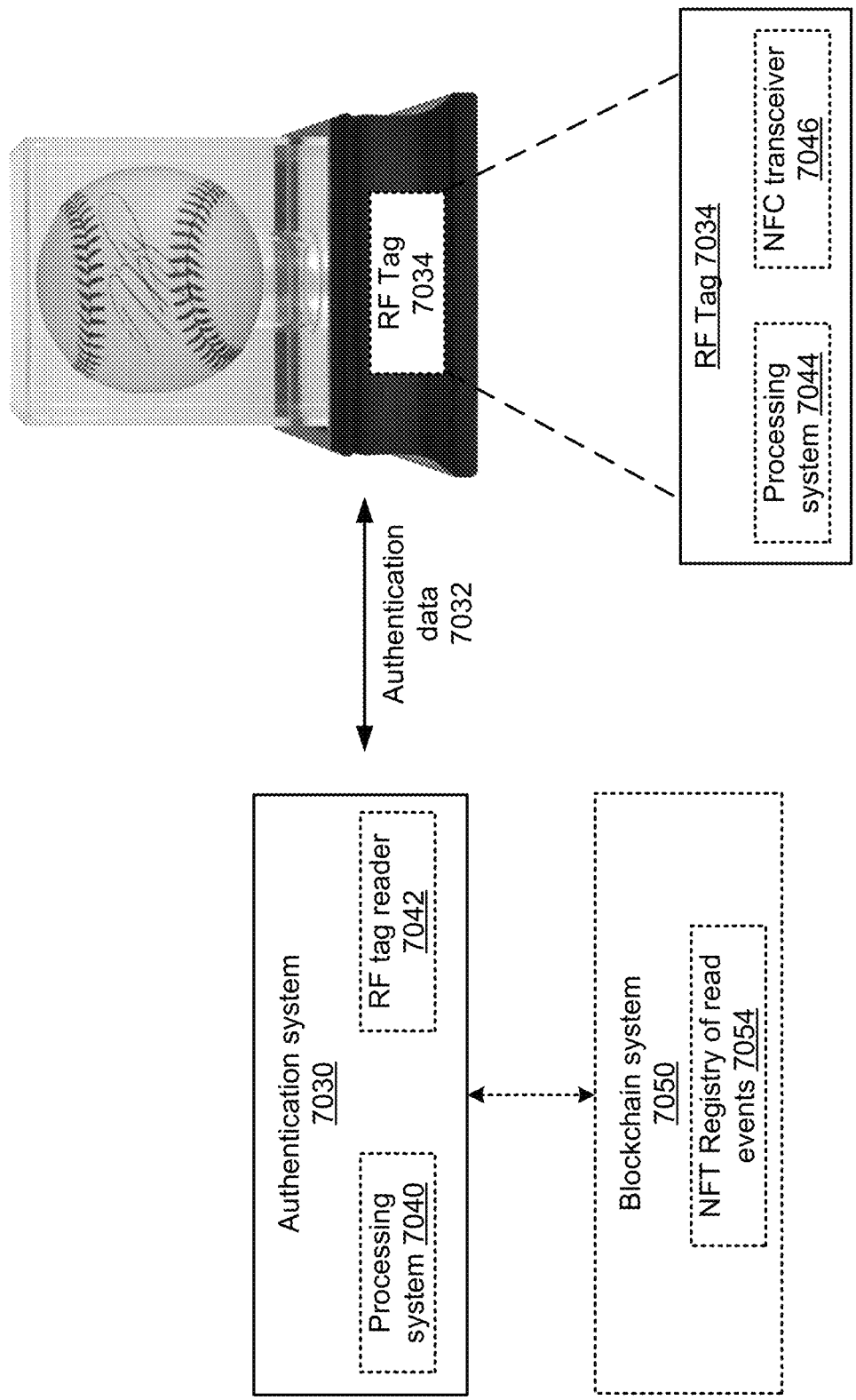
FIG. 14A presents a block diagram representation of an example authentication system.

FIG. 14A presents a block diagram representation of an example authentication system. In particular, an authentication system is shown that includes many similar elements to the system of FIG. 13A that are referred to by common reference numerals. In this system however, the blockchain system 7050 stores the registry of read events 7054 as an NFT that is updated when new read events are added to the timeline.

Figure 14B:
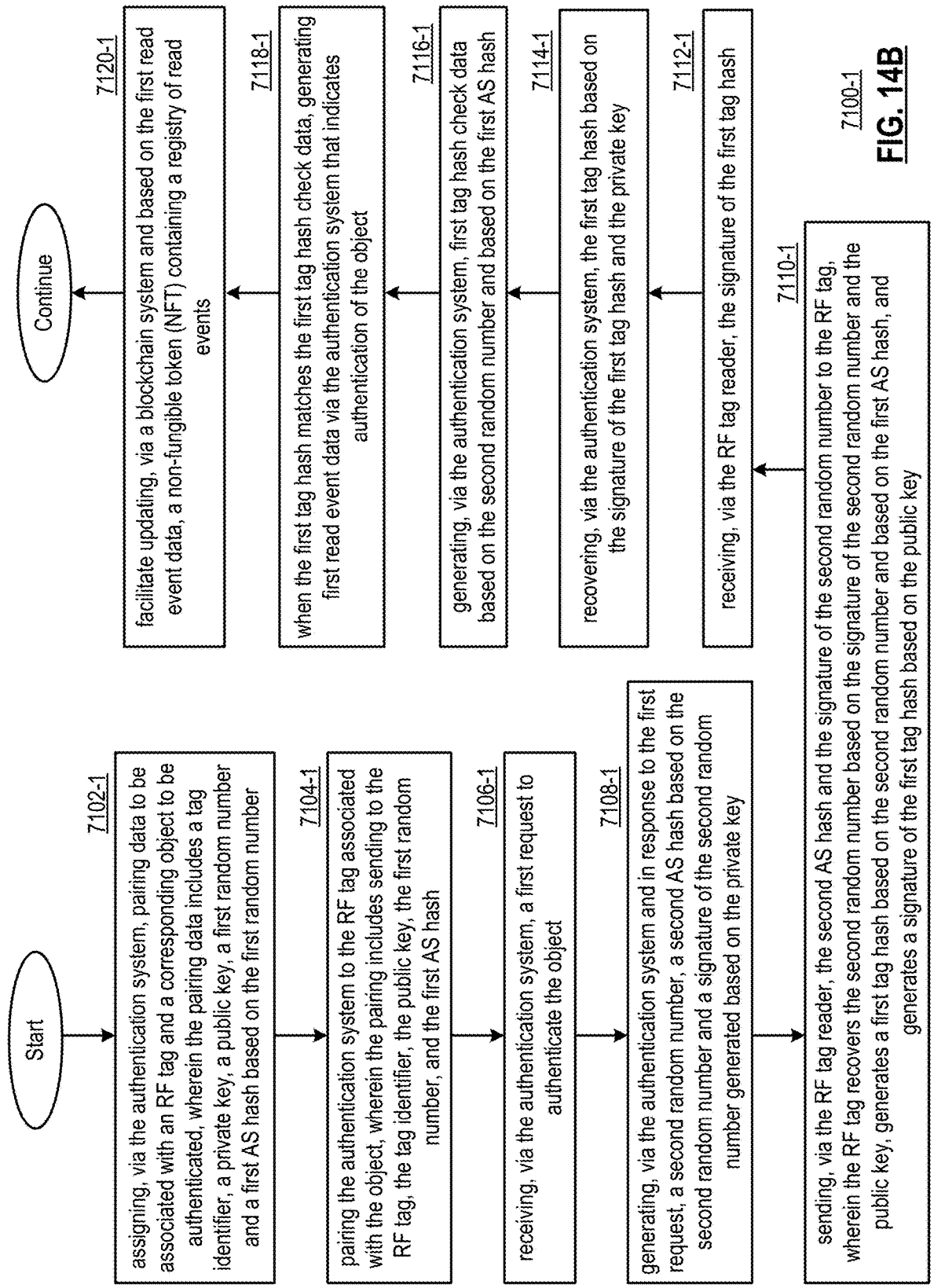
FIG. 14B presents a flowchart representation of an example method.

FIG. 14B presents a flowchart representation 7100-1 of an example method. In particular, a method is presented for use in conjunction with one or more functions or features described herein. For example, the method can be used with an authentication system, an NFT platform or other system that includes a processor and a memory to perform various steps of the method. Step 7102-1 includes assigning, via the authentication system, pairing data to be associated with an RF tag and a corresponding object to be authenticated, wherein the pairing data includes a tag identifier, a private key, a public key, a first random number and a first AS hash based on the first random number. Step 7104-1 includes pairing the authentication system to the RF tag associated with the object, wherein the pairing includes sending to the RF tag, the tag identifier, the public key, the first random number, and the first AS hash. Step 7106-1 includes receiving, via the authentication system, a first request to authenticate the object. Step 7108-1 includes generating, via the authentication system and in response to the first request, a second random number, a second AS hash based on the second random number and a signature of the second random number generated based on the private key.

Step 7110-1 includes sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key. Step 7112-1 includes receiving, via the RF tag reader, the signature of the first tag hash. Step 7114-1 includes recovering, via the authentication system, the first tag hash based on the signature of the first tag hash and the private key. Step 7116-1 includes generating, via the authentication system, first tag hash check data based on the second random number and based on the first AS hash. Step 7118-1 includes, when the first tag hash matches the first tag hash check data, generating first read event data via the authentication system that indicates authentication of the object. Step 7120-1 includes facilitate updating, in a blockchain system, a registry of read events based on the first read event data.

FIG. 14C presents a block diagram representation of an example of NFT generation. In the example shown, NFT generation tools 808 operate to convert NFT data 7122-1 associated with an RF tag corresponding to an object to be authenticated via an authentication system—into an NFT 7124-1 associated with the tagged object. The NFT data 7122-1 used to create/mint the NFT 7124-1 can include imagery of the object to be authenticated, pairing data used to pair the RF tag to the authentication system and/or other authentication data of either the authentication system or the owner.

The NFT 7124-1 can be stored on a blockchain system or other immutable storage and "held" by the owner in a wallet or similar application. The association of the NFT 7124-1 with the owner can be used in an NFT transaction to establish the owner's rights in the authenticated object. Furthermore, the NFT 7124-1 and the owner's ownership thereof can be used in conjunction with the authentication of the object via the authentication system to not only authenticate the object but to also validate the owner's ownership of other interest in the object. In this fashion, if an authenticated object is stolen, while it could otherwise be authenticated as part of a sale transaction as being authentic, the authentication can be denied, and/or the transaction can be nevertheless flagged as illegitimate in absence of an additional validation of the NFT held by the true owner as part of the transaction.

FIG. 14D presents a flowchart representation 7100-4 of an example method. In particular, a method is presented for use in conjunction with one or more functions or features described herein. For example, the method can be used with an authentication system, an NFT platform or other system that includes a processor and a memory to perform various steps of the method. Step 7102-4 includes receiving a request to authenticate an object having an associated RF tag. Step 7004-4 includes determining, via the authentication system and based on authentication data communicated with the RF tag, when authentication of the object is confirmed. Step 7006-4 includes determining when an NFT is validated, wherein the NFT is associated with the object to be authenticated and is stored in a wallet associated with a user. Step 7008-4 includes verifying the authentication of the object and ownership of the object by the user when the authentication of the object is confirmed and the NFT is validated.

FIG. 14E presents a flowchart representation 7100-3 of an example method. In particular, a method is presented for use in conjunction with one or more functions or features described herein. For example, the method can be used with an authentication system, an NFT platform or other system that includes a processor and a memory to perform various steps of the method. Step 7102-3 includes pairing, based on pairing data, with an RF tag associated with an object to be authenticated, wherein the pairing data includes a tag identifier. 7104-3 includes facilitating generation of a non-fungible token (NFT) based on NFT data that includes the pairing data, at least one image associated with the object to be authenticated and ownership information associated with the object to be authenticated.

FIG. 14F presents a flowchart representation 7100-2 of an example method. In particular, a method is presented for use in conjunction with one or more functions or features described herein. For example, the method can be used with an authentication system, an NFT platform or other system that includes a processor and a memory to perform various steps of the method. Step 7102-2 includes assigning, via the authentication system, pairing data to be associated with an RF tag and a corresponding object to be authenticated, wherein the pairing data includes a tag identifier, a private key, a public key, a first random number and a first AS hash based on the first random number. Step 7104-2 includes pairing the authentication system to the RF tag associated with the object, wherein the pairing includes sending to the RF tag, the tag identifier, the public key, the first random number, and the first AS hash. Step 7106-2 includes receiving, via the authentication system, a first request to authenticate the object. Step 7108-2 includes generating, via the authentication system and in response to the first request, a second random number, a second AS hash based on the second random number and a signature of the second random number generated based on the private key.

Step 7110-2 includes sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key. Step 7112-2 includes receiving, via the RF tag reader, the signature of the first tag hash. Step 7114-2 includes recovering, via the authentication system, the first tag hash based on the signature of the first tag hash and the private key. Step 7116-2 includes generating, via the authentication system, first tag hash check data based on the second random number and based on the first AS hash. Step 7118-2 includes, when the first tag hash matches the first tag hash check data, generating first read event data via the authentication system that indicates authentication of the object. Step 7120-2 includes facilitating generation of a non-fungible token (NFT) based on NFT data that includes the tag identifier, at least one image associated with the object to be authenticated and ownership information associated with the object to be authenticated.

Figure 14G:
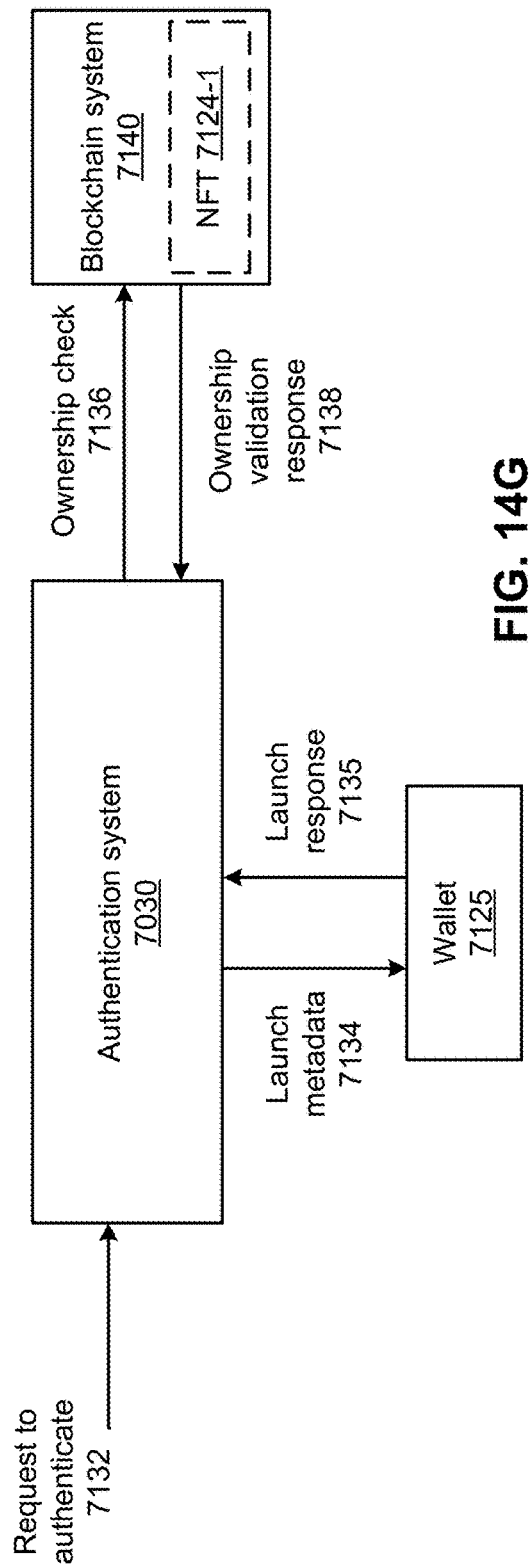
FIG. 14G presents a block diagram representation of an example system.
Figure 14H:
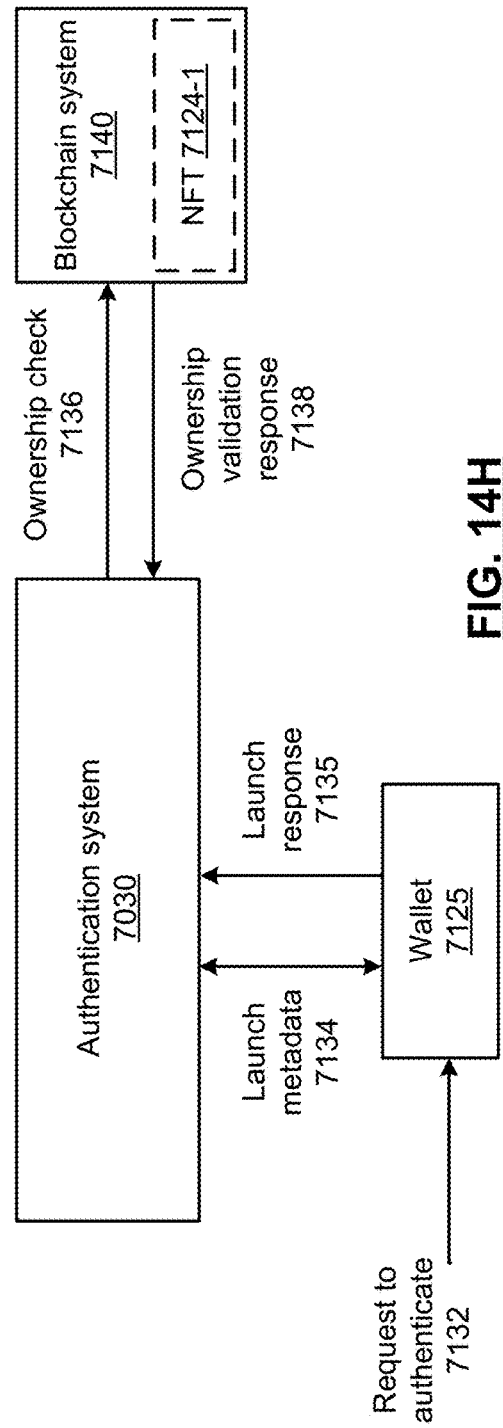
FIG. 14H presents a block diagram representation of an example system.

FIGS. 14G-14H present a block/flow diagram representations of example systems. As previously discussed, ownership, validation and/or authentication of NFTs can be used to as part of the authentication of an object and/or to enable/prevent a sale transaction based on validation of the true owner. In the example shown in FIG. 14G, authentication system 7030 has an authentication system NFT 7124-1 associated therewith. The authentication system 7030 includes at least one memory that stores operational instructions that, when executed by at least one corresponding processing circuit, control the operation of the authentication system.

In operation, the application execution device 7030 operates in response to a request to authenticate 7132 as part of a transaction request for example. This request to authenticate 7132 can be received (internally) from a user interface associated with the authentication system 7030 and/or via a RF tag reader associated therewith. Once the operational instructions are executed in response to the request to authenticate 7132, launch metadata 7134 is generated, for example, to determine if the request is associated with a valid NFT associated with the owner. The launch metadata 7134 is sent to the wallet 7125 containing a private key associated with the MS/NFT 7123-1 associated with a user, such as a user of the application execution device and/or the authentication system 7030. The authentication system 7030 receives from the wallet 7125, a launch response 7135 that is generated based on the private key. The authentication system generates, based on the launch response 7135, an ownership check 7136 that is sent to the blockchain system 7140 that stores the NFT 7124-1. An ownership validation response 7138 is received from the blockchain system 7120 that indicates whether or not the NFT 7124-1 is validated (e.g. ownership is verified, the NFT is authenticated, restrictions/conditions are met and/or the NFT has not expired, etc.)

In various examples, the launch metadata 7134 can include a current date and time, expiration information (if any) and an identification of the authentication system, a counter that indicates a number of times the application has been executed, and/or other data corresponding to the NFT 7124-1, the authentication system 7030, the user, the intended use and/or the request to authenticate. The launch response 7135 can include a public key associated with the MS/NFT 7124-1, a signed hash that is based on the private key, the launch metadata 7134, and/or other NFT data/metadata to be used to validate the NFT data from the wallet 7125 to the NFT 7124-1. In this fashion, the private key is not shared directly with the authentication system 7030—and instead is merely used by the wallet 7125 in a secure fashion.

The ownership check 7136 can include information from the launch response 7135, additional owner/user information, such as user authentication data, associated with the user and/or owner of the NFT 7122-1 and or other and/or other NFT data/metadata to be used to validate the NFT data from the wallet 7125 to the NFT 7124-1. In various examples, the blockchain system 7140 can include an NFT transaction authenticator 6022, a secure real-time NFT metadata repository 6024 and an NFT source 6026 that actually stores the NFT 7124-1 on a blockchain, IPFS, immutable storage or other decentralized computer system/network and user authentication/NFT validation can take place, for example as described in conjunction with FIGS. 12A-12D.

The authentication system 7030 can use this indication of whether or not the NFT is validated as part of the overall authentication process. For example, a transaction can be validated/approved and/or authentication validated, only when both the object itself is authenticated via communications with the RF tag and further when the ownership of the corresponding NFT is also validated. Furthermore, the registry of read events 7052 (and/or NFT 7054) can be updated to not only indicate object authentication, but also reads associated with valid or invalid NFTs. In this fashion, records of valid sales can be immutably stored, as well as authentication attempts of counterfeit objects and attempts to sell authentic (but stolen) goods.

FIG. 14H presents a block diagram representation of an example system. This system operates similarly to the system of FIG. 14G, however, the request to authenticate 7132 is received directly from the wallet 7125.

Figure 14I:
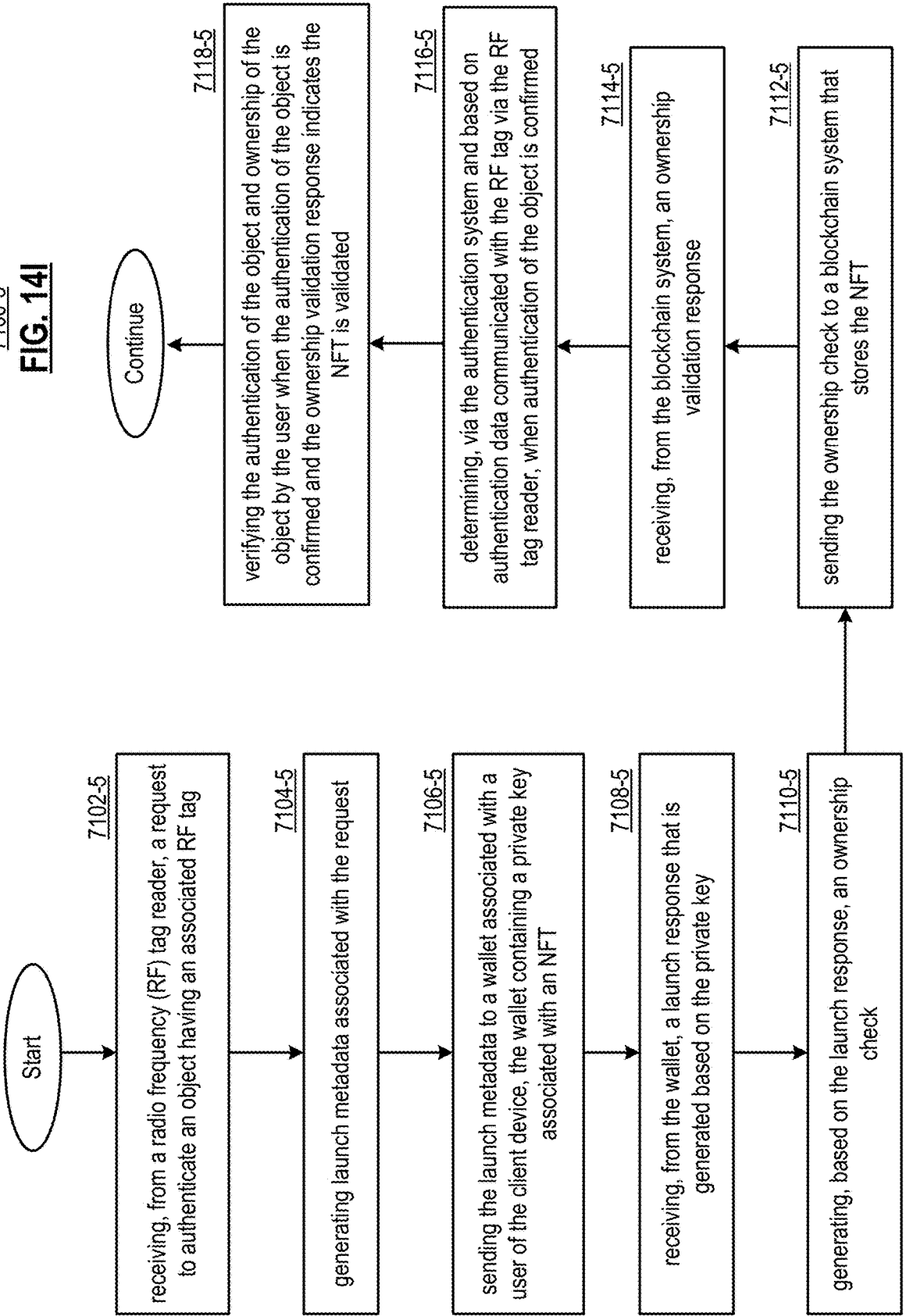
FIG. 14I presents a flowchart representation of an example method.

FIG. 14I presents a flowchart representation 7100-5 of an example method. In particular, a method is presented for use in conjunction with one or more functions or features described herein. For example, the method can be used with an authentication system, an NFT platform or other system that includes a processor and a memory to perform various steps of the method. Step 7102-5 includes receiving, from a radio frequency (RF) tag reader, a request to authenticate an object having an associated RF tag. Step 7104-5 includes generating launch metadata associated with the request. Step 7106-5 includes sending the launch metadata to a wallet associated with a user of the client device, the wallet containing a private key associated with an NFT. Step 7108-5 includes receiving, from the wallet, a launch response that is generated based on the private key.

Step 7110-5 includes generating, based on the launch response, an ownership check. Step 7112-5 includes sending the ownership check to a blockchain system that stores the NFT. Step 7114-5 includes receiving, from the blockchain system, an ownership validation response. Step 7116-5 includes determining, via the authentication system and based on authentication data communicated with the RF tag via the RF tag reader, when authentication of the object is confirmed. Step 7118-5 includes verifying the authentication of the object and ownership of the object by the user when the authentication of the object is confirmed and the ownership validation response indicates the NFT is validated.

As used herein "blockchain" and "blockchain node" refer to traditional blockchain technology. However, other decentralized computer network technologies that, for example, maintain a secure, immutable and decentralized record of transactions and/or otherwise protect the security of digital information can likewise be employed. In various examples, a blockchain can operate to collect information together in groups, such as blocks, that hold sets of information. These blocks have certain storage capacities and, when filled, are closed and linked to the previously filled blocks, forming a chain of data. New information that follows that freshly added block is compiled into newly formed blocks that, once filled, can also be added to the chain.

As used herein the term "tool" corresponds to a utility, application and/or other software routine that performs one or more specific functions in conjunction with a computer.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein involve NFTs that are generated ("minted") and secured via blockchain or other decentralized computer network technology. The distributed nature of these technologies over different nodes, the contemporaneous nature of geographically distinct calculations, coupled with the extreme computational complexity of the required calculations means that these decentralized computer network technologies cannot practically be performed by the human mind.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for use with an authentication system (AS) that includes a radio frequency (RF) tag reader and a processing system having a processor and a memory, the method comprising:
    assigning, via the authentication system, pairing data to be associated with a RF tag and a corresponding object to be authenticated, wherein the pairing data includes a tag identifier, a private key, a public key, a first random number and a first AS hash based on the first random number;
    pairing the authentication system to the RF tag associated with the object, wherein the pairing includes sending to the RF tag, the tag identifier, the public key, the first random number, and the first AS hash;
    receiving, via the authentication system, a first request to authenticate the object;
    generating, via the authentication system and in response to the first request, a second random number, a second AS hash based on the second random number and a signature of the second random number generated based on the private key;
    sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key;
    receiving, via the RF tag reader, the signature of the first tag hash;
    recovering, via the authentication system, the first tag hash based on the signature of the first tag hash and the private key;
    generating, via the authentication system, first tag hash check data based on the second random number and based on the first AS hash;

when the first tag hash matches the first tag hash check data, generating first read event data via the authentication system that indicates authentication of the object and facilitate updating, via a blockchain system and based on the first read event data, a non-fungible token (NFT) containing a registry of read events.

2. The method of claim 1, wherein the RF tag generates the first tag hash based on the second random number and based on the first AS hash and generates the signature of the first tag hash based on the public key in response to determining a hash of the second random number matches the second AS hash.

3. The method of claim 2, wherein the RF tag generates the first tag hash based on the second random number and based on the first AS hash and generates the signature of the first tag hash based on the public key further in response to determining that the second random number differs from the first random number.

4. The method of claim 1, further comprising:
facilitating generation of the NFT based on NFT data that includes the tag identifier.

5. The method of claim 4, wherein the NFT data includes at least one image associated with the object to be authenticated.

6. The method of claim 5, wherein the NFT data further includes ownership information associated with the object to be authenticated.

7. The method of claim 4, wherein the NFT data further includes the pairing data.

8. The method of claim 1, further comprising:
determining when the NFT is validated, wherein the NFT is stored in a wallet associated with a user; and
verifying the authentication of the object to be authenticated and ownership of the object to be authenticated by the user when the authentication of the object is confirmed and the NFT is validated.

9. The method of claim 1, wherein the first request to authenticate the object is initiated in response to the RF tag reader coming in range of the RF tag.

10. The method of claim 1, wherein the first request to authenticate the object is initiated in response to receiving, from the RF tag, the tag identifier.

11. An authentication system (AS) comprises:
a network interface configured to communicate via a network;
a radio frequency (RF) tag reader;
a processor;
a non-transitory machine-readable storage medium that stores operational instructions that, when executed by the processor, cause the processor to perform operations that include:
assigning pairing data to be associated with a RF tag and a corresponding object to be authenticated, wherein the pairing data includes a tag identifier, a private key, a public key, a first random number and a first AS hash based on the first random number;
pairing the authentication system to the RF tag associated with the object, wherein the pairing includes sending to the RF tag, the tag identifier, the public key, the first random number, and the first AS hash;
receiving a first request to authenticate the object;
generating, in response to the first request, a second random number, a second AS hash based on the second random number and a signature of the second random number generated based on the private key;

sending, via the RF tag reader, the second AS hash and the signature of the second random number to the RF tag, wherein the RF tag recovers the second random number based on the signature of the second random number and the public key, generates a first tag hash based on the second random number and based on the first AS hash, and generates a signature of the first tag hash based on the public key;

receiving, via the RF tag reader, the signature of the first tag hash;

recovering the first tag hash based on the signature of the first tag hash and the private key;

generating first tag hash check data based on the second random number and based on the first AS hash;

when the first tag hash matches the first tag hash check data, generating first read event data via the authentication system that indicates authentication of the object; and facilitate updating, via a blockchain system and based on the first read event data, a non-fungible token (NFT) containing a registry of read events.

12. The authentication system of claim 11, wherein the RF tag generates the first tag hash based on the second random number and based on the first AS hash and generates the signature of the first tag hash based on the public key in response to determining a hash of the second random number matches the second AS hash.

13. The authentication system of claim 12, wherein the RF tag generates the first tag hash based on the second random number and based on the first AS hash and generates the signature of the first tag hash based on the public key further in response to determining that the second random number differs from the first random number.

14. The authentication system of claim 11, wherein the operations further include:
facilitating generation of the NFT based on NFT data that includes the tag identifier.

15. The authentication system of claim 14, wherein the NFT data includes at least one image associated with the object to be authenticated.

16. The authentication system of claim 15, wherein the NFT data further includes ownership information associated with the object to be authenticated.

17. The authentication system of claim 16, wherein the NFT data further includes the pairing data.

18. The authentication system of claim 14, wherein the operations further include:
determining when the NFT is validated, wherein the NFT is stored in a wallet associated with a user; and
verifying the authentication of the object to be authenticated and ownership of the object to be authenticated by the user when the authentication of the object is confirmed and the NFT is validated.

19. The authentication system of claim 11, wherein the first request to authenticate the object is initiated in response to the RF tag reader coming in range of the RF tag.

20. The authentication system of claim 11, wherein the first request to authenticate the object is initiated in response to receiving, from the RF tag, the tag identifier.

* * * * *